US012238237B2

(12) United States Patent
Hulbert et al.

(10) Patent No.: US 12,238,237 B2
(45) Date of Patent: Feb. 25, 2025

(54) DYNAMIC USER INTERFACE SCHEMES FOR AN ELECTRONIC DEVICE BASED ON DETECTED ACCESSORY DEVICES

(71) Applicant: Apple Inc., Cupertino, CA (US)

(72) Inventors: Thomas S. Hulbert, Palo Alto, CA (US); Jeremy D. Bataillou, San Francisco, CA (US); Brian T. Gleeson, Mountain View, CA (US); David C. Graham, Columbus, OH (US); Deena Khattab, San Francisco, CA (US); Gemma A. Roper, San Francisco, CA (US); Arian Behzadi, San Francisco, CA (US); Alan C. Dye, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/094,608

(22) Filed: Jan. 9, 2023

(65) Prior Publication Data

US 2023/0216946 A1    Jul. 6, 2023

Related U.S. Application Data

(63) Continuation of application No. 17/033,627, filed on Sep. 25, 2020, now Pat. No. 11,553,070.

(51) Int. Cl.
*G06Q 20/32* (2012.01)
*G06F 3/0488* (2022.01)
(Continued)

(52) U.S. Cl.
CPC ...... *H04M 1/72412* (2021.01); *G06F 3/0488* (2013.01); *G06Q 20/3278* (2013.01);
(Continued)

(58) Field of Classification Search
CPC ............ G06F 3/0488; H04M 1/72412; H04M 1/72448; G06Q 20/352; G06Q 20/40145;
(Continued)

(56) References Cited

U.S. PATENT DOCUMENTS 6,104,808 A    8/2000  Alameh et al.
8,358,513 B2   1/2013  Kim
(Continued)

FOREIGN PATENT DOCUMENTS

CN    108933852    12/2018
EP      2977880     1/2016
(Continued)

OTHER PUBLICATIONS

Anonymous, "What's New in Apple's iPad Pro 11-inch tablet? full review!", Apr. 24, 2020, https://techmate-tips.com/whats-new-and-improved-in-new-apple-ipad-pro-tablet-full-review, 8 pages.
(Continued)

*Primary Examiner* — Tuan H Nguyen
(74) *Attorney, Agent, or Firm* — Brownstein Hyatt Farber Schreck, LLP

(57) ABSTRACT

A method includes, at a computer system with a display, a housing, and an attachment mechanism, detecting attachment of an accessory to the computer system, where the accessory, while attached, has a predetermined orientation relative to the attachment mechanism, and in response to detecting the attachment of the accessory to the computer system in accordance with a determination that the accessory is a first accessory with first physical dimensions, displaying, on the display, a first visual indication that the accessory has been attached to the computer system, wherein the first visual indication indicates at least one property of the first physical dimensions, and in accordance with a determination that the accessory is a second accessory
(Continued)

with second physical dimensions that are different from the first physical dimensions, displaying, on the display a second visual indication that the accessory has been attached to the computer system, wherein the second visual indication indicates at least one property of the second physical dimensions and the second visual indication is different from the first visual indication.

20 Claims, 47 Drawing Sheets

(51) Int. Cl.
  *G06Q 20/34* (2012.01)
  *G06Q 20/40* (2012.01)
  *H04M 1/72412* (2021.01)
  *H04M 1/72448* (2021.01)
(52) U.S. Cl.
  CPC ..... *G06Q 20/352* (2013.01); *G06Q 20/40145* (2013.01); *H04M 1/72448* (2021.01)
(58) Field of Classification Search
  CPC .... G06Q 20/3278; G06Q 20/32; G06Q 20/34; G06Q 20/40
  See application file for complete search history.

(56) References Cited

U.S. PATENT DOCUMENTS

| | | | |
|---|---|---|---|
| 8,432,262 B2 | 4/2013 | Talty | |
| 8,838,024 B2 | 9/2014 | Iwasaki et al. | |
| 8,949,734 B2 | 2/2015 | Stallings et al. | |
| 8,964,364 B2 | 2/2015 | Abdelsamie et al. | |
| 9,065,932 B2 | 6/2015 | Abdelsamie et al. | |
| 9,160,831 B2 | 10/2015 | Jang et al. | |
| 9,167,375 B2 | 10/2015 | Geris et al. | |
| 9,389,638 B2 | 7/2016 | Abdelsamie et al. | |
| 9,389,641 B2 | 7/2016 | Jayetileke et al. | |
| 9,405,319 B2 | 8/2016 | Salo et al. | |
| 9,471,270 B2 * | 10/2016 | Lee | G06F 3/1454 |
| 9,923,587 B2 | 3/2018 | Aldana et al. | |
| 9,973,620 B2 | 5/2018 | Baek et al. | |
| 10,630,826 B2 | 4/2020 | Ishida et al. | |
| 10,838,462 B1 | 11/2020 | Monaco | |
| 11,178,522 B2 | 11/2021 | Kim et al. | |
| 2003/0046401 A1 | 3/2003 | Abbott et al. | |
| 2008/0253079 A1 | 10/2008 | Robinson et al. | |
| 2011/0192857 A1 | 8/2011 | Rothbaum et al. | |
| 2013/0304959 A1 | 11/2013 | Chiang | |
| 2014/0075075 A1 | 3/2014 | Morrill et al. | |
| 2014/0256250 A1 | 9/2014 | Cueto et al. | |
| 2015/0156297 A1 | 6/2015 | Crawford et al. | |
| 2015/0172431 A1 | 6/2015 | Huang | |
| 2016/0205237 A1 | 7/2016 | Baek et al. | |
| 2018/0288208 A1 | 10/2018 | Lee et al. | |
| 2019/0171342 A1 * | 6/2019 | Reichard | H04L 67/34 |
| 2020/0311712 A1 * | 10/2020 | Sharma | G06Q 20/3278 |
| 2022/0103675 A1 | 3/2022 | Hulbert et al. | |
| 2022/0116494 A1 | 4/2022 | Chang et al. | |
| 2022/0150347 A1 | 5/2022 | Hulbert et al. | |
| 2023/0300234 A1 | 9/2023 | Hulbert et al. | |

FOREIGN PATENT DOCUMENTS

| | | |
|---|---|---|
| JP | 2009032042 | 2/2009 |
| JP | 2012156934 | 8/2012 |
| JP | 2013135375 | 7/2013 |
| JP | 2017041873 | 2/2017 |
| JP | 2017183823 | 10/2017 |
| JP | 2019024173 | 2/2019 |
| KR | 200463713 | 11/2012 |
| WO | WO 06/131985 | 12/2006 |
| WO | WO 15/047363 | 4/2015 |

OTHER PUBLICATIONS

The Verge, "Amazon's dock makes the Fire table a Better Echo Show," https://www.theverge.com/2018/7/12/17555248/amazon-show-mode-charging-dock-fire-tablet-review-specs-price, Jul. 12, 2018, 7 pages.

* cited by examiner

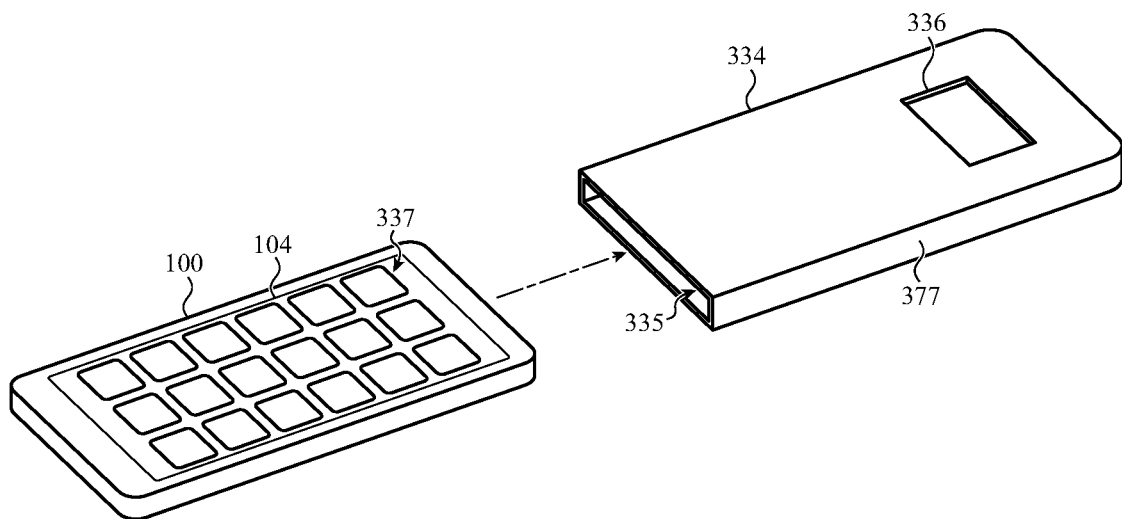
*FIG. 3D*
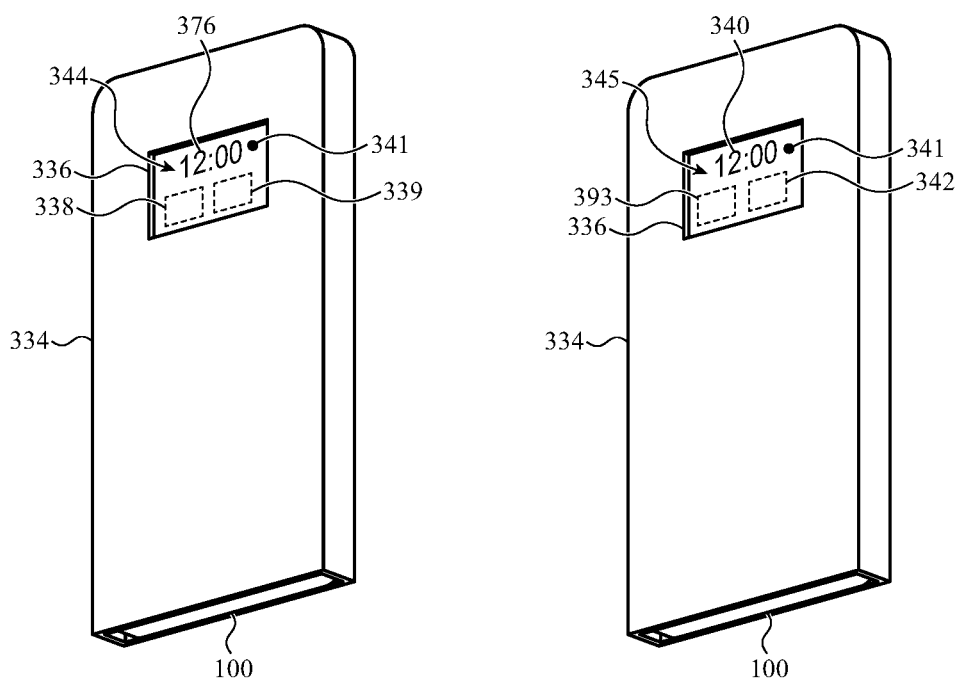
*FIG. 3E*  *FIG. 3F*

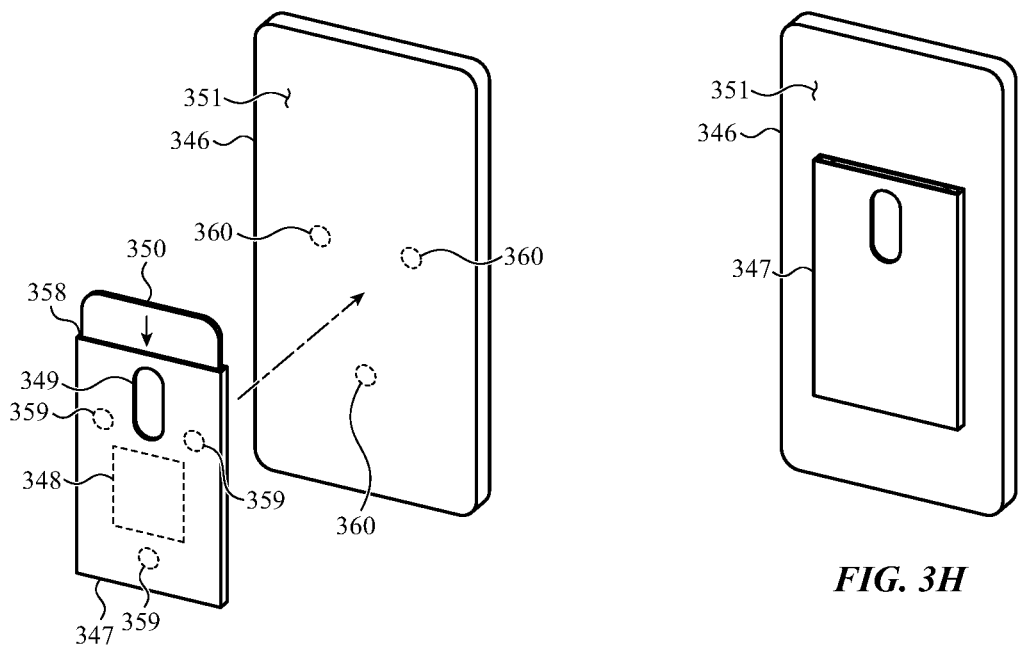
FIG. 3G
FIG. 3H
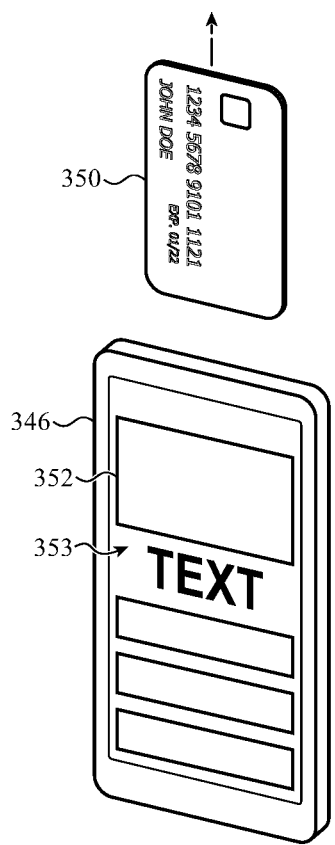
FIG. 3I

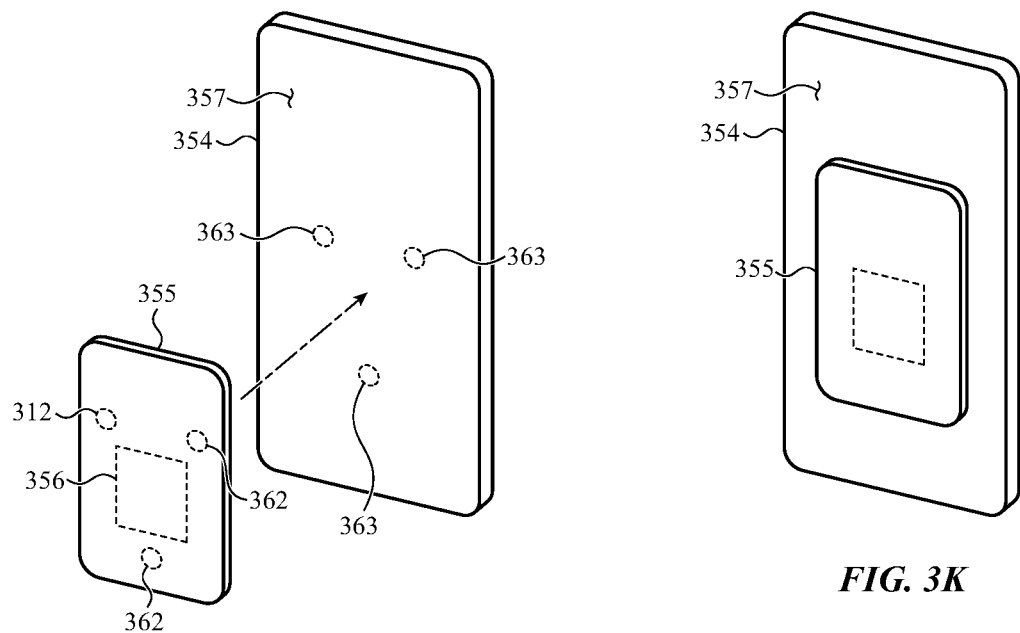
FIG. 3J
FIG. 3K
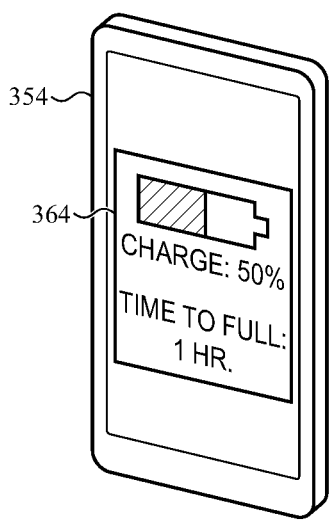
FIG. 3L

3300

```
┌─────────────────────────────────────────────────────────┐
│  DETECT ATTACHMENT OF AN ACCESSORY TO THE COMPUTER      │
│  SYSTEM, WHERE THE ACCESSORY, WHILE ATTACHED, HAS A     │──3302
│  PREDETERMINED ORIENTATION RELATIVE TO THE ATTACHMENT   │
│                       MECHANISM                         │
└─────────────────────────────────────────────────────────┘
                              │
                              ▼
┌─────────────────────────────────────────────────────────┐
│  IN RESPONSE TO DETECTING THE ATTACHMENT OF THE ACCESSORY│
│  TO THE COMPUTER SYSTEM, IN ACCORDANCE WITH A           │
│  DETERMINATION THAT THE ACCESSORY IS A FIRST ACCESSORY  │
│  WITH FIRST PHYSICAL DIMENSIONS, DISPLAY, ON THE DISPLAY, A│──3304
│  FIRST VISUAL INDICATION THAT THE ACCESSORY HAS BEEN    │
│  ATTACHED TO THE COMPUTER SYSTEM, WHEREIN THE FIRST     │
│  VISUAL INDICATION INDICATES AT LEAST ONE PROPERTY OF THE│
│                  FIRST PHYSICAL DIMENSIONS              │
└─────────────────────────────────────────────────────────┘
                              │
                              ▼
┌─────────────────────────────────────────────────────────┐
│  IN RESPONSE TO DETECTING THE ATTACHMENT OF THE ACCESSORY│
│  TO THE COMPUTER SYSTEM, IN ACCORDANCE WITH A           │
│  DETERMINATION THAT THE ACCESSORY IS A SECOND ACCESSORY │
│  WITH SECOND PHYSICAL DIMENSIONS THAT ARE DIFFERENT FROM│──3306
│  THE FIRST PHYSICAL DIMENSIONS, DISPLAY, ON THE DISPLAY A│
│  SECOND VISUAL INDICATION THAT THE ACCESSORY HAS BEEN   │
│             ATTACHED TO THE COMPUTER SYSTEM             │
│  ┌───────────────────────────────────────────────────┐  │
│  │ THE SECOND VISUAL INDICATION INDICATES AT LEAST ONE│──3308
│  │    PROPERTY OF THE SECOND PHYSICAL DIMENSIONS     │  │
│  └───────────────────────────────────────────────────┘  │
│  ┌───────────────────────────────────────────────────┐  │
│  │ THE SECOND VISUAL INDICATION IS DIFFERENT THAN THE │──3310
│  │              FIRST VISUAL INDICATION              │  │
│  └───────────────────────────────────────────────────┘  │
└─────────────────────────────────────────────────────────┘
```

*FIG. 33*

DYNAMIC USER INTERFACE SCHEMES FOR AN ELECTRONIC DEVICE BASED ON DETECTED ACCESSORY DEVICES

CROSS-REFERENCE TO RELATED APPLICATION

This application is a continuation of U.S. patent application Ser. No. 17/033,627, filed on Sep. 25, 2020, the contents of which are incorporated herein by reference as if fully disclosed herein.

FIELD

The described embodiments relate generally to electronic devices, and more particularly to electronic devices and accessories that use near-field wireless communication systems to dynamically alter the operation of the electronic devices.

BACKGROUND

Handheld electronic devices such as mobile phones and tablet computers provide numerous functions and features, and use graphical user interfaces to allow users to interact with and control those functions and features. For example, handheld electronic devices display input objects such as icons, buttons, keys, and other graphical objects with which a user may interact to control the devices and their various functions. The devices may also display output objects, such as text or images, that convey information to the user.

SUMMARY

A system may include an electronic device that includes an enclosure having a transparent cover. The electronic device may also include a display positioned below the transparent cover and configured to display a first graphical output and a second graphical output different from the first graphical output, and a touch sensor positioned below the transparent cover and configured to detect touch inputs applied to the transparent cover. The system may also include a protective case that includes a shell defining a cavity and configured to at least partially cover the enclosure of the electronic device when the electronic device is positioned in the cavity, and a near-field wireless communication antenna coupled to the shell and detectable by the electronic device. In response to detecting the near-field wireless communication antenna, the electronic device may be configured to switch from the first graphical output to the second graphical output. The first graphical output may include a first background image, and the second graphical output may include a second background image different from the first background image.

The electronic device may be a mobile phone and the protective case may have an exterior surface having a color. The first graphical output may include a group of application icons and have a first color scheme and the second graphical output may include the application icons and have a second color scheme. The second color scheme may be different from the first color scheme and may correspond to the color of the exterior surface of the protective case.

The enclosure may define a back exterior side of the electronic device, a front exterior side of the electronic device, and a peripheral exterior side of the electronic device, the peripheral exterior side extending from the back exterior side to the front exterior side. The shell may further define a window region configured to allow a user to touch the front exterior side of the electronic device when the electronic device is positioned in the cavity, a back wall configured to at least partially cover the back exterior side of the electronic device, and a side wall configured to at least partially cover the peripheral exterior side.

The protective case may further include an input system that includes an actuation member configured to be actuated by a user and a passive antenna. Subsequent to detecting the near-field wireless communication antenna and in response to the actuation member being actuated by the user, the passive antenna may become detectable by the electronic device. The electronic device may be configured to execute an operation in response to detecting the passive antenna. The passive antenna may not be detectable by the electronic device when the actuation member is unactuated. The electronic device may further include a camera system, the second graphical output may correspond to an image-capture interface, and actuation of the actuation member may cause the electronic device to capture an image using the camera system.

A dock for an electronic device may include a support structure configured to position the electronic device in a viewable orientation when the dock is on a surface of an object, a near-field wireless communication antenna configured to cause the electronic device to display a graphical user interface in response to the electronic device being positioned on the support structure, and an input system configured to wirelessly communicate with the electronic device in response to the input system being actuated by a user when the electronic device is positioned on the support structure. The input system may include an actuation member and a passive antenna, and, in response to the actuation member being actuated by the user, the input system may wirelessly communicate with the electronic device using the passive antenna.

The graphical user interface may be a secondary graphical user interface, and the electronic device may be configured to switch from displaying the secondary graphical user interface to displaying a primary graphical user interface in response to being removed from the support structure.

The graphical user interface may correspond to an alarm clock function of the electronic device, and actuation of the input system may cause the electronic device to change a setting of the alarm clock function. The dock may further include a speaker, the graphical user interface may correspond to an audio playback function of the electronic device, and actuation of the input system may cause the electronic device to change an operational parameter of the audio playback function. The dock may further include a wireless charging system comprising an output coil configured to inductively couple to a charging coil of the electronic device when the electronic device is held by the support structure.

A handheld electronic device may include an enclosure, a display, a touch sensor positioned within the enclosure, and a near-field wireless communication system configured to detect when the handheld electronic device is in proximity to any one of a set of docking accessories. When the near-field wireless communication system detects that the handheld electronic device is in proximity to a first docking accessory of the set of docking accessories, the handheld electronic device may transition from a first mode of operation to a second mode of operation different from the first mode of operation, and, when the near-field wireless communication system detects that the handheld electronic device is in proximity to a second docking accessory of the set of docking accessories, the handheld electronic device may transition from the first mode of operation to a third mode of operation different from the first mode of operation and from the second mode of operation.

The first docking accessory may be in a first location and the second docking accessory may be in a second location different from the first location. Transitioning from the first mode of operation to the second mode of operation may include transitioning from displaying a primary graphical user interface comprising a set of application icons to displaying a first auxiliary graphical user interface comprising a first set of graphical objects that are relevant to the first location, and transitioning from the first mode of operation to the third mode of operation may include transitioning from displaying the primary graphical user interface to displaying a second auxiliary graphical user interface different from the first auxiliary graphical user interface and comprising second set of graphical objects that are relevant to the second location.

Transitioning from the first mode of operation to the second mode of operation may include transitioning from displaying a primary graphical user interface to displaying a first auxiliary graphical user interface, and transitioning from the first mode of operation to the third mode of operation may include transitioning from displaying the primary graphical user interface to displaying a second auxiliary graphical user interface different from the first auxiliary graphical user interface. The first auxiliary graphical user interface may include a first user-defined set of graphical objects selected from a group of candidate graphical objects and the second auxiliary graphical user interface may include a second user-defined set of graphical objects selected from the group of candidate graphical objects. The first user-defined set of graphical objects may include an audio control input object. The second user-defined set of graphical objects may lack the audio control input object. The first user-defined set of graphical objects may be arranged on the display according to a user-defined arrangement.

A method according to some implementations is performed at a computer system with a display, a housing, and an attachment mechanism. The computer system detects attachment of an accessory to the computer system, where the accessory, while attached, has a predetermined orientation relative to the attachment mechanism. In response to detecting the attachment of the accessory to the computer system, and in accordance with a determination that the accessory is a first accessory with first physical dimensions, the computer system displays, on the display, a first visual indication that the accessory has been attached to the computer system, wherein the first visual indication indicates at least one property of the first physical dimensions. In response to detecting the attachment of the accessory to the computer system, and in accordance with a determination that the accessory is a second accessory with second physical dimensions that are different from the first physical dimensions, the computer system displays, on the display a second visual indication that the accessory has been attached to the computer system. The second visual indication indicates at least one property of the second physical dimensions, and the second visual indication is different from the first visual indication.

A method according to some implementations is performed at a computer system with a display and a housing. The computer system displays a first graphical user interface comprising first graphical content displayed in a first region of the display and second graphical content displayed in a second region of the display, the second region different than the first region. The computer system detects a coupling of a case to the computer system, where the first region of the display is covered by the case and the second region of the display is visible through an opening in the case. In response to detecting the coupling of the case to the computer system, the computer system transitions from displaying the first graphical user interface to a second graphical user interface. The transition includes ceasing to display the second graphical content in the second region of the display, and displaying the second graphical user interface on the display, the second graphical user interface comprising third graphical content, different from the second graphical content, displayed in the second region of the display.

A method according to some implementations is performed at a computer system with a display and a housing. The computer system detects an occurrence of an event. In response to detecting the occurrence of the event, and in accordance with a determination that a case is not coupled to the computer system, the computer system displays, in a first region of the display, first graphical content associated with the event. In response to detecting the occurrence of the event, and in accordance with a determination that the case is coupled to the computer system, the computer system displays, in a second region of the display different than the first region of the display, second graphical content associated with the event. The first region of the display is covered by the case when the case is coupled to the computer system, and the second region of the display is visible through an opening in the case when the case is coupled to the computer system.

BRIEF DESCRIPTION OF THE DRAWINGS

The disclosure will be readily understood by the following detailed description in conjunction with the accompanying drawings, wherein like reference numerals designate like structural elements, and in which:

FIGS. 3D-3F depict the device of FIG. 1A being used with another example protective case;

FIGS. 3G-3I depict a device being used with an example removable accessory;

FIGS. 3J-3L depict a device being used with another example removable accessory;

FIG. 33 is a flow chart of a method for use with a computer system;

DETAILED DESCRIPTION

Figure 1A:
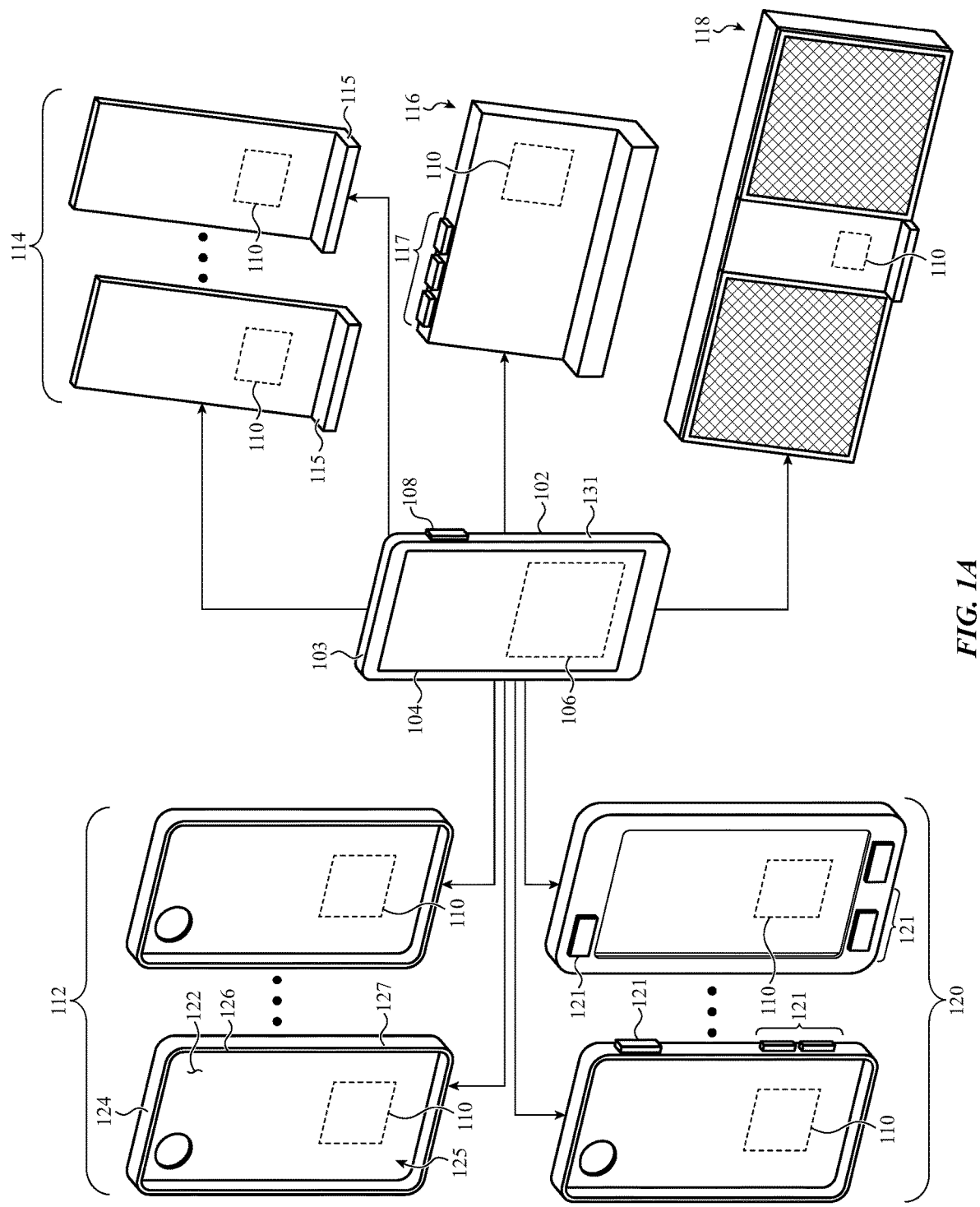
FIG. 1A depicts an example system including an electronic device and associated accessories.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to a system of electronic devices and electronic device accessories that use near-field wireless communication techniques to dynamically modify or change how a device operates. For example, various different accessories for electronic devices may each include near-field wireless communication antennas that allow the accessories to be detected and identified by the electronic device. Once a particular accessory is detected near the electronic device, the electronic device may change its mode of operation in a manner that is unique to that particular accessory or type of accessory.

Various different types of accessories may be configured to use near-field wireless communication systems to affect the operational modes and/or characteristics of devices that are using those accessories. For example, a protective case for a mobile phone may be configured to change the operational mode of the mobile phone in one manner, while charging docks change the operational mode of the mobile phone in another manner, while an "alarm clock" docking accessory changes the operational mode of the mobile phone in yet another manner. The change in operational mode may correspond to and/or be accompanied with a change in the graphical user interface or graphical output that is displayed by the mobile phone. For example, when the mobile phone is placed in a sport-focused protective case, the mobile phone may, without additional user input, replace its primary graphical user interface (or any graphical user interface that is currently active) with a sport-focused interface. As another example, when the mobile phone is placed on a speaker dock, the mobile phone may replace its primary graphical user interface with a set of audio playback controls. The graphical user interfaces that are activated when a device is used with an accessory may therefore be customized to a particular function or set of functions that are relevant to the associated accessory. In some cases, these graphical user interfaces may be simpler than a primary graphical user interface (e.g., having fewer and/or larger graphical objects), which may help facilitate more efficient use of the device and may be dedicated to a particular function set or operational mode of the device.

In some implementations described herein, one or more graphical outputs that are displayed on the device are changed or switched in response to detecting the protective case. As used herein, graphical outputs may be used to refer to visible output from a display. Graphical outputs may include graphical user interfaces, graphical objects, images, videos, and/or other visible outputs produced by a display. Graphical user interfaces may include various types of graphical objects, including icons, menu items, status bars, menus, graphical objects indicating information such as wireless signal strength, time, battery charge level, and the like. Graphical user interfaces may also include graphical outputs such as background images. Graphical objects may be visually differentiable from other graphical objects, and the boundaries and/or borders of a graphical object may suggest functional distinctions between different graphical objects. For example, the boundary and/or border of a first icon (e.g., a first graphical object) may visually differentiate the first icon from a second icon, and may indicate to a user that the two icons define different input areas and will, if selected, cause a device to take different actions.

As used herein, the terms "switch" or "change" a graphical output may be used to refer to a scenario in which one graphical user interface, graphical object, or other displayed item is exchanged with another graphical user interface, graphical object, or other displayed item. The terms "switch" or "change" may also be used to refer to a scenario in which a graphical user interface, graphical object, or other displayed item is modified to produce a visually distinct or visually perceptible effect. For example, a background or color scheme of one or more graphical objects in a graphical user interface may be "switched" or "changed" to appear to have a different color, texture, or other visually perceptible feature. For clarity, the switched or changed graphical output may be referred to as a second graphical output even though, other than an appearance, the graphical output may represent the same item or perform the same function when selected.

For the purposes of this disclosure, accessories may include, without limitation, protective cases, gaming cases, camera cases, and docks (e.g., speaker docks, alarm clock docks, charging docks, unpowered docks, etc.). Cases, such as protective cases, gaming cases, camera cases, may be accessories that are configured to receive an otherwise complete device, such as a mobile phone, and may provide additional functionality to the device (e.g., physical protection, appearance, attachment mechanisms, etc.). Such accessories that include near-field wireless communication antenna and cause an electronic device to change or modify the operational mode and/or characteristic of the electronic device when the device and the accessory are in proximity to one another may be referred to herein as a near-field wireless enabled accessory.

The changing or modifying of the operational mode and/or characteristics of electronic devices may be facilitated by near-field wireless communications that allow the electronic devices to determine when they are being used with the accessories. For example, the accessories may include near-field wireless communication antennas, and the devices may include near-field wireless communication systems that can detect when the device is in close proximity to the near-field wireless antennas (e.g., the device can detect when it has been installed in, coupled to, placed on, or is otherwise being used with the accessory). The device may also receive, from the near-field wireless communication antenna, information about the particular accessory such as a unique identifier.

The near-field wireless communication systems and antennas may be configured so that an accessory is detected by a device only when the device is sufficiently close that it is substantially certain that the device and the accessory are being used together. For example, in the case of a protective case for a mobile phone, the mobile phone may detect the presence of the case only once the phone is inserted into the protective case. In the case of a docking accessory (also referred to herein as a "dock"), the mobile phone may detect the presence of the docking accessory only once the mobile phone is physically placed on the docking accessory. Further, the near-field wireless communication antennas may be passive or un-powered antennas, allowing dynamic device customization to occur even with un-powered accessories. As used herein, passive or un-powered antennas refer to antennas that are not conductively coupled to an electrical power supply of the accessory. Accordingly, a protective case need not have batteries or independently powered communications systems (e.g., WIFI or Bluetooth) in order to change the operational mode or other characteristic of the electronic device. In some cases, however, devices may include both un-powered near-field wireless communication antennas as well as powered communications systems.

By providing a series of different accessories that can each customize the operation or user interface of a mobile device in a different way, the mobile device may become an even more dynamic, useful tool. For example, throughout a day, a user may place a mobile device in a workout case for a morning workout, in a charging dock during work, in a kitchen dock in the evening, and in an alarm clock dock at night. The concepts described herein allow the device to automatically transition to a workout interface when it is placed in the workout case, to a work interface when it is placed in the charging dock, to a cooking interface when it is placed in the kitchen dock, and to an alarm clock interface when it is placed in the alarm clock dock, among numerous other possible transitions. The device may also transition back to a main or primary interface when it is removed from those docks (or in response to a user request regardless of its proximity to an accessory). In this way, the device continuously and automatically adapts to its intended use and provides a tailored user interface to its user.

Further, the device may use other inputs and/or information to determine how to change or modify its operations when the device is being used with a near-field enabled accessory. For example, when the device detects that it has been attached to a dock of an exercise bike, it may also determine the location of the device. If the location is a first location (e.g., a home location), the device may take a different set of actions than if the location is a second location (e.g., a fitness center or gym). In the home location, the device may initialize a first set of user controls, such as a set of media controls for the user's home media system (e.g., the user's television, stereo equipment, etc.) and a fitness tracking interface, while in the fitness center, the device may initialize a second set of user controls, such as the fitness tracking interface and a set of media controls for a personal streaming service (e.g., to provide audio to the user's personal headphones). As another example, when the device detects that it has been placed on a dock in a kitchen, the device may also determine who is using the device. If it is a first user, the device may display one set of interface elements (e.g., a recipe for a smoothie and an editable grocery list), and if it is a second user, the device may display a second set of interface elements (e.g., a recipe for a pasta sauce and a set of media controls for the user's home media system).

Information from any sensor and/or sensor system of a device may be used to provide additional contextual information about the device, its use, its user, or the like, in order to provide highly customized and tailored user experiences. Such sensors and/or sensor systems may include, without limitation, integrated cameras, GPS or other navigation or location-finding systems, thermal sensors, accelerometers, magnetometers, biometric identification systems (e.g., facial recognition, fingerprint recognition, voice recognition), biometric sensors (e.g., heart-rate monitors, electrocardiographs, pulse oximeters), or the like. Other types of information not detected by an onboard sensor may also be used to provide additional contextual information about the device, its use, its user, or the like. Such information includes, without limitation, current or predicted weather information, date and time information, calendar entries, recently opened or closed applications, text or email messages, or the like. Such information may be stored on the device, accessed via a communications network, or the like. In some cases, devices use information about an accessory (from a near-field wireless connection with the accessory)

together with additional contextual information (e.g., from a sensor system or other information source) to determine how to change, modify, or affect the device's operation. For example, the device may determine which application to initiate based on the near-field wireless connection and a location of the device. Examples of using additional contextual information to determine how to change or affect the operation of a device being used with a near-field wireless enabled accessory are provided herein.

FIG. 1A depicts an example system in which an electronic device 100 (also referred to herein simply as "device") may be used with various different accessories that cause the device 100 to transition between operating modes when the device 100 is used with those accessories. The electronic device 100 is an example of a computer system, such as the computer system described herein with respect to FIG. 36. As described herein, transitioning between operating modes may include and/or be accompanied by the initiation and/or termination of applications (e.g., initiating or terminating an application in response to detecting accessories), changes in the graphical user interface or graphical output displayed by the device 100 (e.g., changes in the color, content, appearance, size, icons, or information of a graphical user interface), changes in device settings (e.g., alert volume, haptic or tactile output strength, screen brightness), or the like. Transitioning between operating modes (or between different graphical user interfaces or other graphical outputs) may or may not include or be accompanied by a visual animation, sequence, or other graphical effect indicating or occurring during the transition.

The device 100 shown in FIG. 1A is a mobile phone (e.g., a smartphone), but this is merely one representative example of a device that may be used in conjunction with the ideas disclosed herein. Other example devices include, without limitation, music/media players, tablet computers, laptop computers, wearable electronic devices, watches (e.g., mechanical, electrical, or electromechanical), and the like.

The device 100 includes an enclosure 102 that defines the exterior surfaces of the device 100. The enclosure 102 may include, for example, a housing member 103 that defines a back exterior side of the device 100 (e.g., back side 201, FIG. 2), a front exterior side of the device 100, and a peripheral exterior side 131 of the device 100, the peripheral exterior side extending from the back exterior side to the front exterior side. The housing member 103 may be a single piece of material (e.g., a monolithic component), or multiple discrete components. The enclosure 102 may also include a transparent cover 105 that covers or otherwise overlies a display 104 and/or a touch sensitive surface (e.g., a touchscreen) of the device 100, and may define a front exterior front surface of the device 100. The display 104 is configured to display graphical outputs, and the graphical outputs may be visible through the transparent cover 105 or at least a region of the transparent cover 105. The transparent cover 105 may also define one or more openings to allow internal components such as microphones, cameras, speakers, sensors, and the like, to have access to the surrounding environment of the device 100. The device 100 may also include a touch sensor that is configured to detect touch events or touch inputs applied to the transparent cover 105. The touch sensor may be integrated with the display or otherwise configured to provide touchscreen functionality.

The device 100 may include a near-field wireless communication system 106 that is configured to wirelessly detect when the electronic device is in proximity to any one of a group of near-field wireless enabled accessories. The near-field wireless communication system 106 may be configured for any suitable type or protocol of near-field wireless communications, including but not limited to near-field communications ("NFC") protocols, radio frequency identification ("RFID") protocols, or any other suitable type or protocol. For example, the near-field wireless communication system 106 (and indeed any near-field wireless communication system, antenna, or other component described herein) may be configured to operate in accordance with applicable standards, such as ISO/IEC 14443, FeliCa, ISO/IEC 18092, ISO/IEC 21481, ISO/IEC 13157, or the like.

In some cases, the near-field wireless communication system 106 is configured to detect the presence or proximity of passive or un-powered antennas that are incorporated in the accessories. As such, the near-field wireless communication system 106 may be separate from other communication systems in the device 100, such as Bluetooth, WIFI, or cellular communications systems, and may be configured to communicate over a limited range (e.g., the near-field wireless communication system 106 may only detect a near-field wireless antenna when they are within about 10 cm from each other).

The device 100 may include physical inputs, such as a button 108, with which a user can interact to control operations of the device 100. The particular function of the button 108 may be changed based on the accessory with which the device 100 is associated at a given time. For example, as described herein, in a primary operating mode, the button 108 may serve to activate or deactivate the screen of the device 100. In a second operating mode, such as when the device 100 is in a case intended for capturing photographs, the button 108 may operate as a shutter button to capture an image. While the device 100 is shown having one button 108, this is merely representative and the device 100 may include more or different input mechanisms, including for example separate volume control buttons, fingerprint sensors, rotatable input members, keys, a keyboard, or the like. The device 100 may also include a wireless charging system, described with respect to FIG. 2.

The device 100 may also include various additional internal components and structures, such as sensor(s), memory, processor(s), control circuitry, a battery, circuit board (s), a frame or other supporting structure, antenna(s), or the like. The device 100 may also include front and/or rear facing camera systems (e.g., a rear-facing camera 214, FIG. 2) that can capture images and/or video of external subjects. The camera systems may include lenses, image sensors, focusing and zooming mechanisms, flashes, and any other suitable components.

Additional or different components may also be positioned within the enclosure 102 of the device 100. The device 100 may also include various systems and/or components that can receive information from or about a user or the user's surroundings (e.g., touchscreens, microphones, biometric sensors, GPS systems). It is well understood that the use of personally identifiable information (such as information from or about a user or the user's environment and that is stored on or accessible by a device) should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The system shown in FIG. 1A also includes various types of accessories that can be used with the device 100. For example, FIG. 1A includes protective cases 112, docks 114, a dock 116 with auxiliary input systems 117, a speaker dock 118, and protective cases 120 with auxiliary input systems 121. As described herein, the device 100 may be useable with each of these accessories (as well as others not shown in FIG. 1A), and as the user switches from one accessory to another, the device 100 may dynamically switch to a different operational mode, present a different graphical user interface or graphical output (e.g., present a graphical user interface having different content or a different appearance, color or the like), change a device setting, or otherwise operate in a manner that is tailored to the particular accessory with which the device 100 is being used. Docks, such as the docks 114, may include stand-alone accessories as well as docks that are integrated into other devices, such as exercise equipment (e.g., bicycles, rowing machines, elliptical machines, stair-climbing machines, or the like), vehicles, musical equipment (e.g., guitars, amplifiers, keyboards, etc.), or the like. The docks 114 are shown with optional ledges 115 that support or prop the device 100 in a convenient viewing position. In some cases, the docks 114 may lack the ledges 115, and the device 100 may be retained to the dock 114 and/or maintained in a particular orientation or position using magnetic attachment features in the dock 114 and the device 100.

Each accessory may include a near-field wireless communication antenna 110 (also referred to herein simply as "antenna") that is detectable by the near-field wireless communication system 106 of the device 100. As used herein, an antenna may be detectable insofar as the antenna or near-field wireless communication circuitry is capable of producing an electrical response when probed or polled by a wireless detection device or circuitry. For example, the antenna may produce a distinct or recognizable disturbance or other response to an electromagnetic field produced by another device or circuit, thereby rendering the antenna detectable. Further, as used herein, a near-field wireless communication antenna being detectable indicates that the near-field wireless communication antenna may be operable to trigger, initiate, or otherwise cause a response in a near-field wireless communication system of a device, where the response indicates that the near-field wireless communication antenna is in the presence and/or proximity of the device (e.g., within a threshold distance).

When the device 100 detects that it is being used with one of the accessories in FIG. 1A, for example because it is within a short distance of an accessory (e.g., less than about 10 cm), the detected antenna 110 causes the device 100 to change a mode of operation. As used herein, changing a mode of operation may refer to or include changing a graphical output of the device (e.g., temporarily or permanently changing a color scheme of some or all of a graphical user interface, changing between different graphical user interfaces, initiating the display of graphical objects), changing one or more device settings, or combinations of these. To facilitate this functionality, each antenna 110 may include some identifier or other information that uniquely identifies that accessory (or that type of accessory) or may otherwise be configured to uniquely modify the operation of the device 100. In this way, the operation of the device 100 may dynamically change as a user changes from accessory to accessory.

The antennas 110 may be any suitable type of antenna that is detectable by the near-field wireless communication system 106 of the device 100. For example, the antennas 110 may be NFC antennas, RFID antennas, or the like. In some cases, the antennas 110 may be passive or un-powered antennas. Accordingly, the accessories need not be powered or include batteries or other power sources to cause the device 100 to change its operational mode. This may allow accessories to be smaller, thinner, lighter, and more portable than they would be if they required power sources. In some cases, an antenna 110 may be powered by a power source internal to or otherwise connected to an accessory. Also, accessories that use power for other purposes (e.g., speakers, amplifiers, etc.) may use passive or un-powered antennas despite the availability of power at the accessory.

The near-field wireless communication antennas 110 may be positioned in the accessories so that they are aligned with or otherwise suitably located so that they can be detected by the near-field wireless communication system 106 when the device 100 is being used with the accessory. Thus, for example, when the device 100 is installed in a protective case 112, the near-field wireless communication antenna 110 of that case may be substantially aligned with the near-field wireless communication system 106 of the device 100 (e.g., within about 2 cm, or about 1 cm). The antenna and near-field wireless communication system 106 may be similarly aligned when the device 100 is placed on a dock 114, 116, or 118.

Figure 1B:
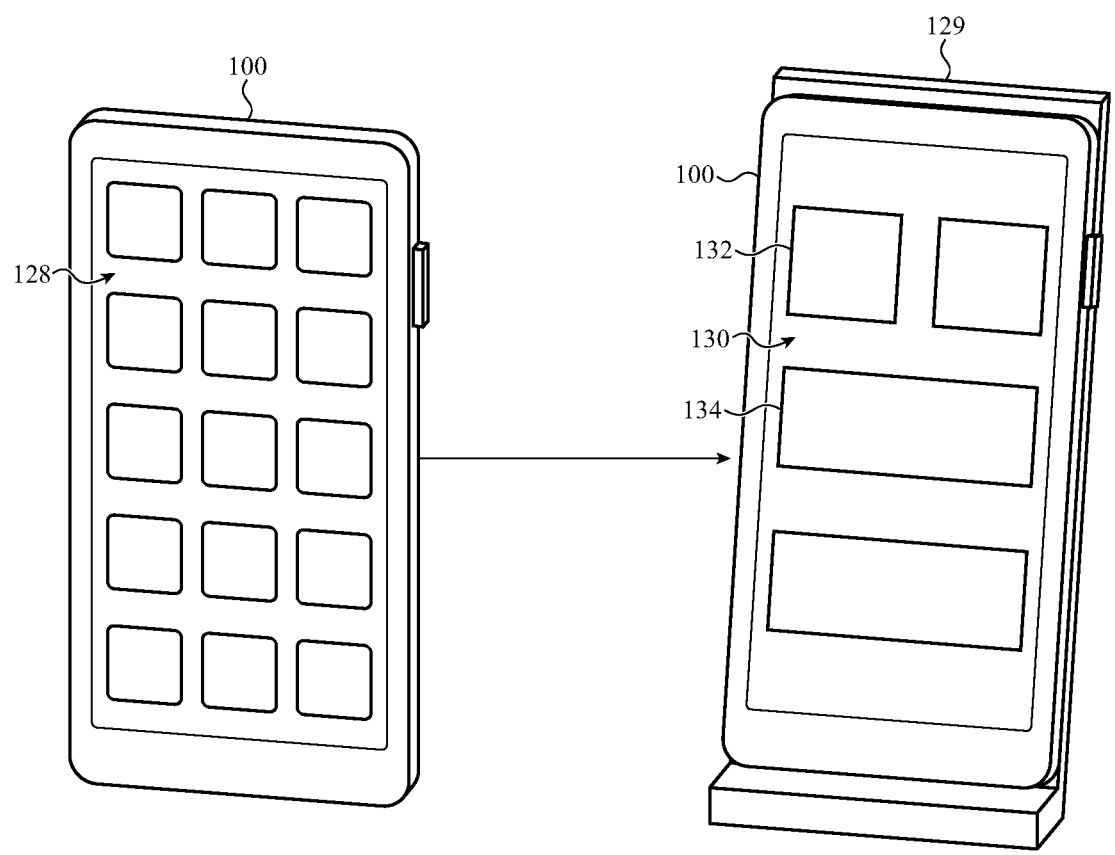
FIG. 1B depicts the device of FIG. 1A and an example accessory in use together.

As described, the device 100 may dynamically change its operational mode when it is used with different accessories. In some cases, changing operational modes includes changing between different graphical user interfaces. FIG. 1B depicts the device 100 displaying a primary graphical user interface 128 when the device 100 is not being used with an accessory (when it is being used with an accessory that causes the device 100 to display the primary graphical user interface 128), and displaying a different graphical user interface 130 when the device 100 is being used with an accessory 129 (shown in this example as a dock).

The primary graphical user interface 128 may include selectable icons (e.g., application icons that, when selected, cause applications to be executed and/or initialized, or otherwise cause graphical user interfaces associated with the applications to be displayed) or other graphical objects that correspond to applications or other functions of the device 100. The primary graphical user interface 128 may also include status bars, menus, graphical objects indicating information such as wireless signal strength, time, battery charge level, and the like. The primary graphical user interface 128 may be automatically displayed when the device 100 is turned on, and may be considered the top level graphical user interface of the device 100 (or the highest hierarchical level of a multi-level graphical user interface scheme). The primary graphical user interface 128 may also be referred to as a "home screen," and may be a main starting interface for an operating system of a device. The primary graphical user interface 128 may also have a color scheme, which may refer to the color or colors of background images, borders, screen areas, icons, or the like. As used herein, a secondary graphical user interface may refer to any graphical user interface other than the primary graphical user interface.

When the device 100 is placed on an accessory and is positioned by the accessory so that the device 100 can be seen and interacted with, the device 100 may change from the primary graphical user interface 128 to another graphical user interface. For example, as shown in FIG. 1B, when the device 100 is placed on an accessory 129, the device 100 may change from the primary graphical user interface 128 to a second graphical user interface 130 that is different than the primary graphical user interface 128. The second graphical user interface 130 is merely one of numerous possible examples of graphical user interfaces that are different from the primary graphical user interface 128 and to which the device 100 may switch in response to the device 100 being used with an accessory. The change from the primary to the second graphical user interface may be triggered by the device 100 detecting the near-field wireless communication antenna in the accessory 129.

The second graphical user interface 130 may have a different set of icons, inputs, outputs, or other types of graphical objects as compared to the primary graphical user interface 128. For example, the second graphical user interface 130 lacks the application icons of the primary graphical user interface 128, and instead includes other graphical objects, such as graphical objects 132 and 134. The graphical object 132 may be a "world clock" graphical object (e.g., displaying the times of multiple time zones), and the graphical object 134 may be an "audio control" graphical object (e.g., displaying now-playing information and including audio control affordances such as play, pause, skip forward, skip backwards, etc.). Accordingly, the second graphical user interface 130 includes different graphical content and provides different device functions than the primary graphical user interface 128. The device 100 may automatically change back from the second graphical user interface 130 to the primary graphical user interface 128 when the device 100 is removed from the dock 129, or in response to a user input received while the device 100 is on the dock 129.

Figure 2A:
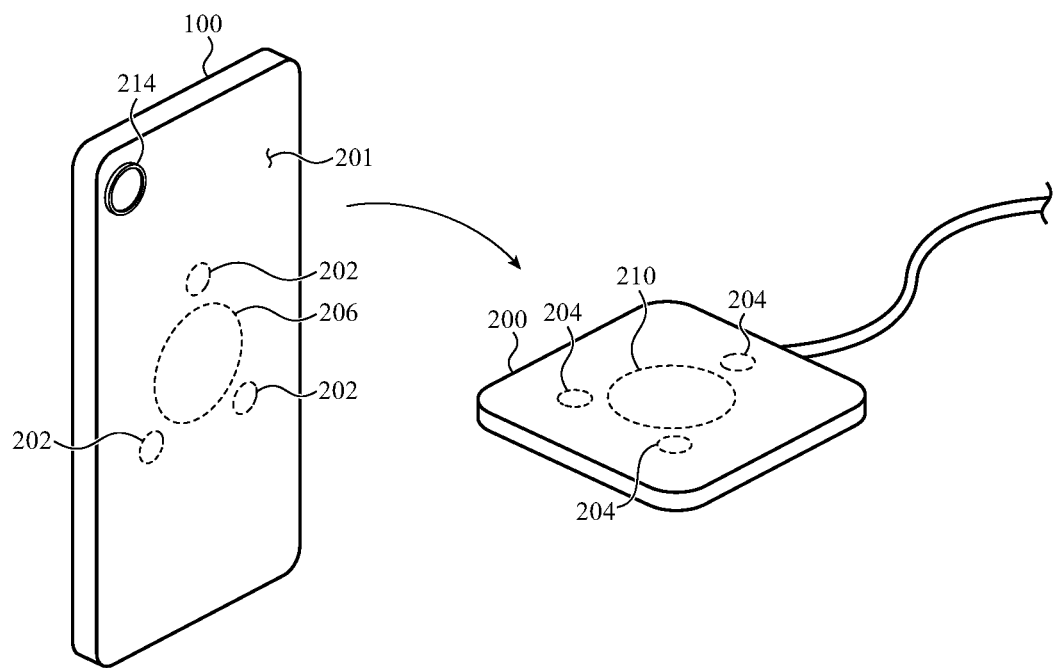
FIGS. 2A-2B depict an example wireless charging system for the device of FIG. 1A.
Figure 2B:
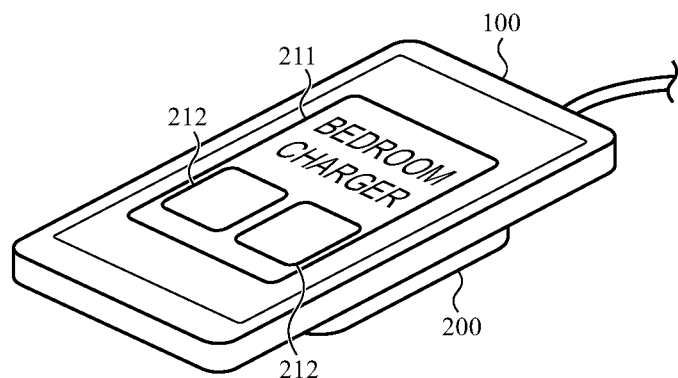

FIGS. 2A-2B illustrate a wireless charging system for the device 100. FIG. 2A, for example, shows a back view of the device 100 and a charging dock 200 that is configured to wirelessly charge the device 100 when the device 100 is placed on the charging dock 200. FIG. 2B illustrates the device 100 positioned on the charging dock 200 in a charging configuration (e.g., with the back surface of the device 100 resting on the upper surface of the dock 200).

The device 100 includes a charging coil 206 within the device 100 and configured to inductively couple to an output coil 210 of the charging dock 200 to charge the device 100. More particularly, the output coil 210 of the charging dock may produce an electromagnetic field, which in turn induces a current in the charging coil 206 of the electronic device, and the induced current may be used to recharge the device's battery.

The device 100 may include a set of magnetic attachment features, such as magnets 202, that are configured to facilitate alignment and retention of the device 100 to the charging dock 200. The charging dock 200 may include a set of complementary magnets (or ferromagnetic materials) 204 that are attracted to the magnets 202 to further facilitate alignment and retention of the device 100 to the charging dock 200. For example, the magnets 202 and complementary magnets (or ferromagnetic materials) 204 may be configured so that when the device 100 is brought into close proximity of the dock 200 by a user (e.g., within 2 cm, 1 cm, or another suitable range), the magnets 202 and complementary magnets 204 pull the device 100 towards the dock 200 and into a position that aligns the output coil 210 of the dock 200 with the charging coil 206 of the device 100. The magnetic attraction may also provide a retention force to hold the device 100 in the aligned position and prevent the device 100 from slipping off the dock 200 during charging. While FIG. 2A describes the device as including magnets 202 and the dock 200 as including magnets or magnetic materials 204, it will be understood that any materials or combinations of materials that are magnetically attracted to one another may be used in either the device 100 or the dock 200. Further, the magnets and/or magnetic materials may be arranged so that the device 100 magnetically couples to the dock 200 in only one orientation. This may further help prevent misalignment and helps ensure that the wireless charging function can operate efficiently. In some cases, other techniques for aligning the device 100 with the dock 200 may be used instead or in addition to the magnets, such as alignment pins and recesses, clips, complementary shaped surfaces, or the like.

In some cases, the dock 200 may include a near-field wireless communication antenna, similar to the antennas 110 described with respect to FIG. 1A. In this way, the device 100 can detect when it has been placed on or is otherwise being held by the dock 200 using the same near-field wireless communication system that it uses to detect the presence of other accessories. (In other cases, the device 100 can communicate with the dock 200 using the charging and output coils or via another wireless protocol or technique.) When the device 100 detects that it is positioned on the dock 200 via the near-field wireless communication system, it may change its mode of operation in a way that is tailored to the dock 200. For example, as shown in FIG. 2A, the device 100 may display a graphical object 211 on the display 104. The graphical object 211 may be an overlay over a blank screen or over a primary graphical user interface of the device 100. The graphical object may include inputs and outputs that are contextually related to the dock 200 and/or the charging operation provided by the dock 200. For example, as shown the graphical object 211 displays a name or description of the dock 200 (e.g., "Bedroom Charger"), as well as inputs 212 that may control one or more aspects of the charging operation. For example, the inputs 212 may allow the user to select different charging modes or different power consumption modes of the device 100.

Other inputs and outputs may also be included instead of or in addition to those shown in FIG. 2B. For example, the graphical object may include inputs and outputs that are relevant to a room where the dock 200 is located. As used herein, a graphical object or graphical user interface may be considered relevant to a location, room, accessory, or the like, if the graphical object or graphical user interface provides access to functions or information that are germane to a context of the location. Thus, for example, if the dock 200 is in a bedroom, the graphical object may include an input for activating or deactivating an alarm. If the dock 200 is in a living room, the graphical object may include an input for controlling audio playback of the device 100 or a connected audio system (e.g., a home stereo or other device). If the dock 200 is in a kitchen, the graphical object may include a recipe interface and one or more timers. If the dock 200 is in a music room, the graphical object may include audio controls and a musical notation interface. In some implementations, an association of an accessory (e.g., a dock) with a particular room is based on an assignment of the accessory to a virtual room in a smart home platform. A smart home platform may include numerous virtual rooms or environments, and devices and/or smart accessories may be associated with particular ones of the rooms and/or environments. For example, devices such as a television, audio system, and wirelessly-controllable lights may be assigned to a "living room" environment. In some implementations, a dock (e.g., the dock 200) is also associated with or assigned to the "living room" environment in the smart home platform. Accordingly, in some implementations, in response to being placed on the dock in the living room, the device detects that the dock is associated with the "living room" environment, and displays graphical objects that are configured to control the devices assigned to the "living room" environment (e.g., the television, audio system, and lights that are in the living room).

While FIGS. 2A-2B show a wireless charging system incorporated in a dedicated charging dock, wireless charging systems analogous to those described with respect to FIGS. 2A-2B may be incorporated into the other accessories described herein. For example, a protective case may include a supplemental battery and an output coil to charge the device 100 when the device 100 is inserted into the case. Similarly, an output coil and alignment magnets may be incorporated into a speaker dock or alarm clock dock to allow the device 100 to charge when the device 100 is positioned on the dock. Also, wireless charging systems may be incorporated into a stand-alone battery accessory that is configured to attach to the device and wirelessly charge the device from the battery. An example battery accessory is described herein with respect to FIGS. 3J-3L.

Figure 3A:
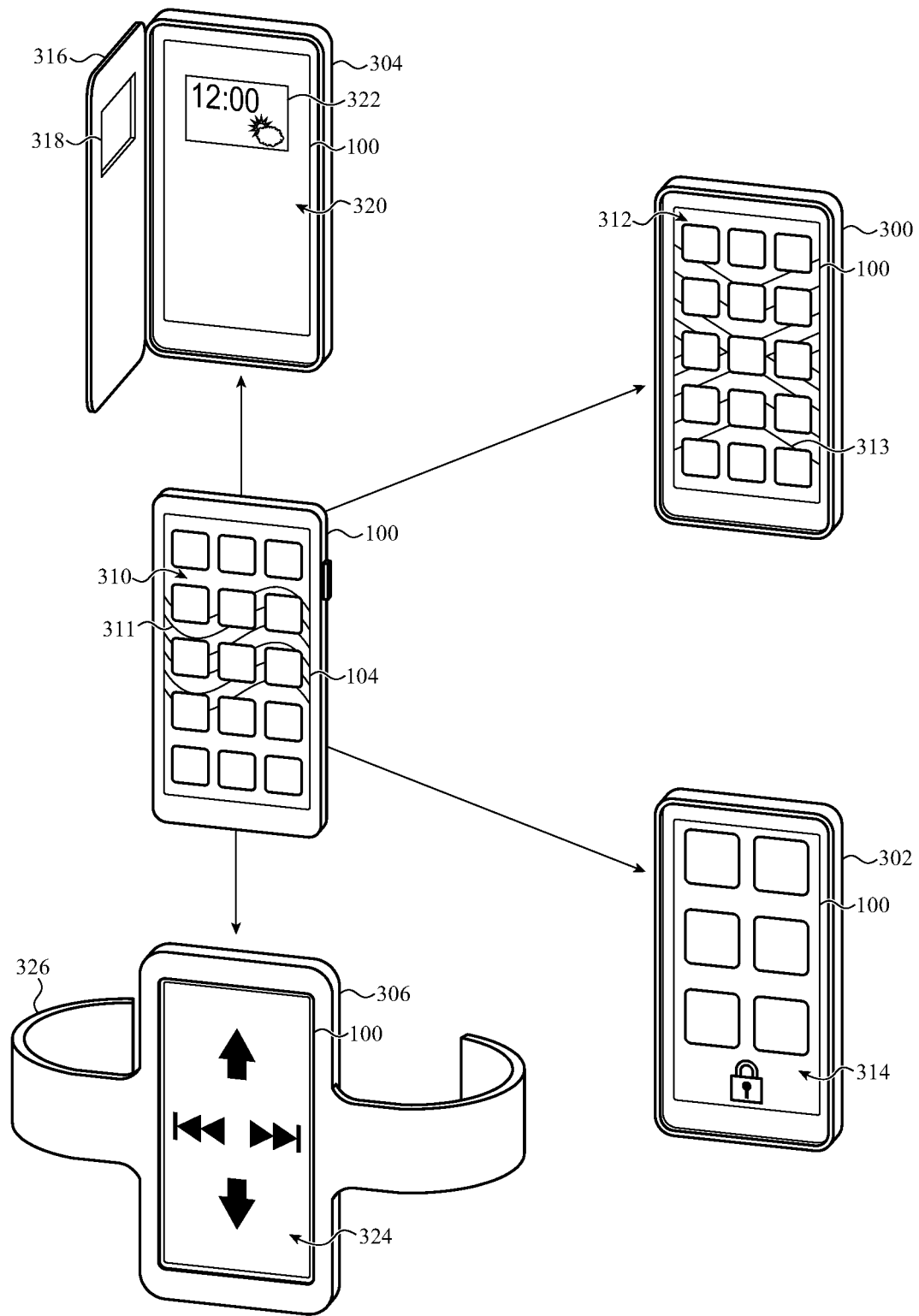
FIG. 3A depicts several example protective cases for the device of FIG. 1A.

As described above, a device 100 may use a near-field wireless communication system to detect that it is being used with an accessory, and to identify that particular accessory. Further, because near-field wireless communication antennas do not need to be powered in order to communicate with or be detectable by the near-field wireless communication system of a device, even simple accessories such as protective cases and simple device stands can trigger the device to change its mode of operation or otherwise modify its behavior. FIG. 3A illustrates several examples of protective cases for a device, such as the device 100. The protective cases shown in FIG. 3A may be embodiments of the protective cases 112 in FIG. 1A. Each protective case in FIG. 3A may include a near-field wireless communication antenna 110, but may lack other circuits or components that interact with the device 100. Thus, even a simple protective case that appears to be nothing more than a single-piece of plastic or rubber may cause the device 100 to change its operation in a different or unique way.

With reference to FIG. 1A, the protective cases in FIG. 3A may each include a shell 124 that defines a cavity 125 in which the device 100 may be positioned. The shell 124 may be configured to at least partially cover the enclosure of the device 100 when the device 100 is positioned in the cavity 125. The shell 124 may further define a back wall 122 that is configured to at least partially cover the back exterior side of the electronic device (e.g., side 201, FIG. 2A) and a side wall 127 configured to at least partially cover the peripheral exterior side 131 of the device 100. The shell 124 may also define a window region 126 configured to allow a user to touch the front exterior side of the electronic device (e.g., the transparent cover 105) when the device 100 is positioned in the cavity 125. The window region 126 may be an open area such that the protective case covers all or substantially all of the back and side surfaces of the device 100, but leaves the transparent cover 105 substantially uncovered (e.g., such that more than 50%, 60%, 70%, 80%, 90%, 95%, or 99% of the front surface of the transparent cover 105 is uncovered).

The walls of the shell 124 (e.g., the back wall 122 and the side wall 127) may be relatively thin. For example, in some cases, each of the walls of the shell 124 have a thickness less than about 4 mm, about 3 mm, about 2 mm, about 1.5 mm, about 1 mm, or any other suitable dimension. The shell 124 may increase the overall size of the device (e.g., the combined size of the shell with the device installed) by a small enough amount that the primary functionality of the device 100 is not fundamentally altered as a result of installing the device 100 in the protective case. For example, if the device 100 is a mobile phone that may be held and operated by a user's hand (e.g., a single hand), the device 100 the same or substantially the same use and/or handling characteristics may be preserved when the device 100 is in the protective case (e.g., it can still be held and operated by one hand). If the device 100 is a tablet that may be held and operated by one or two hands, it may be held and operated in the same or similar way even when it is inserted in the protective case.

Each protective case in FIG. 3A may also include a near-field wireless communication antenna 110 coupled to its shell and configured to cause the device 100 to switch from displaying the first graphical user interface (or graphical output) to displaying a different graphical user interface (or graphical output) in response to the electronic device being positioned in the cavity. FIG. 3A shows how various different examples of protective cases may switch the graphical user interface of the device 100. For example, the device 100 in FIG. 3A that is not in a protective case is shown displaying a first graphical user interface 310. The first graphical user interface 310 may be a default or primary graphical user interface, such as the primary graphical user interface 128, FIG. 1B. In some cases, this graphical user interface 310 may display selectable icons (e.g., application icons that, when selected, cause applications to be executed and/or initialized, or otherwise cause graphical user interfaces associated with the applications to be displayed) or other graphical objects that correspond to applications or other functions of the device 100. The first graphical user interface 310 may also have a background image 311. The background image 311 may also be referred to as a wallpaper, and may be an image that is graphically behind the application icons of the graphical user interface. In some cases, the first graphical user interface 310 may act primarily as an application selection screen. (The device 100 may also have a "lock screen" or "wake screen" that is displayed when the display is active but the device 100 is locked. The lock screen may also have a background image, which may also be referred to as a wallpaper.

The case 300 may be configured to cause the device 100 to cease displaying a first graphical output (e.g., the first graphical user interface 310) and instead display a second graphical output 312 that is different than the first graphical output. As used herein, a second graphical user interface or graphical output may refer to any graphical user interface or graphical output that is different from the first graphical user interface or graphical output.

When the device 100 is placed in the case 300, the near-field wireless communication system 106 of the device 100 detects the near-field wireless communication antenna of the case 300 in close proximity to the device 100 (e.g., within about 10 cm, 5 cm, 2 cm, or the like), and receives information from or about the case 300 from the antenna. The antenna may communicate an executable command to the device 100, or it may communicate data that the device uses to select or lookup a command or routine or otherwise determine how to change its operation.

The graphical output 312 that is initiated by the case 300 may include the same application icons and provide the same functions as the first graphical user interface 310, but have a different background image 313. Thus, when the user installs the device 100 into the case 300, the device 100 may automatically transition to a different background image. In some cases, the different background image 313 is a modified version of the background image 311. For example, a hue, saturation, color balance, or other image property of the background image 311 may be modified to produce the different background image 313.

The different background image 313 may relate in some way to the case 300. For example, if the case 300 is blue, the background image 313 may be blue, or if the case 300 has a rainbow decoration on it, the background image 313 may be a rainbow. Accordingly, the graphical user interface 310 may change or morph to graphically match or coordinate with the case 300. In this way, a user can switch between cases having different colors, designs, appearances, or the like, and the appearance of the graphical output of the device 100 will automatically change based on the case to which it is coupled.

In addition to or instead of changing the background image, the device 100 may display a second graphical output that includes the same icons and background image as a primary graphical user interface, but has a different color scheme. A color scheme for a graphical user interface may include particular colors for backgrounds, application icons, status bars, informational icons, and the like. The color scheme of the second graphical output may match or otherwise correspond to a color of an exterior surface of accessory (e.g., the case 300) in which the device 100 is installed. For example, if the accessory is yellow, the second graphical output may include graphical elements that have the same or similar yellow color as the case. Notably, these elements may have a different color when the device 100 is not installed in the case. In some cases, at least one graphical element of the second graphical output has the same color as the accessory.

Other changes to the graphical user interface 310 (or other graphical outputs displayed by the device 100) are also contemplated. For example, instead of or in addition to switching to a different background image, the device 100 may change the arrangement of its icons, or the content or appearance of a lock screen, change an overall color scheme of the graphical user interface and/or background image, or the like.

Another case, such as the case 302, may have an antenna that causes the device 100 to transition from the first graphical user interface 310 to yet another graphical user interface 314 (e.g., a second graphical user interface). The graphical user interface 314 may be a restricted environment that reduces or otherwise changes the number or type of available application icons, optionally changes the size of the icons, and locks the interface so that a user cannot leave the restricted environment without a password or other type of authentication. In addition to changing the graphical user interface, other aspects of the device operation may be modified or changed. For example, notifications (e.g., ringer sounds, message previews, etc.) may be turned off or changed to a different mode (e.g., where message content previews are not displayed). As another example, access to media stored on the device 100 may be restricted or limited, such as restricting movies or songs based on a rating. In this way, the case 302 may be especially suited for use when the device 100 is being given to a child or friend for temporary use, where the owner of the device 100 may wish to limit access to certain applications or functions.

Where the case 302 acts as a child-focused case, the case 302 itself may include physical features that may be useful for a device being used by a child. For example, the case 302 may have extra padding or other protection to prevent damage during falls, sealing to prevent damage from spills, clear screen covers to prevent damage to or soiling of a transparent cover, grips or other features to facilitate being held by smaller hands, or the like.

Another example case 304 may have an antenna that causes the device 100 to display a graphical user interface or other graphical object that is coordinated with a physical feature in the case itself, such as an opening in the case. For example, the case 304 includes a front cover 316 that a user can open or close over the front of the device 100. The front cover 316 may include a window 318 that allows a portion of the display of the device 100 to be viewed when the front cover 316 is closed. When the device 100 detects that it is being used with the case 304 and that the front cover 316 is closed, it may transition from the first user interface 310 to another graphical user interface 320 that includes a graphical object 322 that is positioned so that the graphical object 322 is aligned with and/or visible through the window 318. The graphical object 322 as shown includes the current time and weather, though any other information or image may be included instead of or in addition to that shown. Further, the graphical object 322 may be remain displayed even when the front cover 316 is closed and after the display of the device 100 would otherwise have turned off (e.g., to save power). The device 100 may detect that the front cover 316 of the case 304 is closed using any suitable technique. For example, the device 100 may detect that the front cover 316 is closed by detecting that a front-facing camera has been occluded, using a second near-field wireless communication antenna in the front cover 316, or any other suitable technique.

Because the case 304 has a front cover 316, the device 100 may be more occluded or covered when it is in the case 304 than it would be in other, open-front cases (e.g., the case 300). Accordingly, when the device 100 detects that it is inside the case 304, it may change other settings or functions of the device as well. For example, it may increase an alert volume to account for the muffling or volume attenuation of the case 304. As another example, the device 100 may decrease an alert volume or turn off alerts entirely, as the user may use the case 304 when they intentionally want to silence the device 100. The device 100 may also change how it provides graphical or visual notifications, such as by displaying them in the area of the window 318 so that they are visible when the front cover 316 is closed. Indeed, as with any other accessory described herein, the user may customize how the device 100 changes in operation when it is used with an accessory. For example, the user may select what graphical user interface should replace the primary user interface (e.g., an array of application icons), what devices settings should change, and the like. While the case 304 is shown as having a front cover that can open and close, other types of cases may have windows and operate in a manner similar to the case 304 (e.g., a sleeve-type case with a window on one side of the sleeve).

Another example case 306 may be designed to hold the device 100 during exercise or other physical activity. The case 306, for example, includes a strap 326 for attaching the case 306 and device 100 to a user (e.g., to the user's arm or wrist). When the device 100 detects that it has been inserted into the case 306 (e.g., when the device 100 detects that it is close proximity to the antenna of the case 306), the device 100 may transition to a graphical user interface 324 that is tailored for use during exercise. For example, because devices such as smartphones are often used as audio players during exercise, the graphical user interface 324 may include large audio control buttons that are easy to see and press even during exercise (e.g., buttons that are responsive to touch inputs in an area about one square inch or greater). The device 100 may also suggest music or audio (e.g., a workout playlist) in response to detecting the case 306. The device 100 may also change a device setting to accept or respond to different types of inputs than it does in a normal operating mode. For example, the device 100 may be configured to skip a song when a user knocks on or bumps the device 100, and change a volume of an audio output when the user swipes the palm of their hand up or down along the front surface of the device. The device 100 may change its settings to respond to other types of inputs as well.

While FIG. 3A illustrates four example cases that may trigger device changes using a near-field wireless communication antenna, other types of cases may also be provided. For example, a case for use when camping, hiking, or other outdoor activities may be configured to cause the device 100 to enter a power-saving mode or change device settings to help conserve power (e.g., reducing screen brightness, turning off cellular radios and WIFI radios, or the like). Such a case may also replace a conventional lock screen or the primary graphical user interface with a set of icons for features or applications that are relevant to outdoor activities. For example, the device 100 may display large buttons to activate a flashlight function, a compass function, a map or positioning application, and a weather application. As noted above, the particular buttons that are displayed may be selected by a user based on his or her preferences when using that particular case.

As another example, a rugged case may be provided for when the device 100 is being used in work environments or during outdoor activities such as hiking, camping, fishing, boating, skiing, rock climbing, or the like. Such a case may be ruggedized or otherwise be configured to provide a greater degree of physical protection to the device, and may be configured to cause the device 100 to replace a conventional lock screen or the primary graphical user interface with a set of icons for features or applications that are relevant to a particular activity or work environment. For example, the device 100 may display buttons to activate a flashlight function, a level function, a camera application, and a walkie-talkie function. As noted above, the particular buttons that are displayed may be selected by a user based on his or her preferences when using that particular case.

As another example, a case may cause the device to change a background image or wallpaper to match or coordinate with a separate object. For example, a case may change a background image or wallpaper to match or coordinate with the fabric of a handbag, backpack, purse, or other object that the device and case are being used with. If the case is intended to be used when the device is being carried in a bag, backpack, or purse, the case may also cause the device to increase a ringer volume and/or a tactile notification amplitude to help a user hear or feel device notifications through the bag.

Figure 3B:
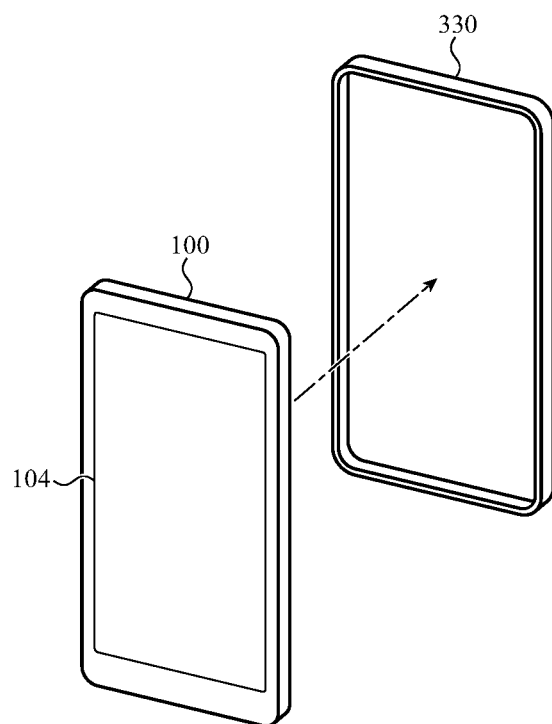
FIGS. 3B-3C depict the device of FIG. 1A being used with an example protective case.
Figure 3C:
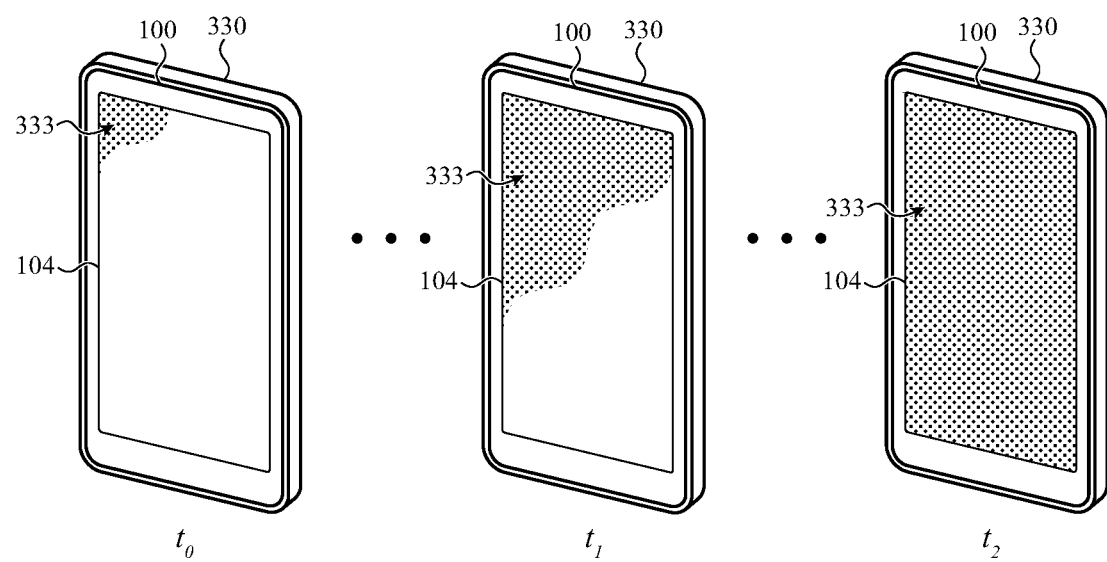

FIGS. 3B-3C illustrate an example of the device 100 being used with an accessory case 330, in which the device 100 displays, on its display 104, a color effect in response to being placed in a cavity 331 of a protective case 330. In particular, as described herein, the device 100 detects, with its near-field wireless communication system, that it is in close proximity to the case 330, and receives information about the case to determine what color effect to display.

FIG. 3C depicts an example color effect 333 that may be produced in response to the device 100 detecting that it is being used with the case 330. The color effect depicted in FIG. 3C may appear as a wash of color that sweeps across the display 104. The color effect 333 may be any visible change in a characteristic of the graphical output of the display 104. For example, if the display 104 is displaying a background image, the color effect 333 may be a change in the hue, tint, shade, tone, saturation, etc., of the background image. The color effect may also be an image, pattern, or the like. The color effect 333 may have a visual relevance to the color or use of the protective case 330. For example, the color effect 333 may match or be similar to the color of the case 330. As another example, the color effect 333 may have a contextual relevance to the use of the case, such as a ruggedized case for outdoor use causing the color effect 333 to have a camouflage appearance.

Returning to FIG. 3C, at time to, the color effect 333 may appear on the display 104. At time $t_1$, the color effect 333 (a border of the color change) has moved a distance across the display 104, and at time $t_2$, the color effect 333 has moved fully across the display 104. This may be the end of the color effect 333 (e.g., the color change persists until the device 100 is removed from the case or another event occurs), or the color effect 333 may continue with additional changes. For example, the "wash" of color may fade away or continue to move across the display 104 until it is gone and the original, unaltered graphical output (e.g., before time to) is once again displayed by the display 104. In cases where the color effect 333 (e.g., the change of color of the graphical output) persists until the device 100 is removed from the case 330, the color effect animation shown in FIG. 3C may be reversed in order to return the graphical output to the original, unaltered color (e.g., the color effect may animate from $t_2$ to $t_0$, instead of from $t_0$ to $t_2$).

The color effect 333 shown in FIG. 3C may be displayed while other graphical objects or graphical user interfaces are being displayed by the display 104. For example, the display 104 may display icons associated with a main or primary user interface of an operating system of the device. The icons may appear to be in front of (or on top of) a background image. The color effect 333 may affect any portion or segment of the graphical output on the display 104. For example, the color effect 333 may result in visual changes to both the background image and the icons of a graphical user interface, or it may result in visual changes to the background image but not the icons of a graphical user interface, or to the icons but not the background image. The color effect 333 may also be displayed in conjunction with user interfaces other than the main or primary user interface. For example, the color effect 333 may be displayed while a graphical user interface of an application (e.g., a program that is executed by or on the operating system) is being displayed.

The graphical user output that is displayed when the color effect 333 is not present may be considered a different graphical output than that which is displayed when the color effect 333 is present. Stated another way, when the color effect 333 is not present, the device may be considered to be displaying a first graphical output, and when the color effect 333 is present (even transiently), the device may be considered to be displaying a second graphical output. These are merely examples of the ways in which a color effect 333 may affect the appearance of the graphical outputs on the display 104, and others are also contemplated.

FIG. 3D illustrates an example of the device 100 being used with an accessory case 334, in which the device 100 displays a graphical output that is coordinated with a physical feature in the case 334 itself, such as an opening in the case. For example, similar to the case 304, the case 334 defines a window 336 that allows a portion of the display 104 of the device 100 to be viewed when the device 100 is in the case 334. When the device 100 detects that it is being used with the case 334 (e.g., using the near-field wireless techniques described herein), the device 100 may transition from displaying a first graphical output 337 (which may be main or primary graphical user interface, a graphical user interface of an application, or the like) to displaying another graphical output, such as a graphical object that is aligned with and/or visible through the window 336.

The case 334 may define an opening 335 along a side of the case 334 to allow the device 100 to be slid into the case 334. The opening 335 may be the only opening that is configured to allow the device to be put into the case 334. While the opening 335 is shown on the side of the case 334 that has the smallest area, the opening 335 may be along a different side of the case 334 in other implementations (e.g., a long side 377) of the case 334.

FIG. 3E illustrates the device 100 inserted into the case 334. Once the device 100 detects that it has been inserted into the case 334 or is otherwise being used with the case 334, (e.g., with near-field wireless techniques), the device 100 transitions from displaying the first graphical output 337 (e.g., a primary graphical user interface) to displaying a second graphical output 344. The second graphical output 344 is different than the first graphical output 337, and, as shown, includes a graphical object having a size, shape, and position on the display 104 that coordinates with the window 336. Notably, the graphical object of the second graphical output 344 may appear out-of-place or may impede the display of the main graphical user interface if the device 100 were not in the case 334. The second graphical output 344 as shown includes the current time 376, a message notification icon 338, and a call notification icon 339, though any other types of icons or information may be included. The message and call notification icons may also include a number of unread or recent messages or calls, thus enabling a user to quickly access information that might be useful to see without having to remove the device 100 from the case 334.

FIG. 3F illustrates the device 100 inserted into the case 334, with the device 100 displaying a third graphical output 345. The third graphical output 345 may include a graphical object that is used in place of the second graphical output 344. The particular content, arrangement, appearance, or other property of the graphical object(s) displayed in the window 336 may be user selectable or configurable. For example, a user of the device 100 may select whether the second or third graphical output 344, 345 is displayed when the device 100 is inserted into the case 334. The third graphical output 345 may include the current time 340, a weather indicator 393 (which may display a graphical depiction of the current weather), a day/date indicator 342, and a notification indicator. The notification indicator may signal that a new notification is available for the user. The notification may indicate, for example, that an event has occurred on the device 100 (e.g., a voice message has been received, an incoming call was missed, an application has issued a notification or message, a text or email message has been received, etc.). The content of the third graphical output 345 may be configured to convey information more succinctly and efficiently than a conventional graphical user interface. For example, instead of indicators that differentiate between different types and amounts of recently received messages, the graphical output 345 includes the notification indicator 341 that relates to multiple different kinds of messages. This type of streamlined graphical output may improve the functionality of the device 100 by allowing the user to interact with the device in different ways under different circumstances or use cases. For example, instead of requiring a user to remove the device 100 to check for messages or to see the time, the user can simply glance at the device 100 through the window 336 to see the desired information. Further, while the same information may also be displayed in a main or primary user interface, the main or primary interface may show the information in smaller or less easily-viewable forms. As such, displaying the information in a more efficient, readable form improves the overall usability of the device and the usefulness of the device 100 when it is in the case 334.

As noted above, various types of accessories may be configured to use near-field wireless communication systems to affect the operational modes and/or characteristics of devices that are using those accessories. FIGS. 3A-3F, for example, illustrate examples where the accessory is a protective case for a device. Another type of accessory may be configured to mount to the device and/or a protective case of the device (e.g., on a back surface of the device or case). FIGS. 3G-3I illustrate one such example accessory.

FIG. 3G depicts a device 346 (which may be in a protective case) and a card wallet accessory 347 that is configured to be removably attached to a surface 351 (e.g., a back surface) of the device 346. The device 346 may be or may be an embodiment of the device 100, and may be the same as or similar to the device 100.

The card wallet accessory 347 may include a near-field wireless communication antenna 348 that is detectable by the near-field wireless communication system of the device 346. The card wallet accessory 347 may define a first opening 358 that is configured to allow an object (e.g., a bank card 350) to be placed into and removed from an internal cavity of the card wallet accessory 347. The card wallet accessory 347 may also define a second opening 349, which may allow the contents of the card wallet accessory 347 to be visible to a user and may also allow the user to touch the contents of the card wallet accessory 347 in order to slide the contents out of the card wallet accessory 347. The card wallet accessory 347 may also include magnetic attachment features 359 that are configured to removably attach the card wallet accessory 347 to the device 346 via complementary magnetic attachment features 360 of the device 346. The magnetic attachment features 359, 360 may include magnets, ferromagnetic materials, or the like. In some cases, the device 346 may include a metal plate or sheet so that the card wallet accessory 347 may be positioned anywhere along the surface 351.

FIG. 3H shows the card wallet accessory 347 removably attached to the surface 351 of the device 346. As described for other near-field wireless enabled accessories, in response to detecting that the card wallet accessory 347 has been attached to the device 346, the device 346 may take an action or change a mode of operation. In the case of attaching the card wallet accessory 347, the device 346 may log a location of the device when the card wallet accessory 347 was attached, or display a graphical object (e.g., a notification object that overlies a portion of a graphical user interface) acknowledging that the card wallet accessory 347 has been attached. In some cases, instead of or in addition to detecting the card wallet accessory 347, the device 346 may detect the contents of the card wallet accessory 347. For example, a bank card may include a near-field wireless communications antenna that the device 346 can detect. In such cases, in response to detecting that the card wallet accessory 347 has been attached, the device 346 may determine the identify of any near-field wireless enabled cards in the card wallet accessory 347 and provide an indication to the user of the contents. As a particular example, a name, icon, or other indicator of each card in the card wallet accessory 347 may be displayed on the device's display so that a user can easily see what cards are available just by viewing the display.

In the case where the device 346 can detect the presence or proximity of cards or other objects in the card wallet accessory 347, it can also take certain actions in response to detecting that a card has been removed from the card wallet accessory 347. FIG. 3I illustrates an example in which a bank card 350 has been removed from the card wallet accessory 347. In response to detecting the removal, the device 346 displays one or more graphical objects that are relevant or related to the removed card 350. For example, the device 346 may display a first graphical object 352, which may be an image of the particular bank card 350 that was removed. The device 346 may also display a second graphical object 353, which may be a recent purchase history associated with the bank card 350. Other types of information and/or graphical objects may be displayed instead of or in addition to those shown in FIG. 3I.

In other cases, the device 346 may take other actions, initiate other applications, or display other types of graphical objects in response to detecting that a card (or the card wallet accessory 347) has been removed from the device 346. For example, the device 346 may launch a wallet application or a finance application. As another example, the device 346 may open an application based on the location of the device 346 when the card is removed. More particularly, because the removal of the bank card 350 may indicate that the user is about to make a purchase, the device 346 may determine if its location at that time corresponds to a store and may open an application associated with that store. As yet another example, the device 346 may determine if there are any available coupons, deals, rewards, or other offers that are associated with stores near the user when the card is removed. As yet another example, the device 346 may associate a geographical location with the removal event, as described herein with respect to FIG. 3O-3P.

FIGS. 3J-3L illustrate another example accessory that is configured to mount to a device and/or a protective case of the device (e.g., on a back surface of the device or case). In particular, FIGS. 3J-3L depict a device 354 (which may be in a protective case) and a battery accessory 355 that is configured to be removably attached to a surface 357 (e.g., a back surface) of the device 354. The device 354 may be or may be an embodiment of the device 100, and may be the same as or similar to the device 100.

The battery accessory 355 may include a near-field wireless communication antenna 356 that is detectable by the near-field wireless communication system of the device 354. The battery accessory 355 may be configured to charge a battery of the device 354 and/or otherwise provide power to the device 354. The battery accessory 355 may provide power to the device 354 via a cable, or it may include a wireless charging system comprising an output coil configured to inductively couple to a charging coil of the electronic device 354 when the battery accessory 355 is removably attached to the device 354.

The battery accessory 355 may also include magnetic attachment features 362 that are configured to removably attach the battery accessory 355 to the device 354 via complementary magnetic attachment features 363 of the device 354. The magnetic attachment features 362, 363 may include magnets, ferromagnetic materials, or the like. The magnetic attachment features 362, 363 and the charging coils of the battery accessory 355 and the device 354 may be embodiments of the corresponding components described with respect to FIGS. 2A-2B.

FIG. 3K shows the battery accessory 355 removably attached to the surface 357 of the device 354. As described for other near-field wireless enabled accessories, in response to detecting that the battery accessory 355 has been attached to the device 354, the device 354 may take an action or change a mode of operation. In the case of attaching the battery accessory 355, the device 354 display a graphical object (e.g., a notification object) providing information about the battery accessory 355 and/or its operation with respect to the device 354.

FIG. 3L, for example, illustrates an example graphical object 364 that may be displayed by the device 354 in response to the device 354 detecting that the battery accessory 355 has been attached to the device 354. The graphical object 364 may be displayed as a box that overlies another graphical user interface, application, or the like, and may disappear after a certain time or be dismissed by the user. The graphical object 364 may display information such as a battery charge level of the battery accessory 355 and an estimated time it will take for the battery accessory 355 to fully charge the device 354 (as shown in FIG. 3L). Other information may also be displayed, such as a name or nickname of the battery, a name of an owner of the battery, a battery health of the battery accessory 355, a predicted charge level of the device 354 if the battery accessory 355 remains on the device 354 for a certain period of time (e.g., 1 hour=60% charge; 2 hours=100%), or any other suitable information.

The device 354 may also initiate actions in response to detecting the removal of the battery accessory 355. For example, the device 354 may display a graphical object (which may be similar in appearance and function to the graphical object 364, and may include a remaining charge of the battery accessory 355, an amount of charging time that the battery accessory 355 will require for a full charge. As another example, the device 354 may associate a geographical location with the removal event, as described herein with respect to FIG. 3O-3P.

Figure 3M:
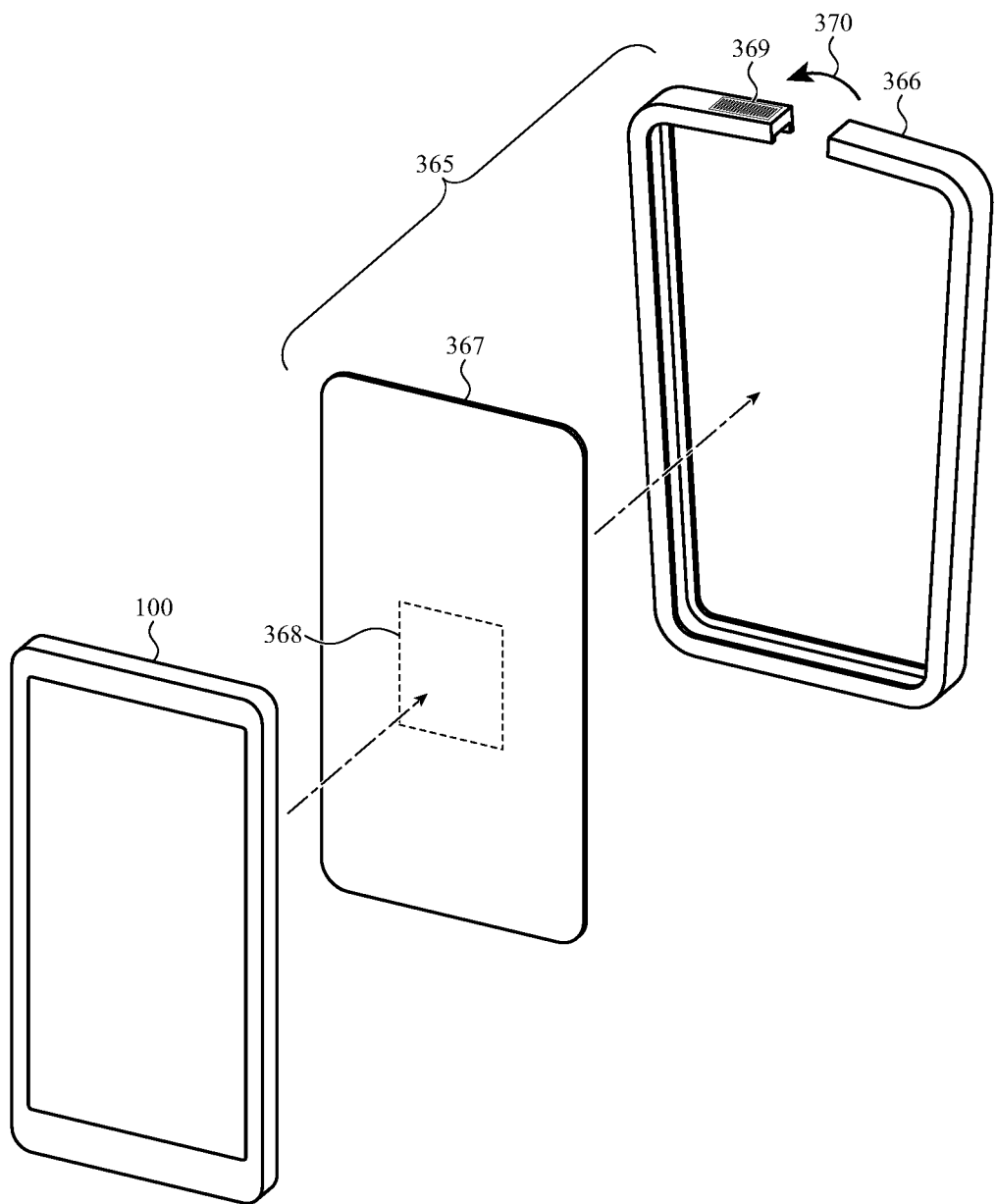
FIGS. 3M-3N depict the device of FIG. 1A being used with another example protective case.
Figure 3N:
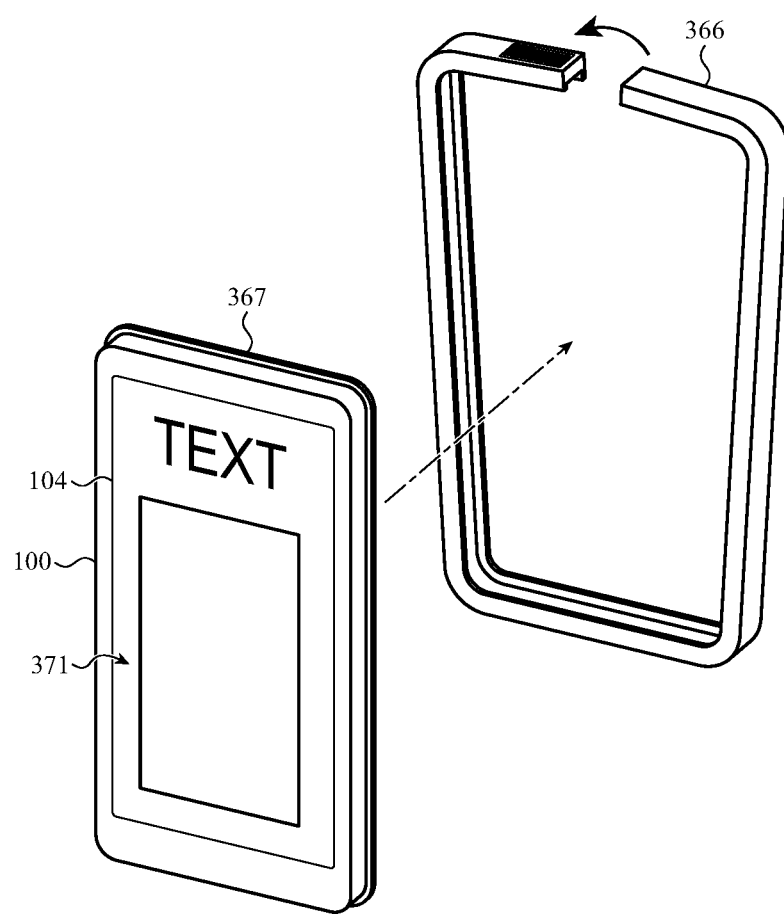

FIGS. 3M-3N illustrate an example in which a device detecting a particular type of case may cause the device to display information relevant to that case. For example, as shown in FIGS. 3M-3N, a case 365 may include multiple pieces or components that need to be assembled in a particular way in order to secure the case to the device. Accordingly, the case 365 may include a near-field wireless communication antenna so that the device can detect when the case 365 is being used and provide assembly instructions and/or other information to the user.

As shown in FIG. 3M, the case 365 includes a back member 367 and a peripheral member 366. The back member 367 is configured to cover and protect the back of the device 100, while the peripheral member 366 protects the sides of the device and holds the back member 367, the device 100, and the peripheral member 366 together. The back member 367 may include a near-field wireless antenna 368 that is detectable by the device 100, as described herein. The peripheral member 366 may have a seam or discontinuity to allow the peripheral member 366 to expand to accept the device 100 and the back member 367. To secure the case 365, the peripheral member 366 may be closed by closing the seam or discontinuity as indicated by arrow 370. The peripheral member 366 may also include a latch member 369 that secures the peripheral member 366 in the closed configuration.

FIG. 3N illustrates the case 365 in an initial stage of assembly. In particular, the device 100 may be placed on the back member 367, which may result in the near-field wireless communication antenna 368 of the back member 367 being detected by the near-field wireless communication system of the device 100, which in turn causes a graphical output 371 to be displayed on the display 104 of the device 100. The graphical output 371 may include any suitable text and/or graphical content. In some implementations, the graphical output 371 includes assembly instructions for the case 365. For example, the graphical output 371 may illustrate how to close the seam and secure the latch member 369 to lock the peripheral member 366 around the back member 367 and the device 100. In some cases, the latch member 369 may include a near-field wireless communication antenna, and the device 100 may be able to detect when the latch member 369 is in a latched or secured position. In response to detecting that the latch member 369 is in the latched or secured position, the device 100 may display a graphical object indicating to the user that the case has been properly and/or completely assembled.

Instead of or in addition to displaying assembly instructions, the device 100 may display other graphical objects or graphical user interfaces, or otherwise change its mode of operation, in response to detecting that it is being used with the case 365. For example, the case 365 may be a ruggedized case that is intended for use during outdoor recreational activities. Accordingly, the device 100 may initialize a fitness application, GPS application, or other application that reflects a probable upcoming activity of the user. As described above, the device 100 may use other sensors or information to determine what (if any) applications or operational modes to initiate while the device 100 is in the case 365. For example, if the device 100 detects that the ruggedized case 365 is being attached to the device 100 proximate a trailhead, the device 100 may initiate an application associated with hiking (e.g., a GPS application, a fitness tracking application, or the like). If the device 100 detects that the ruggedized case 365 is being attached to the device 100 proximate a downhill ski facility, the device 100 may initiate an application associated with skiing (e.g., a ski tracking application, a map of the ski facility, or the like).

Figure 3O:
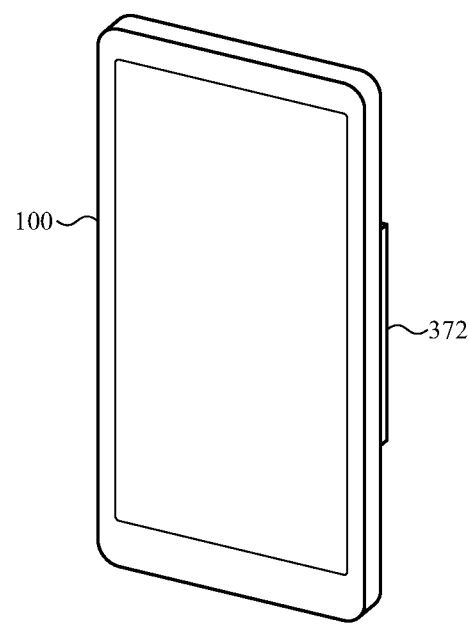
FIGS. 3O-3P depict the device of FIG. 1A being used with another example removable accessory.
Figure 3P:
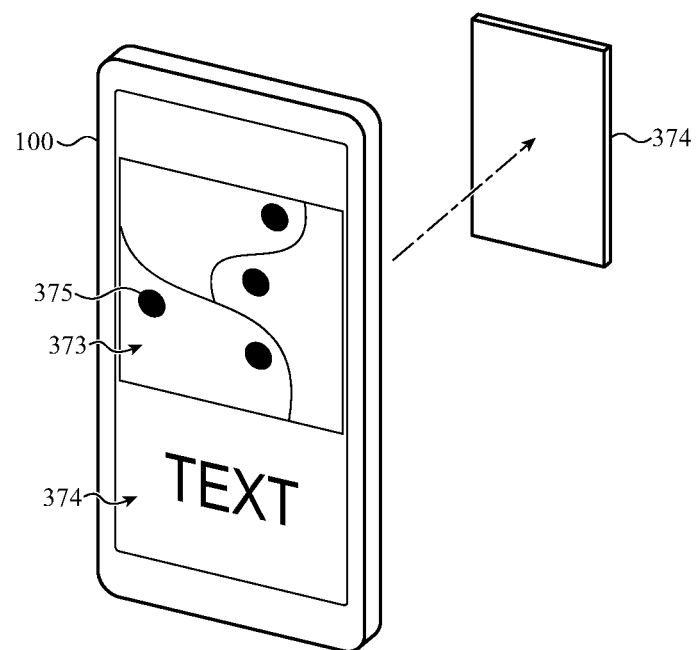

As described above with respect to the card wallet accessory and the battery accessory, a device may take certain actions upon detecting the removal of an accessory from the device (or upon removal of the device from a case, dock, or any other accessory). For example, the device may log the location of the device when the accessory was removed. This information may be helpful for alerting the user to unintended detachments of accessories and finding lost accessories. FIGS. 3O-3P depict a device 100 being used with an accessory 372 (which may represent the card wallet accessory 347, the battery accessory 355, or any other near-field wireless enabled accessory).

FIG. 3O shows the accessory 372 and the device 100 attached. When the accessory 372 is removed from the device 100 (or the device 100 and accessory 372 are decoupled), the device 100 may detect the removal by detecting the absence of the near-field wireless antenna of the accessory 372. In response to detecting the removal of the accessory 372, the device 100 may save information about the removal event. For example, the device 100 may determine the location of the device at the time of the removal of the accessory 372, and a time of the removal of the accessory 372. In some cases, the device 100 will display this (or other) information to the user upon removal. For example, as shown in FIG. 3P, the device 100 may display a map 373 with a graphical indicator 375 representing the location where the accessory 372 and the device 100 were separated. The device 100 may also display textual information 374. In some implementations, the textual information 374 provides text indicating the location (e.g., an address, latitude/longitude coordinates, or the like), the time of removal, and optionally other information.

The information about the removal of the accessory 372 may be displayed to the user substantially immediately after detecting the removal event, or it may not be displayed and instead be logged for later retrieval and/or viewing by the user. In either case, the information may be stored so that the user can retrieve and view the information as needed.

Figure 4:
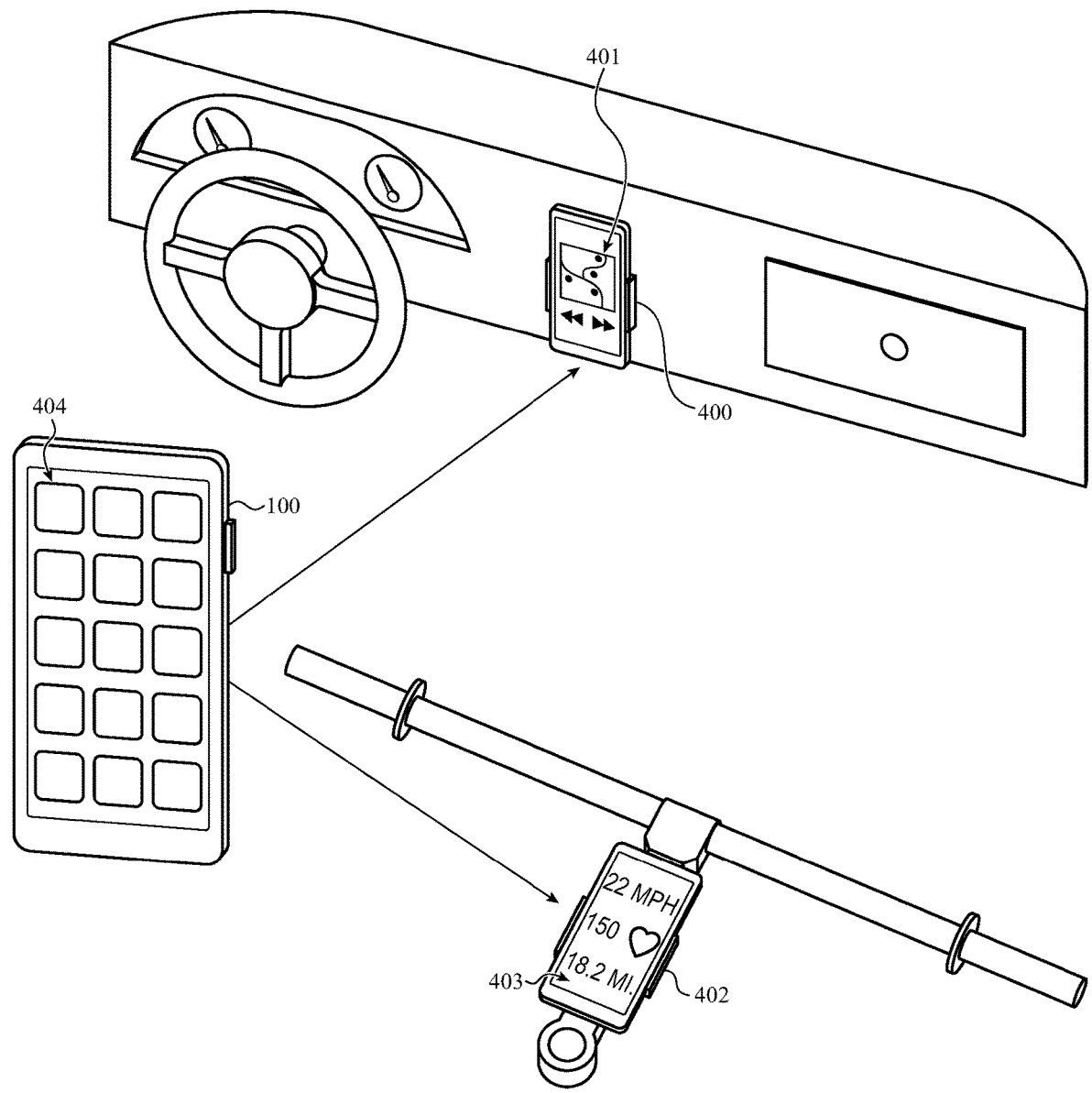
FIG. 4 depicts several additional example devices holders for the device of FIG. 1A.

FIGS. 3A-3P show examples of protective cases and other accessories that use a passive antenna to change an operational mode of an electronic device when used with the device. Similar principles may apply to device holders that are configured to hold or support a device during an activity. FIG. 4 illustrates two examples of device holders or docks that may include near-field wireless communication antennas to change the operational mode of the device 100.

FIG. 4 illustrates the device 100 while displaying a first graphical user interface 404, which may be the primary graphical user interface of the device 100, such as graphical user interface 128 (FIG. 1B). FIG. 4 also shows the device 100 mounted to a dock 400 in a car. The dock 400 may include a near-field wireless communication antenna that causes the device 100 to switch from displaying the first graphical user interface 404 to displaying a second graphical user interface 401 that is tailored for use while driving (e.g., the device may cease displaying the first graphical user interface and begin displaying the second graphical user interface). As with the other accessories described herein, the transition may be automatic and seamless to the user—simply placing the device in the dock 400 (e.g., so that the device is positioned on or held by the dock) may cause the device 100 to transition to the car-specific graphical user interface.

The graphical user interface 401 may include audio controls that are large and easy to see and touch while the user is driving. The graphical user interface 401 may also include a map or navigation view. In some cases, the graphical user interface 401 may include large, easy to read icons for various different applications or functions (e.g., radio, telephone, map, messages, etc.). The device 100 may also change other device settings as a result of detecting that it has been mounted to the dock 400. For example, the device 100 may enter a "do not disturb" mode that may reduce the possibility of distraction while driving. This may turn off message notifications (e.g., text messages, emails, application notifications, etc.) so that the user is not tempted to type responses or read text-based messages while driving.

FIG. 4 also illustrates the device 100 mounted to a dock 402 on a bicycle. The dock 402 may include a near-field wireless communication antenna that causes the device 100 to cease displaying the first graphical user interface 404 and instead display a second graphical user interface 403 that is tailored for use while cycling. For example, the graphical user interface 403 is displaying a speed, a heart rate, and a distance travelled. In some cases, placing the device 100 in the bike-mounted dock 402 may cause the device 100 to initiate an application, such as an activity tracking application, a biometric monitoring application (e.g., a heart-rate monitor), a map or positioning application (e.g., a GPS application), or the like. In some cases, placing the device 100 in the bike-mounted dock 402 (or other exercise-related dock or accessory, such as a dock on a running stroller or stationary bike, or arm-mounted carrying case) causes the device 100 to display an affordance that, when selected by a user, causes the device to begin recording a workout associated with the exercise equipment associated with the dock (e.g., an outdoor bike ride, a run, an indoor bike ride). As another example, placing the device 100 in the bike-mounted dock 402 (or other exercise-related dock or accessory) causes the device 100 to display a list of multiple affordances (e.g., outdoor bike ride, indoor bike ride, outdoor run, etc.) from which a user may select to initiate a workout recording.

Accordingly, the graphical user interface 403 may be the graphical user interface of that particular application. In some cases, the graphical user interface 403 does not correspond to any single application, but instead displays outputs from various different applications or functions that are being executed by the device. For example, the speed output and the distance travelled may be provided by a GPS or cycling-specific application, while the heart rate output is provided by a biometric monitoring function or application. The graphical user interface 403 may use the data from these applications without executing or displaying the dedicated graphical user interfaces of those applications.

While the graphical user interface 403 is shown as having only outputs, it may also or instead include selectable inputs, such as audio controls that are large and easy to see and touch while the user is riding, large icons for various different applications or functions (e.g., radio, telephone, map, messages, etc.). The device 100 may also change other device settings as a result of detecting that it has been mounted to the dock 402. For example, the device 100 may enter a "do not disturb" mode that may reduce the possibility of distraction while cycling. This may turn off (or mute) message notifications (e.g., text messages, emails, application notifications, etc.) so that the user is not tempted to type responses or read text-based messages while cycling. In some implementations, when the device 100 is being used with other docks and/or accessories, such as home-based docks, protective cases, charging docks, wallet accessories, auxiliary batter accessories, etc., message notifications are not turned off or muted (e.g., they are displayed or otherwise provided to the user).

The device 100 may be mounted to other types of docks. For example, the device 100 may be mounted to docks that are integrated with or otherwise associated with exercise equipment such as stationary bicycles, rowing machines, elliptical machines, stair-climbing machines, or the like. When mounted to exercise equipment, the device 100 may detect the type of exercise equipment it is mounted to and initiate a coaching application or service that is relevant to that particular equipment. The device 100 may also use additional information to determine what type of coaching application or service to use, or whether to display a user interface that does not include a coaching service or interface. For example, the device 100 may use the device's location to determine if it is mounted to the user's home stationary bike or a stationary bike at a fitness studio. If it is mounted to the home stationary bike, the device 100 may initiate a coaching application or service, and if it is mounted to a bike at a fitness studio, the device may not initiate the coaching application (reflecting the fact that the fitness studio may have live coaches, for example).

The accessories shown in FIGS. 3A-4 may have features and physical characteristics that make them suited to certain uses. For example, a ruggedized case may be targeted for rough work environments, and a sport case may have straps so the case can be worn during workouts. While these accessories may cause a device to change its operation using near-field wireless communication systems, they do not communicate with or interact with the device 100 in other ways. However, accessories that use near-field wireless communication systems may also have other components, systems, or mechanisms that interact or communicate with the device 100 to expand the functionality of the accessory and/or the device 100.

Figure 5:
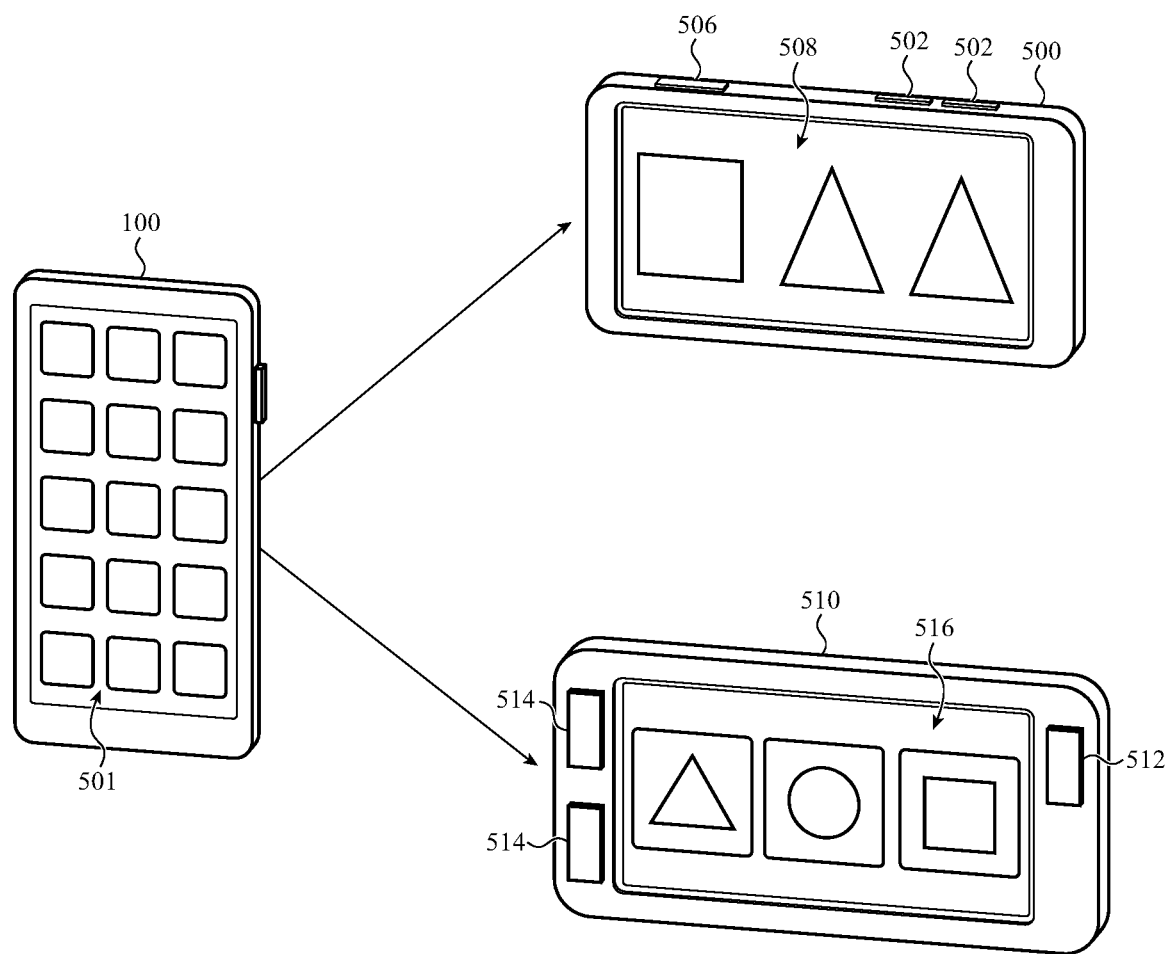
FIG. 5 depicts several additional example protective cases for the device of FIG. 1A.

FIG. 5 illustrates two examples of protective cases that use near-field wireless communications to cause the device 100 to change its mode of operation and also include input systems that wirelessly communicate with the device 100 and provide auxiliary inputs for a user. For example, FIG. 5 shows the device 100 not attached to an accessory or inserted in a case, and displaying a first graphical user interface 501, which may be the primary graphical user interface of the device 100, such as graphical user interface 128 (FIG. 1B). FIG. 5 also shows the device 100 after it has been inserted into a camera case 500. Similar to the other protective cases described herein, the camera case 500 may include a near-field wireless communication antenna that causes the device 100 to cease displaying its first graphical user interface and replace it with a second graphical user interface. In this case, because the case 500 is configured to facilitate the use of the device's camera functions, the second graphical user interface may be an image-capture interface 508. The image-capture interface 508 may include a preview of the scene at which the device's camera is aimed, as well as other selectable regions or input areas for controlling aspects of the camera functions (e.g., flash settings, aperture, shutter speed, white balance, image-capture type (e.g., video mode, still image mode, slow-motion mode), self-timer settings, shutter button, front/back camera selector, or the like. The device 100 may transition from the first graphical user interface 501 to the media-capture interface 508 (e.g., a still image capture user interface or a video capture user interface) when the device 100 is inserted into the camera case 500, or if the device's display is off when the device 100 is inserted into the camera case 500, the display may automatically turn on and immediately display the image-capture interface 508.

The camera case 500 may also include auxiliary input systems, such as buttons 502, that are configured to control image-capture functions of the device 100. For example, one of the buttons 502 may act as a shutter button to capture an image or begin or end a video recording. As another example, the buttons 502 may control zoom functions, aperture settings, shutter speed, or any other image-capture functions. The camera case 500 may also have a button mechanism 506 that allows a user to actuate a button of the device 100 itself. For example, the button mechanism 506 may include a movable button member (or membrane or material) that transfers force from a user's finger to the button 108 of the device 100 (FIG. 1A) to mechanically actuate the button 108. In some cases, when the device 100 is inserted into the camera case 500, the detection of the near-field wireless communication antenna of the camera case 500 causes the device 100 to re-map the input from the button 108 from a first function, such as locking the phone and/or deactivating the display, to a second function, such as a shutter button. This re-mapping may occur whenever the device 100 is in the camera case 500 and the device 100 is in an image-capture mode. That is, a user may leave an image-capture mode (and thus leave the image-capture interface 508) and use the device 100 in other modes (e.g., using the primary graphical user interface 501) while the device 100 remains in the camera case 500. Under such circumstances, the device may revert the button 108 to a default function, and may re-map the buttons 502 to other functions. When the user re-initializes the image-capture interface, the device 100 may once again use the buttons 108, 502 to control aspects of the image-capture functions of the device 100.

Actuation signals from the buttons 502 may be detected by the device 100 in various ways. In some cases, the buttons 502 use near-field wireless communication techniques to provide inputs to the device 100. For example, the buttons 502 (or any other type of input system) may include an actuation member configured to be actuated by a user. The actuation member may be any component that is actuated by a user, such as rigid button member, a membrane, or the like. The buttons 502 may further include a passive antenna, such as a near-field wireless communication antenna. When the actuation member is actuated by the user (e.g., pressed), the buttons 502 may cause the near-field wireless communication antenna to become detectable by the electronic device. For example, when the buttons 502 are in an unactuated state, the near-field wireless communication antenna may be in a state or configuration that causes the antenna to not detectable by the device 100. This may be caused by the antenna being electrically decoupled from other circuit elements, grounded, electrically coupled to other circuit elements, or otherwise put into a state where the near-field wireless communication system of the device 100 does not (and/or cannot) detect the antenna. In response to the actuation member being actuated by the user, the passive antenna may become detectable by the electronic device. More particularly, the user actuating the actuation member (e.g., by pressing it with a finger or other object) may change the electrical configuration of the antenna and/or associated circuitry in a manner that makes the antenna detectable by the device. For example, pressing the actuation member may cause an electrical contact to close, thereby connecting the antenna to a circuit element (e.g., a capacitor, an inductor, a resistor, etc.) to make the antenna detectable by the near-field wireless communication system of the device 100. In another example, pressing the actuation member may cause an electrical contact to open, thereby decoupling the antenna to an electrical ground. Other techniques may also be used to cause the antenna to switch between a detectable state and an undetectable state. Further, other techniques may be used to wirelessly communicate actuation signals from the buttons 502 to the device 100, such as other wireless communication protocols (e.g., Bluetooth, WIFI), acoustic signals (e.g., audible, ultrasonic), light, or the like.

The device 100 may be configured to execute an operation in response to detecting the passive antenna with the device's near-field wireless communication system. For example, when the user presses or actuates one of the buttons 502, the antenna associated with the button may be detected by the near-field wireless communication system of the device 100. The antenna may communicate some information to the device 100 that causes the device to perform a function such as capture an image, zoom in or out on a scene or subject, change a camera setting (e.g., aperture, shutter speed), or the like. The information communicated to the device 100 by the antenna may be a command to execute a particular function, an identifier that the device 100 uses to lookup an associated function or command, or any other suitable information.

Because the camera case 500 may include auxiliary inputs (or may otherwise cause a user to operate the camera function differently than when the device 100 is not in the camera case 500), the image-capture interface 508 may be different than an image-capture interface that is displayed when the device 100 is not used with the camera case 500. For example, a default image-capture interface for use without the camera case 500 may include selectable shutter button objects and other setting controls on the display of the device. Because the camera case 500 may include physical buttons to control these functions, in some implementations separate display-based controls for the functions are omitted from the image-capture interface 508 (while in other implementations, display-based controls for the functions are displayed on the image-capture interface 508, such that the user can use the display-based controls and/or the physical buttons. The image-capture interface 508 may differ from a default image-capture interface in other ways as well. The image capture interface 508 is shown displaying shapes, though the shapes represent a live preview of the camera (e.g., the image the camera will capture when an image capture command (e.g., shutter button) is received).

Gaming case 510 is another example case that may use a near-field wireless communication antenna to cause a device to change to an operating mode that is contextually relevant to the intended use of case, and also use near-field wireless communication systems to provide auxiliary inputs that are contextually relevant to the intended use of the case. For example, the gaming case 510 may have a near-field wireless communication antenna that causes the device 100 to enter a gaming mode, which may include transitioning from a first graphical user interface to a gaming graphical user interface 516. In some implementations, the gaming graphical user interface 516 is a selection screen of gaming applications (represented by the application icons with the triangle, circle, and square shapes) that a user may select, though the gaming graphical user interface 516 may be any other type of interface. For example, attaching the gaming case 510 to the device 100 may cause the device 100 to launch a single gaming application (which may be selected by the user), thereby causing that game's dedicated graphical user interface to appear.

Like the camera case 500, the gaming case 510 may include auxiliary inputs 512, 514 that use near-field wireless communication antennas to signal input events to the device 100. In some implementations, the auxiliary input 512 is a directional pad (e.g., a generally plus-shaped input member that can be used to provide directional inputs), a joystick, an analog controller, or the like. In some implementations, the auxiliary inputs 514 are buttons. The auxiliary inputs 512, 514 may use the same or similar techniques as the buttons 502 to activate and/or deactivate near-field wireless communication antennas.

The device 100 may be configured to dynamically re-map the auxiliary inputs 512, 514 based on the game, application, operating mode, or graphical user interface that is active on the device 100. For example, when the user places the device 100 into the gaming case 510, the device 100 may enter a gaming mode or graphical user interface, and the auxiliary inputs 512, 514 may be mapped to gaming inputs (e.g., to control a character or other aspect of a game). If the user exits the gaming mode while the device 100 is still in the gaming case 510, the auxiliary inputs 512, 514 may be re-mapped to other functions. For example, the directional pad 512 may control the position of a cursor on the display or change a selected object, and the buttons 514 may select items, launch applications, switch the device between different applications or user interfaces, or the like. When the user returns to the gaming mode, the auxiliary inputs 512, 514 may be re-mapped to the gaming functions.

While several examples of protective cases are described above, these are merely some of the numerous types of accessories, and associated changes to the operating mode of the device, that may use near-field wireless communication techniques to automatically customize the operation of a device. As one example of another accessory, a protective case may include a keyboard that wirelessly communicates with the device. When the device 100 is positioned in the case with the keyboard, the device 100 may change a setting so that an on-screen keyboard is not displayed when text input fields are selected or available, and so that inputs from the case's keyboard are used for text input. The device 100 may change its mode of operation in other ways, including changing an auto-correct model and/or algorithm (e.g., from one that is tailored to touch-screen based inputs to one that is tailored for physical key inputs from the keyboard), changing sound and/or tactile outputs associated with key presses, and the like. The device 100 may also initiate a pairing sequence or otherwise initialize wireless communication with the keyboard upon detecting the keyboard case. The keyboard may communicate with the device using any suitable communication technique or protocol, including wireless communications such as WIFI, Bluetooth, near-field wireless communications, or the like. In some implementations, the keyboard communicates with the device via a direct physical connection (e.g., a wired connection). In some cases, the keyboard may be associated with a keyboard dock or stand-alone keyboard instead of a protective case. In such cases, the near-field wireless communication system of the device 100 may detect when the device 100 is docked on the keyboard or otherwise in proximity to the keyboard.

Another example protective case may include a battery that may recharge the device 100 (either via physical connectors or wirelessly) when the device 100 is in the case. Upon the device 100 being inserted into the case or otherwise used with the battery, the device 100 may display a notification indicating that a battery has been attached and optionally providing selectable inputs to control aspects of a charging function (as shown with respect to FIG. 2A). The device 100 may also record the location of the device 100 when the battery-enabled protective case was attached to or removed from the device 100.

Accessories need not be protective cases that enclose or cover the device 100. For example, a card-holder or wallet-type accessory may be configured to attach to a device (or to a protective case), and the device 100 may use its near-field wireless communication system to detect when the card-holder accessory is attached to and removed from the device. The device 100 may customize a graphical user interface in response to detecting that the card-holder accessory has been attached (e.g., changing a background color or image of a primary graphical user interface to match a color of the accessory, or changing a color scheme or background of a graphical user interface of a digital wallet application to match the card-holder accessory). The device 100 may also use the near-field wireless communication system to help a user identify when and where the card-holder accessory is removed from the device. For example, upon the device 100 detecting that the card-holder accessory has been removed from the device 100, the device 100 may record the current time and the location of the device 100 (e.g., from a GPS or other positioning system). This information may then be provided to a user to help the user locate the card-holder accessory or at least know when and where the card-holder accessory was lost or removed. For example, a notification may be provided on the display of the device that shows the time and location (e.g., on a map) when the accessory was removed from the device 100.

Some accessories, such as some of the cases described above, may be configured to cause the device 100 to enter a particular operating mode or initiate a particular application that is tailored for use with that case. For example, the camera case 500 may cause the device to initiate a camera application. In some cases, a user may be able to customize how a device behaves, such as what is presented on its graphical user interface, when it is used with different accessories. For example, the device 100 may allow the user to create multiple different auxiliary graphical user interfaces that each include desired interface components. The user can also associate the auxiliary graphical user interfaces with respective accessories. For example, the user can create one auxiliary graphical user interface that is activated (e.g., displayed instead of a primary graphical user interface) when the device is placed on a dock in a bedroom, and a second, different graphical user interface that is activated when the device is placed on a dock in a kitchen. In some cases, the user can create numerous different auxiliary graphical user interfaces for numerous different use cases and accessories.

Figure 6:
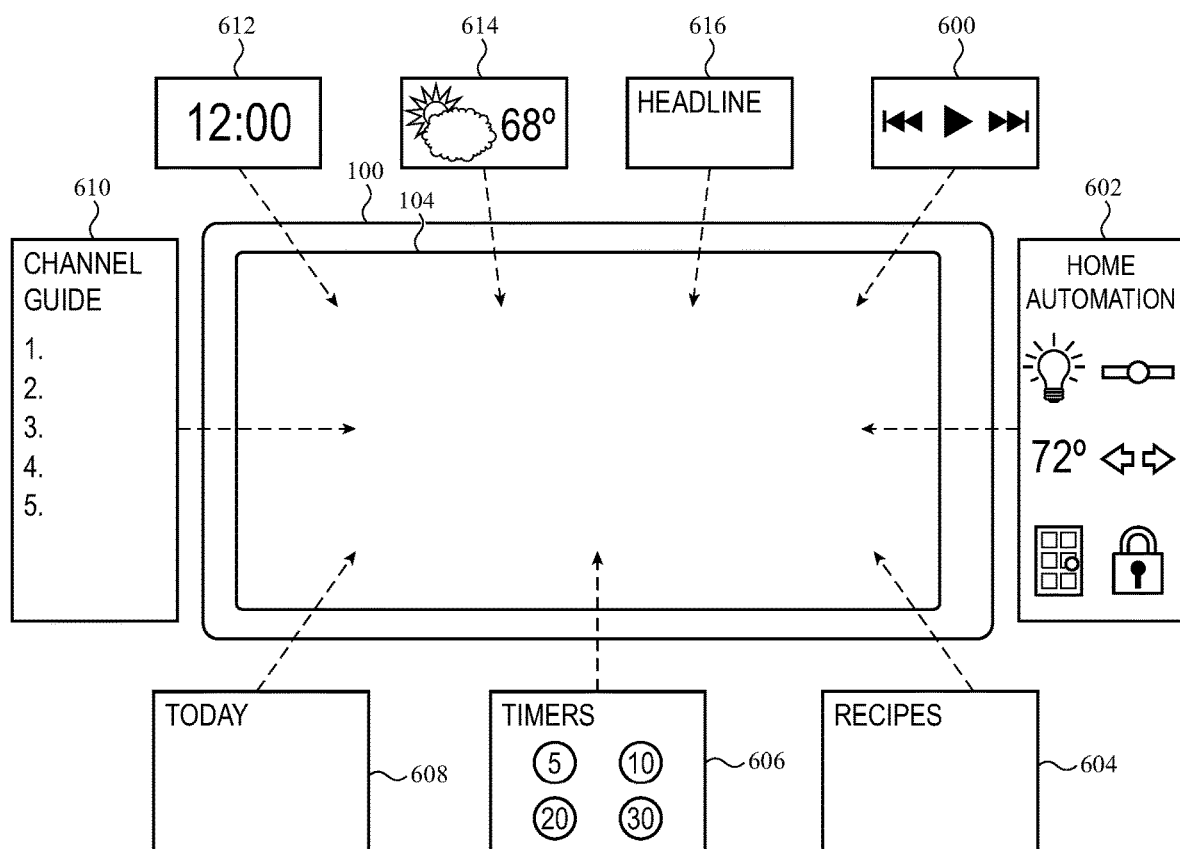
FIG. 6 depicts an example group of candidate graphical objects for creating user-defined auxiliary graphical user interfaces.

The auxiliary graphical user interfaces may be created by allowing a user to select from a group of candidate graphical objects. FIG. 6, for example, illustrates an example group of candidate graphical objects, including an audio control object 600, a home automation object 602, a recipe object 604, a timer object 606, a calendar object 608, a channel guide and selection object 610, a clock object 612, a weather object 614, and a news-feed object 616. In order to create an auxiliary graphical user interface, the user may select graphical objects from the group of candidate graphical objects, associate them with particular locations on the display 104 of the device 100 (e.g., defining a user-defined arrangement), and associate the auxiliary graphical user interface with a particular accessory. The graphical objects may have input objects, output objects, or both. Notably, the user may define numerous auxiliary graphical user interfaces each with different objects or different combinations of objects (or even with the same objects in a different user-defined arrangement). For example, one auxiliary graphical user interface may include the audio control object, while another may lack the audio control object. By providing such flexibility, users can produce highly customized and relevant auxiliary user interfaces for use with numerous different docks and accessories.

In some implementations, auxiliary graphical user interfaces are associated with specific docks or other accessories. For example, in some implementations, a user creates an auxiliary graphical user interface (e.g., by selecting a set of graphical objects from the candidate graphical objects), and associates the created auxiliary graphical user interface with a dock (e.g., by creating the auxiliary graphical user interface while the device is on the dock, by placing the device on the dock after creating the auxiliary graphical user interface, by manually associating the dock with the created auxiliary graphical user interface, or the like). Thereafter, when the device is placed on the dock, the user-created auxiliary graphical user interface is displayed. The same process may be used to create other customized auxiliary graphical user interfaces that are associated with other docks.

The audio control object 600 may include audio control input objects ("audio control inputs") for controlling audio playback functions of the device 100 or any other device that the device 100 can control. For example, the audio control inputs of the audio control object 600 may be configured to control audio of a network-connected audio system that the device 100 can control using network communications. The audio control object 600 may also have output objects, such as an indicator of the currently played or queued media, album art, or the like.

The home automation object 602 may include input objects that allow the user to control network-connected home automation systems, such as alarms, lighting, audio systems, HVAC systems, and the like. The home automation object 602 may also include output objects that indicate the state of interconnected systems, such as the lights, door sensors, window sensors, and the like. As noted above, in some implementations, a dock can be associated with a particular virtual room or environment in a home automation platform. Accordingly, when the device is placed on a dock associated with a particular virtual room or environment, the home automation object 602 may display controls for devices that are also associated with the particular room or environment. Thus, for example, a home automation object 602 that is displayed when the device is placed on a dock associated with and/or assigned to a "dining room" environment in the home automation platform can display controls for operating the lights of the dining room, while a home automation object 602 that is displayed when the device is placed on a dock associated with and/or assigned to a "living room" environment in the home automation platform can display controls for operating the lights in the living room, as well as a television and an audio system. Accordingly, the user need not manually select individual devices (e.g., a television, a set of lights, etc.) to associate with the home automation object (though in some cases, that is also an option). In some implementations, a home automation object in an auxiliary graphical user interface includes different controls based on the time of day. For example, a home automation object in an auxiliary graphical user interface for a bedroom dock may display, when the device is placed on the dock during the day, controls for an audio system, and, when the device is placed on the dock during the evening, controls for bedroom lights and a home alarm system.

The recipe object 604 may display cooking recipes or recipe lists. The recipe object 604 may also provide a search interface for searching for recipes. The timer object 606 may provide inputs for setting a timer and selecting timer settings (e.g., alert tones, volume, etc.), and may display timer progress. The calendar object 608 may show a snapshot of a user's calendar items. The channel guide and selection object 610 may display a list of channels, shows, show times, or other television program information. The channel guide and selection object 610 may also provide input objects for controlling a television, DVR, DVD player, or the like. The clock object 612 may display the current time. The weather object 614 may display current weather conditions and/or weather forecasts. The news-feed object 616 may display news headlines or articles.

The foregoing represents only some of the possible graphical objects that may be provided to a user to create auxiliary graphical user interfaces. In some cases, more, fewer, or additional graphical objects may be provided as well. The graphical objects may be associated with or use functions of other applications that are executed by the device 100. For example, a timer application (which may have its own separate graphical user interface) may provide timing functions for the timer object 606. In some cases, the functions of multiple different applications are included in a single graphical object. For example, the home automation graphical object 602 may use functions provided by a lighting application (on the device 100) to control lights, and functions of a separate thermostat application (on the device 100) to control the HVAC system.

Associating the auxiliary graphical user interface with a particular accessory may include associating the auxiliary graphical user interface with an identifier of a near-field wireless communication antenna of the accessory. For example, when a device is placed on or used with an accessory for the first time, the device may prompt the user to create an auxiliary graphical user interface for use with that accessory. The device may then store the association between the auxiliary graphical user interface and the accessory so that when the device detects the accessory in the future (e.g., using the near-field wireless communications described herein), the device will transition from displaying a first graphical user interface (e.g., whatever graphical user interface is active at that time) to displaying the auxiliary graphical user interface associated with that accessory.

In some cases, instead of an auxiliary graphical user interface that includes a set of user-selected graphical objects, a user may associate a particular accessory or dock with a particular application. For example, a device may include a dedicated application for a social network, a telephone, a video phone, a music player, or the like. The user may select any given application to be executed and/or initialized when the device is placed in a particular dock. Thus, as one example, the user may associate a video phone application with a dock that sits on the user's desk. Whenever the user places the device in that dock, the video phone application may be initialized (including, for example, causing the device to display the graphical user interface of the video phone application). In some cases, a phone or video phone application may be configured to initiate a call or an audio and/or video stream with another device in response to the device being placed in a particular dock. For example, when the user places the device in a dock at the user's work desk, a live video stream of the user's home security camera (or any other electronic device) may be displayed on the device. As another example, when the user places the device on a dock at the user's home desk, a video call with another person may be initiated. As described above, in some implementations, the particular application(s), control(s), and/or graphical object(s) that are executed and/or displayed in response to the device being placed on or used in conjunction with a dock or other accessory are based on an assignment of the dock or other accessory to a room in a home automation platform. Thus, for example, when a device detects that it is placed on a dock that is associated with or assigned to an "office" environment in a home automation platform, the device can execute an application or show controls that are also associated with the "office" environment. In some cases, multiple docks or accessories may be associated with the same room or environment in a home automation platform. In such cases, the different docks, even when associated with the same room or environment, may cause a device to execute or display different application(s), control(s), and/or graphical object(s). In some implementations, the particular application(s), control(s), and/or graphical object(s) that are displayed and/or executed are based on a property or type of dock (e.g., an alarm clock dock in a bedroom may cause alarm controls to be displayed, while a charging dock in the bedroom may cause lighting and audio controls to be displayed), or based on a user selection (e.g., a user can specify that a first bedroom dock will cause a first set of application(s), control(s), and/or graphical object(s) to be displayed and/or executed, and a second bedroom dock will cause a second set of application(s), control(s), and/or graphical object(s) to be displayed and/or executed).

In some cases, multiple individuals may configure their devices and docks to initiate a video call or video conference whenever two or more of the devices are placed on particular docks. For example, two users may configure their devices so that if one user places his or her device on a particular dock while the other user's device is also on a dock, a video call (e.g., a live or streaming video feed) is automatically initiated (e.g., without further user input). The video call may be terminated automatically upon either of the devices being removed from their respective docks. This may provide an easy and efficient way for family, friends, and coworkers to communicate with one another. While the foregoing example describes a two-person communication link, a similar technique may be used for more than two users. For example, a group of coworkers may each configure their device to initiate a video conference when their device is placed on a dock at their work place. In this way, they may be able to instantly collaborate with anyone else in their company or work group that is also available at that time. The user may simply remove their phone from the dock when they no longer need or want to communicate with that group. A user may even configure their device to join a different video conference when it is placed on a different dock. Accordingly, a user can communicate with different groups simply by moving their device to a different dock. While the foregoing examples are described primarily with respect to video conferences or video calls that are initiated by placing a device on a docking accessory, the same principles may be applied to audio-only communications (instead of video) and other types of accessories such as protective cases, charging docks, charging mats, vehicle-mounted docks or holders, or the like.

Figure 7:
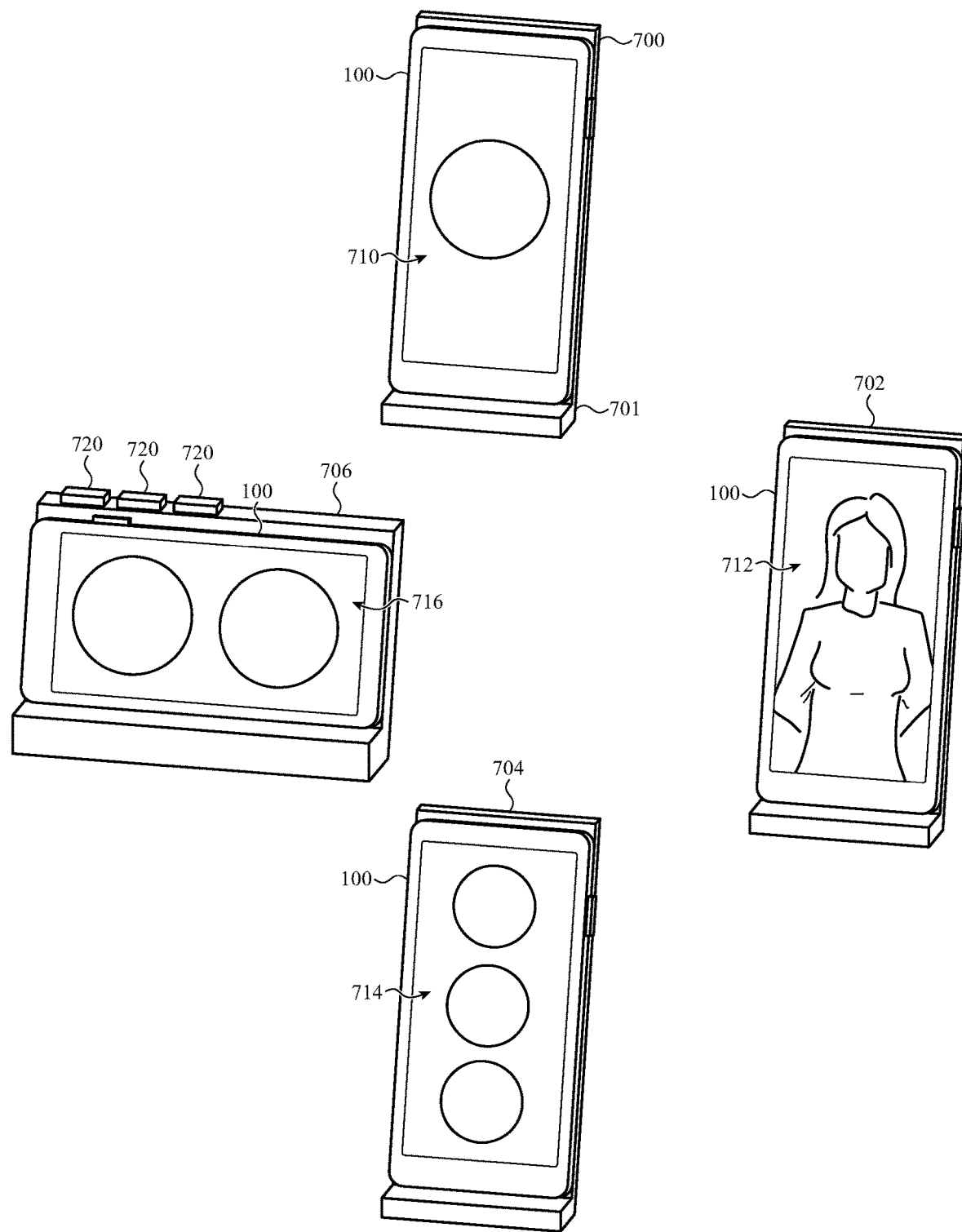
FIG. 7 depicts several example docks for the device of FIG. 1A.

FIG. 7 illustrates how various different auxiliary graphical user interfaces may be displayed on the device 100 based on what accessory or dock the device 100 is placed on. Each dock shown in FIG. 7 may include a near-field wireless communication antenna that allows the device 100 to detect when it has been placed on the support structure. Further, each dock may include a support structure that is configured to hold the device in a viewable orientation when the dock is on a surface of an object (e.g., structure 701 of the dock 700). The surface of an object may correspond, for example, to a surface of a table, counter, desk, nightstand, dresser, or any other suitable object. In this way the device can be viewed and interacted with, including allowing the user to touch the device to provide inputs (by pressing buttons, providing touch or stylus inputs on a touch sensitive surface, or the like). Further, the support structure may allow a user to simply place the device onto the support structure and remove it from the support structure (and consequently cause it to initiate a different operating mode and/or graphical user interface) without additional steps such as communicatively pairing the devices, mechanically securing the device to or in the dock, aligning and coupling electrical connectors, or the like.

Returning to FIG. 7, when the device 100 is placed on the first dock 700, the device 100 may detect, with its near-field wireless communication system, the antenna of the first dock 700 and thereby determine that it is in proximity to (e.g., placed on) the first dock 700. The device 100 may then determine what mode of operation it should operate in based on its proximity to the first dock 700 (e.g., what auxiliary graphical user interface to display) and begin operating in the mode of operation that corresponds to the first dock 700 (e.g., it may display the graphical user interface that has been associated with that dock). In the example shown in FIG. 7, the device 100 may display a first auxiliary graphical user interface 710, which may include a channel guide and selection object (e.g., allowing a user to view and select channels to view on a television) and a home automation object (e.g., allowing a user to control home automation systems such as lights, security systems, door locks, thermostats, etc.). These graphical objects which may have been selected by the user to be displayed when the device 100 is in this particular dock. For example, the first dock 700 may be located in a user's living room or recreation room where television channel selection and home automation controls are particularly useful to the user. Of course, because a user can customize the graphical user interface for any dock in any location, the contents of the first auxiliary graphical user interface 710 are merely examples and may be customized by a user to fit the user's particular needs for a particular dock location.

The first auxiliary graphical user interface 710 may be displayed when the device 100 is placed on the dock 700 regardless of what was displayed immediately prior. For example, if the device 100 is not displaying anything (e.g., the display 104 is blank), the display 104 may turn on and immediately display the first auxiliary graphical user interface 710. If the device 100 is currently displaying a primary graphical user interface (e.g., the primary graphical user interface 128, FIG. 1B), the device may cease displaying the primary graphical user interface and instead display the first auxiliary graphical user interface 710.

When the device 100 is placed in a second dock 702, the device 100 may detect, with its near-field wireless communication system, the antenna of the second dock 702 and thereby determine that it is in proximity to (e.g., placed on) the second dock 702. The device 100 may then determine what mode of operation it should operate in based on its proximity to the second dock 702 (e.g., what auxiliary graphical user interface to display) and begin operating in the mode of operation that corresponds to the second dock 702 (e.g., it may display the graphical user interface that has been associated with that dock). In the example shown in FIG. 7, the device 100 may display a second auxiliary graphical user interface 712, which may correspond to a live video stream captured by a remote electronic device and sent to the device 100. More particularly, when the device 100 is placed on the second dock 702, a live video link with another device may be automatically initiated. The live video link may be with another similar device (e.g., a mobile phone, tablet computer, laptop computer) that allows two-way audio and video communications, or with a camera such as a security camera or webcam. Accordingly, the second auxiliary graphical user interface 712 may correspond to a video feed from another camera. As another example, instead of automatically initiating the live video link, placing the device 100 on the second dock 702 may cause the device 100 to display a list of contacts that a user can select to initiate a live video or audio feed with the selected contact. The device 100 may also activate a microphone or voice recognition scheme to accept a spoken command (e.g., "call my mother"). As noted above, the second auxiliary graphical user interface 712 may be displayed when the device 100 is placed on the second dock 702 regardless of what was displayed on the device 100 immediately prior. For example, the device 100 may transition from a blank screen to the second auxiliary graphical user interface 712 or from another graphical user interface (e.g., a primary graphical user interface) to the second auxiliary graphical user interface 712.

When the device 100 is placed in a third dock 704, the device 100 may detect, with its near-field wireless communication system, the antenna of the third dock 704 and thereby determine that it is in proximity to (e.g., placed on) the third dock 704. The device 100 may then determine what mode of operation it should operate in based on its proximity to the third dock 704 (e.g., what auxiliary graphical user interface to display) and begin operating in the mode of operation that corresponds to the third dock 704 (e.g., it may display the graphical user interface that has been associated with that dock). In the example shown in FIG. 7, the device 100 may display a third auxiliary graphical user interface 714, which may include graphical objects relevant to a kitchen environment. For example, in some implementations, the third auxiliary graphical user interface 714 includes a recipe object that may allow a user to search for recipes, select from saved recipes, and read recipes. The third auxiliary graphical user interface 714 may also include a timer object, and/or a measurement conversion object.

Activation of the third auxiliary graphical user interface 714 may also configure the device to respond to spoken instructions (e.g., to scroll the recipe or change between recipes, to control the timers, etc.) so that the user does not need to touch to the device 100 to manipulate the user interface during cooking, which may be unsanitary and may damage the device 100. Further, an automatic display shutoff may be disabled so that the display (and thus the recipe, timers, etc.) do not disappear without warning. Of course, other user-selected graphical objects may be used instead of or in addition to those shown in the third auxiliary graphical user interface 714.

In some cases, docks that include support structures to hold the device in a viewable orientation may also include input systems that are configured to wirelessly communicate with the device in response to the input system being actuated by a user when the electronic device is positioned on the support structure. For example, FIG. 7 shows an example alarm clock dock 706 that includes input systems such as buttons 720. The buttons 720 may be similar to those described with respect to FIG. 5. For example, actuation signals from the buttons 720 may be detected by the device 100 in various ways. In some cases, the buttons 720 use near-field wireless communication techniques to provide inputs to the device 100. For example, the buttons 720 (or any other type of input system) may include an actuation member configured to be actuated by a user, as well as a passive antenna, such as a near-field wireless communication antenna. When the actuation member is actuated by the user (e.g., pressed), the buttons 720 may cause the near-field wireless communication antenna to become detectable by the electronic device. For example, when the buttons 720 are in an unactuated state, the near-field wireless communication antenna may be in a state or configuration that is not detectable by the device 100. This may be caused by the antenna being electrically decoupled from other circuit elements, grounded, electrically coupled to other circuit elements, or otherwise put into a state where the near-field wireless communication system of the device 100 does not detect the antenna. In response to the actuation member being actuated by the user, the passive antenna may become detectable by the electronic device. (Other techniques may be used to wirelessly communicate actuation signals from the buttons 502 to the device 100, such as other wireless communication protocols (e.g., Bluetooth, WIFI), acoustic signals (e.g., audible, ultrasonic), light, or the like.)

As with the other docks shown in FIG. 7, placing the device 100 on the dock 706 may cause the device 100 to display a fourth auxiliary graphical user interface 716. In some implementations, the fourth auxiliary graphical user interface 716 includes clock and/or alarm clock graphical objects. Accordingly, the dock 706 may be suited for placement in a user's bedroom. The buttons 720 may be configured to control or change settings of the clock and/or alarm clock graphical objects, such as setting alarm times, snoozing an alarm, changing the display brightness (e.g., temporarily activating the display so that a user can see the time during the night), or the like. This may improve the experience of using the alarm functions of the device 100 by eliminating the need for a user to look at the display of the device to locate a touch-sensitive snooze button or otherwise control alarm functions.

In addition to transitioning to the fourth auxiliary graphical user interface 716 in response to being placed on the dock 706, the device 100 may also change other device settings. For example, where the dock 706 is in a bedroom and being used as an alarm clock, the device may also change notification settings (e.g., turning off audible, visible, and/or tactile notifications of messages, events, etc.), change display settings (e.g., display brightness, display color content, etc.). Other device customizations are also possible upon the device 100 detecting that it is on the dock 706.

While FIG. 7 shows several example docks and associated auxiliary user interfaces, other types of docks are also possible, including docks having different form factors, different targeted uses and/or locations, different arrangements and types of auxiliary input systems, and the like. For example, a dock may include speakers (like the dock 118, FIG. 1A) and may cause the device 100 to transition to an auxiliary graphical user interface that includes music or audio-control objects. As another example, a dock without speakers may cause the device 100 to transition to an auxiliary graphical user interface that includes music or audio-control objects and also configures the device to control or connect with a wireless speaker system.

Another example dock may cause the device 100 to transition to an auxiliary graphical user interface that is configured as a shared family device. This may include displaying a shared (e.g., among a family) calendar, task list, reminder list, or the like, as well as objects for controlling home functions such as security systems, a thermostat, lighting, music, or the like. In some implementations, shared information (e.g., among a family) corresponds to information that is shared between accounts that are linked to a shared family account and share access to information and/or content (e.g., a calendar, photos, contacts, etc.) and/or payment methods. In addition to transitioning to the auxiliary graphical user interface, the device may also change device settings by restricting access to a single user's personal content (e.g., messaging applications and functions, etc.), changing notification settings (e.g., turning off notifications or removing visible message previews), and the like.

Another example dock may cause the device 100 to transition to an auxiliary graphical user interface that is configured as a voice-based digital assistant interface. This may include dynamically displaying transcriptions of voice input, displaying content or graphical objects related to voice-based commands issued to the device 100, or the like. A dock configured to customize the device for use as a digital assistant may also include microphones and/or speakers that can communicate with the device 100 to enhance the device's audio capabilities.

Another example dock may cause the device 100 to transition to an auxiliary graphical user interface that is configured to control an appliance that is wirelessly coupled to the device 100 or otherwise configured to receive and/or respond to commands from the device 100. For example, an auxiliary graphical user interface for controlling a washing machine may include control objects tailored to the washing machine's functions (e.g., water temperature, spin cycle level, cycle time, soil level). As another example, a user interface that is configured to control a coffee maker may include control objects tailored to the coffee maker's functions (e.g., brew start time, coffee strength, grind size, water temperature). Of course, auxiliary user interfaces may be tailored for use with other appliances and devices as well.

Docks may also be provided at public places, businesses, or other locations where they may be used by many different users. Such docks may cause devices to transition to auxiliary graphical user interfaces that are relevant to their locations and/or environments. For example, a restaurant may provide docks at their tables that cause devices to display a menu and/or ordering interface when the devices are placed on the docks. As another example, an airport may have docks at each gate that cause devices to display flight information for that gate. As another example, parks may have docks at points of interest that cause devices to display information or interactive applications related to those points of interest. Shared docks such as those described above (and indeed any dock described herein) may also include wireless charging systems as described above with respect to FIGS. 2A-2B.

As described above, auxiliary user interfaces may be customized by a user and associated with a particular dock. In some cases, docks may be configured to trigger a pre-populated auxiliary graphical user interface. For example, a dock may be sold as a "kitchen" dock, and the dock and/or devices that are usable with the dock may be configured to trigger an auxiliary graphical user interface that includes a recipe object and a timer object. The user may use the default auxiliary graphical user interface, or modify and/or change the auxiliary graphical user interface in any manner (e.g., with different cooking or kitchen-relevant objects, or so that the dock can be used in an entirely different context such as on the user's nightstand). Other types of "default" docks may also be provided and may trigger similarly tailored auxiliary graphical user interfaces. For example, a "bedroom" dock may, by default, trigger an interface with an alarm clock object, and a "living room" dock may, by default, trigger a television control object. Of course, these default auxiliary graphical user interfaces may be replaced or modified by the user using the modular user interface scheme described herein.

While the docks, cases, and other accessories described herein may cause the device to transition from one mode of operation to another (including, for example, transitioning from one graphical user interface to another, different graphical user interface), users may be able to selectively return to a previous or a different mode of operation (and associated graphical user interface) while the device is still associated with an accessory. For example, when a device is placed on kitchen dock, thus triggering the transition to a cooking-based user interface, the user may control the device to leave the cooking-based user interface and instead return to a primary graphical user interface while the device remains on the dock. As another example, the user may control the device to leave the cooking-based user interface and instead initiate a music-playback interface. A user may also be able to select whether or not a particular graphical user interface may be freely changed. For example, if a user places a device in a child-proof case, they may not want the child to be able to freely return to the primary user interface. Accordingly, users may be able to select what auxiliary graphical user interfaces (if any) may be freely available once a device is used with a particular accessory. A password or other authentication may be required in order to transition between auxiliary user interfaces.

In some cases, the device 100 transitions from an auxiliary graphical user interface to a primary graphical user interface when the device 100 is removed from a dock. For example, the near-field wireless communication system of the device 100 may determine that the device is no longer in proximity to the dock based on ceasing to detect the near-field wireless antenna of the dock. Upon ceasing to detect the near-field wireless antenna of the dock, the device 100 may cease displaying the auxiliary graphical user interface (or any other graphical user interface associated with that dock) and begin displaying the primary graphical user interface.

Figure 8:
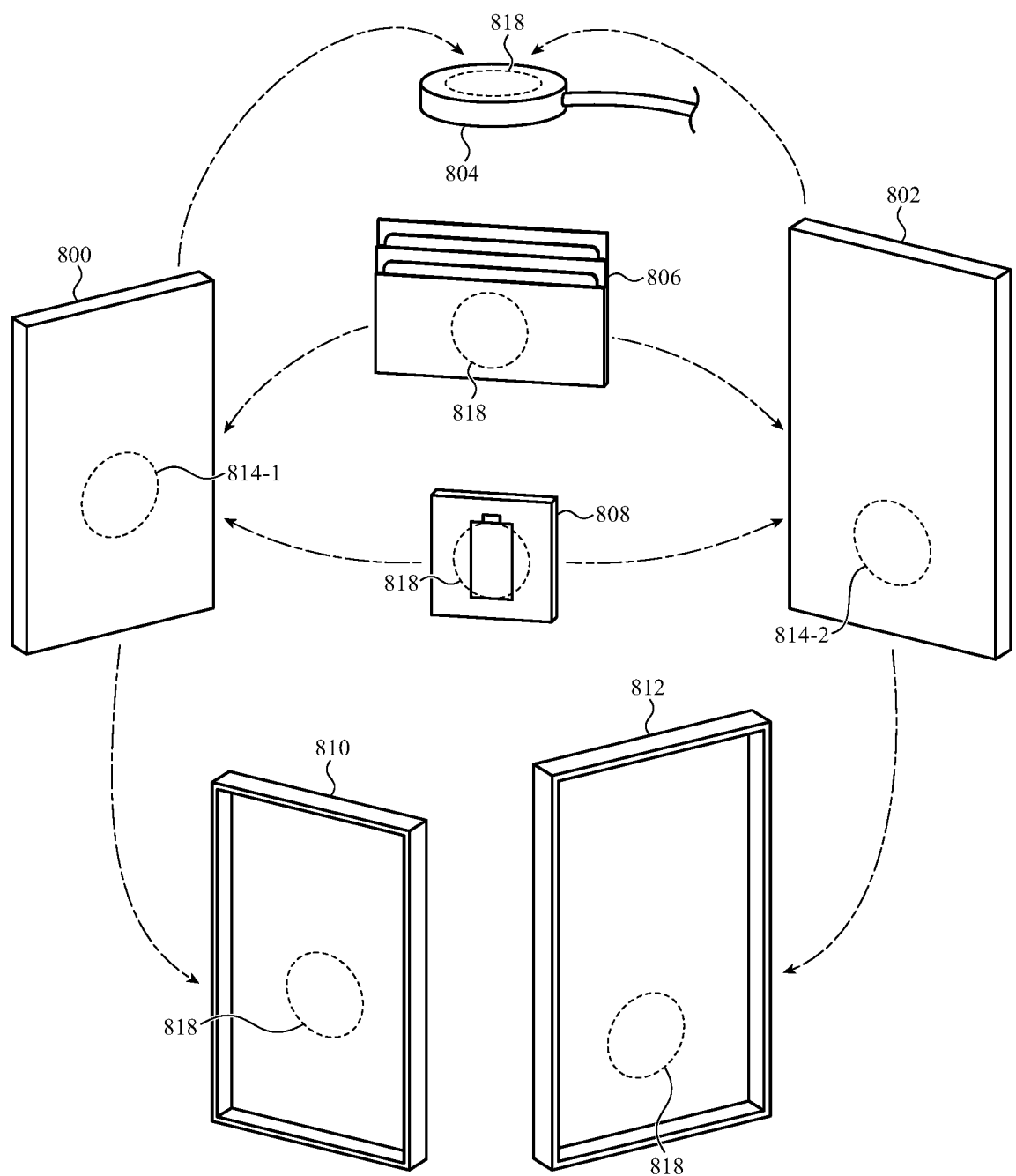
FIG. 8 depicts an example system of electronic devices and accessories.

FIG. 8 depicts an example system in which electronic devices (e.g., a first electronic device 800 and a second electronic device 802) may be used with various different accessories that cause the devices to display various visual indications when the accessories are attached to and/or detached from the devices. The first device 800 and the second device 802 are examples of computer systems, such as the computer system 3600 described herein with respect to FIG. 36. For simplicity, the electronic devices (or computer systems) 800, 802 are referred to herein as devices 800, 802.

As described above, accessories such as a charging dock 804, a wallet accessory 806, an auxiliary battery accessory 808, and protective cases 810, 812 may be attached to the devices 800, 802. When the accessories are attached, and optionally detached, the detection of the attachment and/or detachment may cause the devices to display, on the displays of the devices, visual indications that have some relevance to the accessory. For example, the visual indications may have a shape and/or size that is based on the shape and/or size of the attached accessory, or a color that is based on the color of the accessory. As another example, the visual indications may include accessory-specific information, such as a graphical object that indicates the accessory's use or function (e.g., a lightning bolt representing a battery charging function), or a name (or other metadata) associated with the particular accessory that is attached. In order to detect information about the accessories, the devices 800, 802 may include near-field wireless communication systems, as described above, that can detect and receive information from the accessories via near-field wireless communication antennas of the accessories. Information about the accessories may be determined using other techniques and/or systems instead of or in addition to near-field wireless communications.

As described herein, one or multiple accessories may be attached to a single device at one time, and each attached accessory may cause a visual indication to be displayed when the accessory is attached. For example, as described with respect to FIGS. 15A-15B, the charging dock 804 may be attached to a device that is already attached to a protective case (e.g., the case 810). In this example, the case causes a visual indication to be displayed when it is attached to the device, and the charging dock causes another visual indication to be displayed when it is attached to the device. As another example, a device may have a protective case 810, an auxiliary battery accessory 808, and a charging dock 804 attached (each of which, optionally, caused a visual indication to be displayed when attached). As yet another example, a device may have a protective case 810, a wallet accessory 806, and an auxiliary battery accessory 808 attached (each of which, optionally, caused a visual indication to be displayed when attached). In some implementations, if multiple accessories are attached to a device at the same time or substantially the same time, only one visual indication is displayed (e.g., the visual indication of the accessory closest to the device). In some implementations, if multiple accessories are attached to a device at the same time or substantially the same time, a separate visual indication for each of the attached accessories is displayed (e.g., one after the other).

In some implementations, in addition to displaying visual indications in response to detecting attachment of an accessory, a non-visual output is produced in response to detecting the attachment of the accessory to the device. In some implementations, the non-visual output is produced even when different types of accessories are attached. In some implementations, the non-visual output is a tactile output, such as a vibration, impulse, or the like. In some implementations, the non-visual output is an audio output, such as a beep, tone, melody, song, voice alert, or the like. In some implementations, both tactile and audio outputs are produced in response to detecting attachment of the accessory.

The accessories are configured to attach to the devices 800, 802 via attachment mechanisms 814 in the devices, and corresponding attachment mechanisms 818 in the accessories. In some implementations, the attachment mechanisms 814, 818 are magnetic attachment mechanisms to releasably attach or couple the accessories and devices. For example, in some implementations, the attachment mechanisms 814 of the devices (e.g., 814-1, 814-2) include first magnets, and the corresponding accessory attachment mechanisms 818 include second magnets or magnetic materials (e.g., iron, steel, ferromagnetic materials, etc.) that are attracted to the first magnets. In some implementations, the attachment mechanisms 814, 818 include or are associated with near-field wireless communications systems, as described above, to facilitate the devices receiving information about the accessories. While the protective cases 810, 812 are shown as including attachment mechanisms 818, attachment mechanisms 818 may be omitted from the protective cases 810, 812, such as in implementations where the cases have separate physical features to retain the cases to the devices. Even where the attachment mechanisms are omitted from the cases, the cases may include appropriate near-field wireless communications systems so that the devices can detect attachment of the cases to the devices.

The attachment mechanisms 814 may be located at a particular location in the devices 800, 802. The locations of the attachment mechanisms may be different for different devices. For example, in the first device 800, which may represent a mobile phone (or other type of computer system) of a first size, the attachment mechanism 814-1 may be at a first location. By contrast, in the second device 802, which may represent a mobile phone (or other type of computer system) of a larger size than the first device 800, the attachment mechanism 814-2 may be at a second location. The difference between the first and second locations may be understood as being relative to the centroids of the devices. For example, the attachment mechanism 814-1 is located relatively closer to the centroid of the first device 800 than the attachment mechanism 814-2 is to the centroid of the second device 802. In yet other cases, the location of the attachment mechanisms of differently sized or shaped devices is substantially the same (e.g., they may both be located at a centroid of the device).

The attachment mechanisms 814, 818 may also have a particular shape. For example, the attachment mechanisms 814, 818 may have a generally circular shape, as indicated by the broken-line circles in FIG. 8. The shape may be defined by or represent a shape of the attachment mechanisms within the devices. For example, the attachment mechanisms may include an array of magnets that are positioned in a circular arrangement (e.g., along the circles shown in FIG. 8), or they may include a single circular magnet having an outer periphery corresponding to the circles shown in FIG. 8. In some cases, the circles that represent the attachment mechanisms 814, 818 may represent the area where the magnetic attraction occurs between the devices and the accessories. For example, when the attachment mechanism 818 of the charging dock 804 is brought into alignment with the attachment mechanism 814-1 of the device 800 (e.g., such that the circles are substantially coincident with one another), the charging dock 804 may attach to the device 800. While the instant figures illustrate the attachment mechanisms 814, 818 as circles, attachment mechanisms may have other shapes and/or configurations. For example, the attachment mechanisms may have square or triangular shapes. In some cases, as described herein, the shape of the attachment mechanism may be represented in the visual indications that are displayed when accessories are attached to the devices.

In some cases, the accessories, when attached to the devices, have a predetermined orientation relative to the attachment mechanisms. For example, in some implementations, the attachment mechanisms 814, 818 are configured so that magnetic attraction between an attachment mechanism 814 and an attachment mechanism 818 occurs only when the accessory is oriented in a particular orientation relative to the device. For example, the attachment mechanism 818 of the wallet accessory 806 is configured within the wallet accessory 806 such that it will only be magnetically attracted to the attachment mechanism 814-1 in one orientation (e.g., with the sides of the wallet accessory 806 substantially parallel to the sides of the device 800). In some cases, misalignments of more than a threshold amount (e.g., 10 degrees, 20 degrees) result in the accessory not attaching to the device, being repelled from the device, or being attracted towards the predetermined orientation.

As noted above, when accessories are attached to the devices, visual indications may be displayed on the displays to inform users that the accessories are attached, and optionally to convey information about the accessories (or other relevant information). In some implementations, the visual indications include graphical elements that are based on or representative of a physical property of the accessory. For example, the physical property represented by a graphical element in a visual indication may be a physical dimension of the accessory, such as a size, shape, length, or width of the accessory. Other types of physical properties may include a color of the accessory.

Further, different accessories may cause a device to display different visual indications, where the different visual indications are based on a physical dimension of the particular accessory that is attached. For example, in accordance with a determination that an attached accessory is a first accessory with first physical dimensions, a first visual indication that the accessory has been attached to the device is displayed, wherein the first visual indication indicates at least one property of the first physical dimensions of the accessory (e.g., size, length, width, shape). In accordance with a determination that the accessory is a second accessory with second physical dimensions that are different from the first physical dimensions, a second visual indication that the accessory has been attached to the device is displayed, where the second visual indication indicates at least one property of the second physical dimensions, and the second visual indication is different from the first visual indication. Examples of different visual indications being displayed in accordance with a determination of the type of accessory are described herein. For example, FIG. 9C illustrates a visual indication displayed in accordance with a determination that the accessory is a charging dock (e.g., a first accessory), and FIG. 13C illustrates a visual indication displayed in accordance with a determination that the accessory is an auxiliary battery accessory (e.g., a second accessory with different physical dimensions than the first accessory).

Figure 9A:
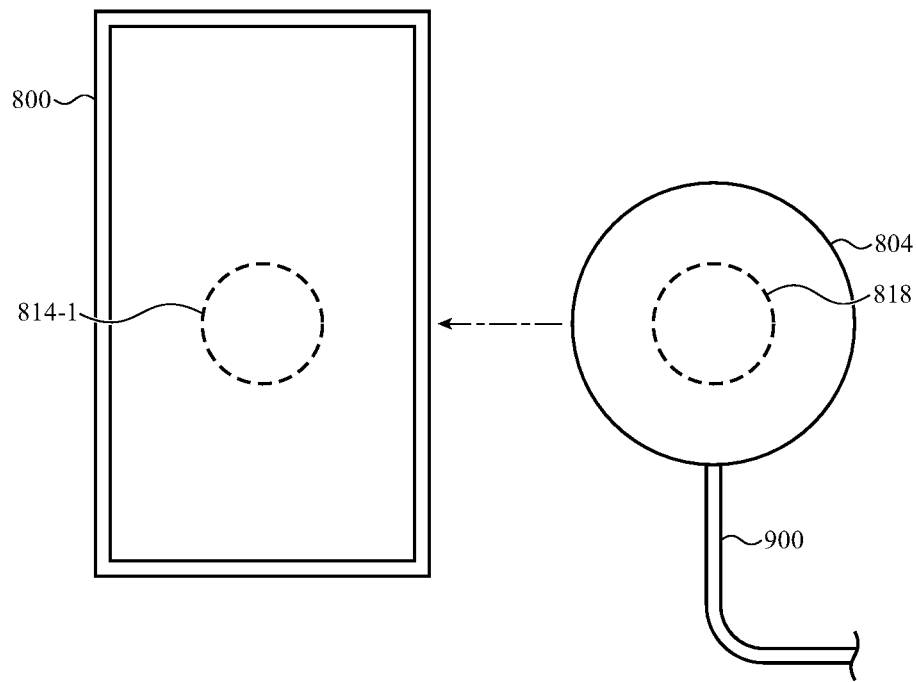
FIGS. 9A-9C depict an example electronic device in use with an example accessory.
Figure 9B:
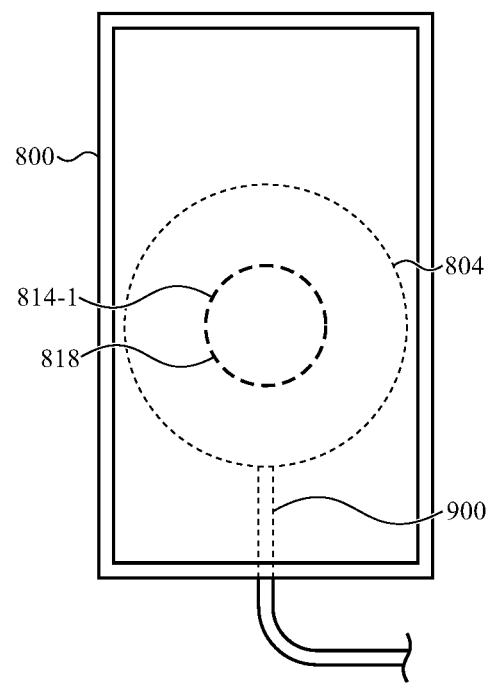
Figure 9C:
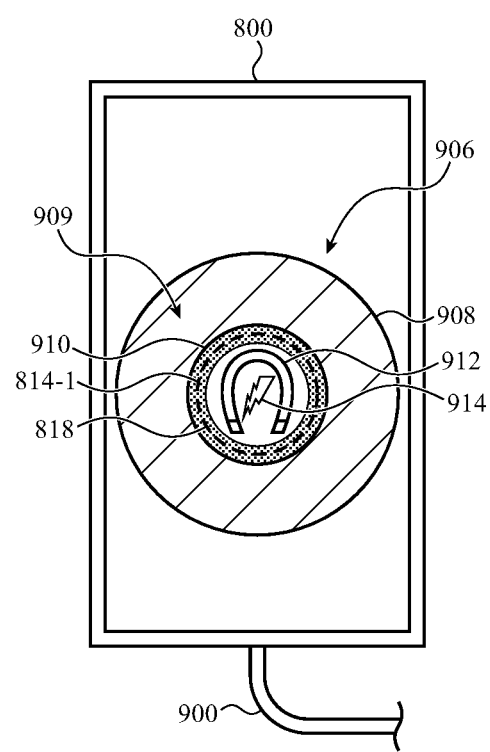

FIGS. 9A-9C illustrate an example of how an accessory may attach to a device via attachment mechanisms, and how the visual indication displayed on the display of the device indicates at least one property of the physical dimensions of the accessory. FIG. 9A illustrates the device 800 with the representation of the attachment mechanism 814-1, as well as the charging dock 804 with its attachment mechanism 818. The charging dock 804 may also include a cord 900 that couples to a power source and provides electrical power to the charging dock 804, and thus to the device 800 when the charging dock 804 is attached to the device 800.

FIG. 9B illustrates a front view of the device 800 with the charging dock 804 attached to the back of the device 800. As illustrated in FIG. 9B, the attachment mechanism 814-1 of the device 800 and the attachment mechanism 818 of the charging dock 804 may be coincident with one another, and are thus represented by a single broken circle in FIG. 9B. FIG. 9B also shows, in dotted lines, the location and physical dimensions of the charging dock 804 and the cord 900 along the back side of the device 800. As noted above, the attachment mechanisms 814-1, 818 may be configured so that the charging dock 804 attaches to the device 800 in a predetermined orientation, such as with its cord 900 extending vertically downward (relative to the orientation of FIG. 9B).

The device 800 detects attachment of the charging dock 804, and in response to detecting the attachment of the charging dock 804, displays a visual indication 906 that the accessory has been attached to the device. The visual indication 906 may indicate at least one property of the physical dimensions of the charging dock 804. For example, the visual indication 906 may include a graphical element 908 that has a size and a shape that is the same as the size and the shape of the charging dock 804. As shown in FIG. 9C, for example, the graphical element 908 is a circle that has the same size and shape as the circular charging dock 804. Further, the graphical element 908 indicates the actual location of the charging dock 804 on the device 800, as indicated by the graphical element 908 coinciding with the dimensions of the charging dock 804 in FIG. 9B. In this manner, the visual indication 906 may illustrate, to the user, exactly where the accessory (here, the charging dock 804) is located on the back of the device, as well as what the size and the shape of the accessory is, via the display on the front of the device. The visual indication 906 may also include a fill region 909 inside the graphical element 908. In some implementations, the fill region 909 includes an opaque element, or a translucent element, or it may be empty (e.g., graphical objects that are displayed on the display and in the fill region 909 when the visual indication 906 is displayed may be viewable through the fill region 909).

While FIG. 9C illustrates the graphical element 908 having the same size and shape as the attached accessory, any physical dimensions of the accessory may be shown by a graphical element of a visual indication. For example, the graphical element may have a same width or length as the accessory. In some cases, the graphical element may have one physical dimension in common with the accessory, while in other cases it has more than one physical dimension in common. For example, the graphical element may have the same size and shape of the accessory, or it may have the same shape (e.g., a circle), but a different size (e.g., a different diameter). As described herein, however, the selection of the property of the graphical element, such as the size, shape, location, color, or the like, may be based on the particular accessory that is attached (as determined, for example, by a near-field wireless communication system).

FIG. 9C also illustrates other example graphical elements that the visual indication 906 may include. For example, in the example in FIG. 9C, the visual indication 906 includes a graphical element 910 that corresponds to a location, size, and/or shape of the attachment mechanism 814-1. For example, the attachment mechanism 814-1 of FIG. 9C has a circular shape and a particular location in the device 800, and the graphical element 910 has the same size and/or shape of the attachment mechanism 814-1, and may be located at the location of the attachment mechanism 814-1. With respect to the example in FIG. 9C, the graphical element 910 is a circle that is positioned directly over the broken lines representing the location, shape, and size of the attachment mechanism 814-1. In implementations where the attachment mechanism 814-1 has a different location, size, and/or shape, the graphical element 910 may match the different size, location, and/or shape. While the instant figures show dotted or broken lines representing the locations of components or objects (e.g., the broken-line circles representing the attachment mechanisms 814-1, 818 and the location of accessories on a device), these are provided for reference and are not displayed as graphical elements on the display of the device. In some implementations, however, the dotted or broken lines are displayed as part of a visual indication when an accessory is attached.

In some cases, the graphical element 910 is displayed in other visual indications as well. For example, a visual indication that is displayed when a different accessory (e.g., the auxiliary battery accessory 808, wallet accessory 806, etc.) is attached to the device 800, a different visual indication may be shown on the display. The different visual indication may include a graphical element in common with the visual indication 906, such as the graphical element 910. In this way, multiple visual indications include at least one common graphical element that indicates or otherwise relates to the size, shape, and/or location of the attachment mechanism 814-1 in the device 800.

The visual indication 906 may also include graphical objects that indicate information about the accessory and/or how the accessory is attached. For example, as shown in FIG. 9C, the visual indication 906 includes a graphical object 912 that indicates a connection type to the accessory. In this example, the graphical object 912 is a graphical representation of a magnet, indicating that the accessory (e.g., the charging dock 804) has been magnetically attached via the attachment mechanism 814-1. The same or a similar graphical object may be displayed when other, different accessories are attached via the attachment mechanism 814-1.

The visual indication 906 may also include a graphical object 914 that indicates a function of the accessory. In this example, the graphical object 914 is a graphical representation of a lightning bolt, indicating that the accessory is a charging dock or is otherwise configured to charge the device 800. The same or a similar graphical object may be displayed when other accessories with charging functions are attached to the device 800 (e.g., auxiliary battery accessories, protective cases with built-in auxiliary batteries, etc.).

While FIGS. 9A-9C illustrate certain features in the context of an example accessory, it will be understood that the same features may apply to other accessories as well. For example, and as described in greater detail herein, a wallet accessory may have a square or rectangular shape. As such, the visual indication that is displayed when the wallet accessory is attached may have a square or rectangular graphical element with a same physical dimension as the wallet accessory (e.g., size, shape, width, height, etc.).

Figure 10A:
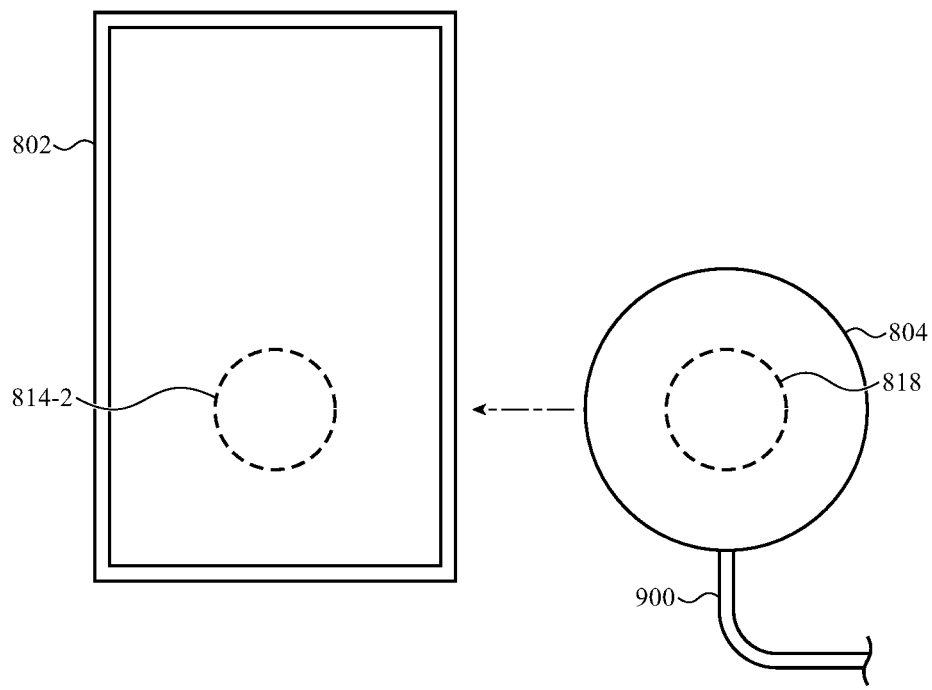
FIGS. 10A-10C depict another example electronic device in use with the example accessory.
Figure 10B:
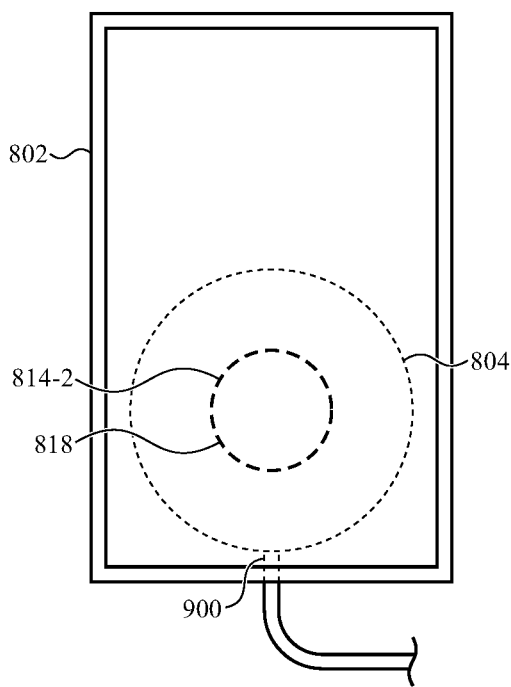
Figure 10C:
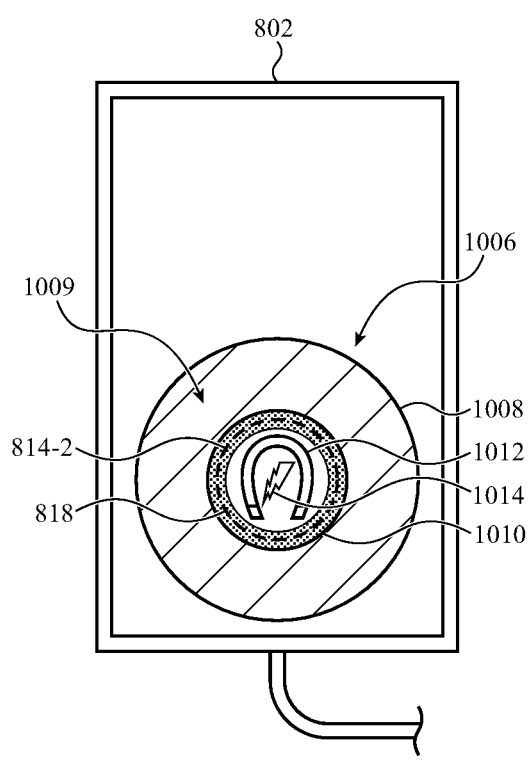

FIGS. 9A-9C illustrate an accessory being attached to the device 800, FIGS. 10A-10C illustrate the accessory being attached to the device 802. As noted above, the device 802 has a different size and/or shape than the device 800. For example, the device 802 is larger in length and width (e.g., the vertical and horizontal directions, as depicted in FIGS. 10A-10C). Further, as described above, the location of the attachment mechanism 814-2 in the device is different from the location of the attachment mechanism 814-1 in the device 800. Accordingly, the visual indication that is displayed when the device 802 detects attachment of the charging dock 804 (or any other accessory) has a different location on the display than the visual indication shown on the device 800. More particularly, because the location of the visual indication on a given device is based on the location of the attachment mechanism on that device (and thus the location of the accessory, when attached), differences in location of the attachment mechanism will result in different locations of the visual indication.

FIG. 10A illustrates the device 802 with the representation of the attachment mechanism 814-2, as well as the charging dock 804 with its attachment mechanism 818. The charging dock 804 also includes the cord 900 that couples to a power source and provides electrical power to the charging dock 804, and thus to the device 802 when the charging dock 804 is attached to the device 802.

FIG. 10B illustrates a front view of the device 802 with the charging dock 804 attached to the back of the device 802. As illustrated in FIG. 10B, the attachment mechanism 814-2 of the device 802 and the attachment mechanism 818 of the charging dock 804 may be coincident with one another, and are thus represented by a single broken circle in FIG. 10B. FIG. 10B also shows, in dotted lines, the location and physical dimensions of the charging dock 804 and the cord 900 along the back side of the device 802. As noted above, the attachment mechanisms 814-2, 818 may be configured so that the charging dock 804 attaches to the device 802 in a predetermined orientation, such as with its cord 900 extending vertically downward (relative to the orientation of FIG. 10B). A comparison between FIG. 9B and FIG. 10B illustrates how the different location of the attachment mechanisms 814-1, 814-2 between the devices 800, 802 results in the charging dock 804 being differently located on the devices 800, 802.

The device 802 detects attachment of the charging dock 804, and in response to detecting the attachment of the charging dock 804, displays a visual indication 1006 that the accessory has been attached to the device. The visual indication 1006 may indicate at least one property of the physical dimensions of the charging dock 804. For example, the visual indication 1006 may include a graphical element 1008 that has a size and a shape that is the same as the size and the shape of the charging dock 804. As shown in FIG. 10C, for example, the graphical element 1008 is a circle that has the same size and shape as the circular charging dock 804. Further, the graphical element 1008 indicates the actual location of the charging dock 804 on the device 802, as indicated by the graphical element 1008 coinciding with the dotted line representing the charging dock 804 shown in FIG. 10B. In this manner, the visual indication 1006 may illustrate, to the user, exactly where the accessory (here, the charging dock 804) is located on the back of the device, as well as what the size and the shape of the accessory is, via the display on the front of the device. The visual indication 1006 may also include a fill region 1009 inside the graphical element 1008. In some implementations, the fill region 1009 includes an opaque element, or a translucent element, or it may be empty (e.g., graphical objects that are displayed on the display and in the fill region 1009 when the visual indication 1006 is displayed may be viewable through the fill region 1009). Further, FIG. 10C illustrates the different location of the visual indication 1006 on the device 802, as compared to the visual indication 906 on the device 800, due to the different location of the attachment mechanism 814-2 in the device 802. And because the graphical element 1008 is based on the physical characteristic of the accessory (e.g., size, shape, width, height, etc.), the graphical element 1008 has a same size as the graphical element 908.

While FIG. 10C illustrates the graphical element 1008 having the same size and shape as the attached accessory, any physical dimensions of the accessory may be shown by a graphical element of a visual indication. For example, the graphical element may have a same width or length as the accessory. In some cases, the graphical element may have one physical dimension in common with the accessory, while in other cases it has more than one physical dimension in common. For example, the graphical element may have the same size and shape of the accessory, or it may have the same shape (e.g., a circle), but a different size (e.g., a different diameter). As described herein, however, the selection of the property of the graphical element, such as the size, shape, location, color, or the like, may be based on the particular accessory that is attached (as determined, for example, by a near-field wireless communication system).

FIG. 10C also illustrates other example graphical elements that the visual indication 1006 may include. For example, the visual indication 1006 may include a graphical element 1010 that corresponds to a location, size, and/or shape of the attachment mechanism 814-2. Because the attachment mechanism 814-2 has the same size and shape as the attachment mechanism 814-1, the graphical element 1010 may have the same size, shape, color, and/or other property as the graphical element 910 in FIG. 9C. Thus, both the visual indication 906 and the visual indication 1006 may have a common element (e.g., the graphical elements 910 and 1010).

The visual indication 1006 may also include graphical objects that indicate information about the accessory and/or how the accessory is attached. For example, as shown in FIG. 10C, the visual indication 1006 includes a graphical object 1012 that indicates a connection type to the accessory. In this example, the graphical object 1012 is a graphical representation of a magnet, indicating that the accessory (e.g., the charging dock 804) has been magnetically attached via the attachment mechanism 814-2. The same or a similar graphical object may be displayed when other, different accessories are attached via the attachment mechanism 814-2.

The visual indication 1006 may also include a graphical object 1014 that indicates a function of the accessory. In this example, the graphical object 1014 is a graphical representation of a lightning bolt, indicating that the accessory is a charging dock or is otherwise configured to charge the device 802. The same or a similar graphical object may be displayed when other accessories with charging functions are attached to the device 802 (e.g., auxiliary battery accessories, protective cases with built-in auxiliary batteries, etc.).

While FIGS. 10A-10C illustrate certain features in the context of an example accessory, it will be understood that the same features may apply to other accessories as well. For example, and as described in greater detail herein, a wallet accessory may have a substantially square or rectangular shape. As such, the visual indication that is displayed when the wallet accessory is attached may have a substantially square or rectangular graphical element with a same physical dimension as the wallet accessory (e.g., size, shape, width, height, etc.).

Figure 11A:
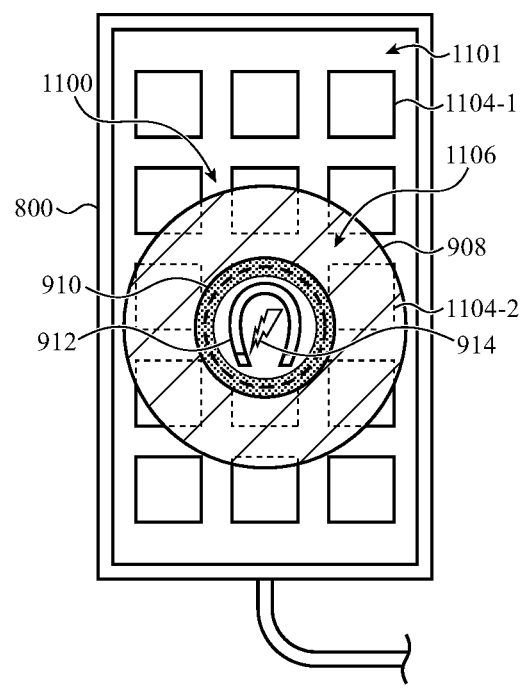
FIGS. 11A-11B depict example visual indications for display on a device in use with an accessory.
Figure 11B:
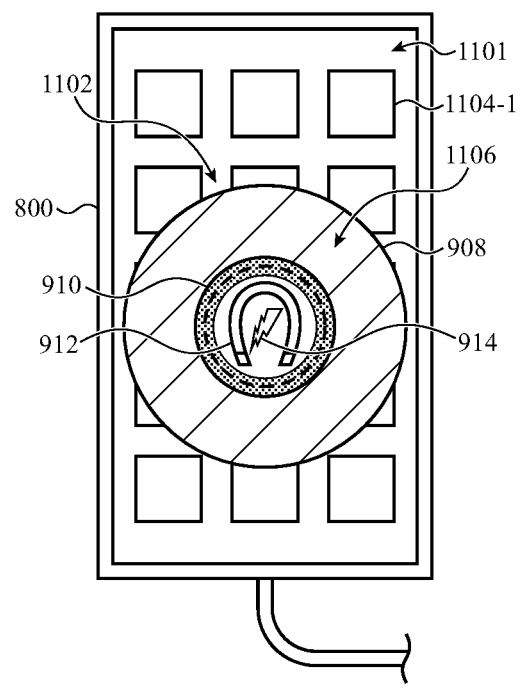

As noted above, a visual indication may include a fill region, such as the fill region 909. FIGS. 11A-11B illustrate example visual indications with different examples of fill regions. While FIGS. 11A-11B show the device 800 with the charging dock 804 attached, it will be understood that the fill regions described with respect to these figure applies equally to the visual indications displayed on other devices and in response to the attachment of other accessories.

FIG. 11A illustrates the device 800 with the charging dock 804 attached. The device 800 is displaying a first graphical user interface 1101. In some embodiments, the first graphical user interface 1101 is a home screen of the device 800. The first graphical user interface 1101 includes graphical objects 1104 (e.g., 1104-1, 1104-2), which may represent application icons or any other graphical object of the first graphical user interface 1101 of the device 800.

As used herein, a home screen may refer to a graphical user interface that includes one or more application icons or other selectable user interface objects that can be selected (e.g., by touching, tapping, pressing, clicking or otherwise selecting the application icon) to initiate or launch application programs for execution by the device. The home screen may differ from a lock screen based on the graphical content that is displayed on the home screen and the lock screen. Further, whether a home screen or a lock screen is displayed may depend at least in part on whether the device is in a locked or unlocked state. A user can transition the device from a locked state to an unlocked state via an authentication process (e.g., a password, a biometric authentication, or the like).

In FIG. 11A, the device 800 is also displaying a visual indication 1100, which is an embodiment of the visual indication 906, that overlies at least a portion of the graphical user interface 1101. The visual indication 1100 includes the graphical elements 908 and 910, and graphical objects 912 and 914. The visual indication 1100 also includes a fill region 1106. In the example of FIG. 11A, the fill region 1106 is a translucent graphical object, such that a portion of the graphical user interface 1101 is visible through the translucent graphical object. For example, graphical objects (or portions thereof) of the graphical user interface 1101 that are graphically behind or below the fill region 1106, such as the graphical object 1104-2, may remain at least partially visible through the fill region 1106. The fill region 1106 may have a color and/or pattern that is visually distinct from other portions of the graphical user interface (e.g., outside the graphical element 908). In some cases, the color and/or pattern of the fill region 1106 is based on a color and/or pattern of the accessory that is attached to the device 800. For example, if the charging dock 804 is white, the fill region 1106 may have a white hue that matches the charging dock 804.

In FIG. 11B, the device 800 is displaying the graphical user interface 1101 and a visual indication 1102, which is another embodiment of the visual indication 906, that overlies at least a portion of the graphical user interface 1101. The visual indication 1102 includes the graphical elements 908 and 910, and graphical objects 912 and 914. The visual indication 1102 also includes a fill region 1108. In the example of FIG. 11B, the fill region 1108 is opaque, such that graphical objects (or portions thereof) that are graphically behind or below the fill region 1108 are not displayed. Like the fill region 1106, the fill region 1108 may have a color and/or pattern that is visually distinct from other portions of the graphical user interface (e.g., outside the graphical element 908). In some cases, the color and/or pattern of the fill region 1108 is based on a color and/or pattern of the accessory that is attached to the device 800. For example, if the charging dock 804 is white, the fill region 1108 may have a white hue that matches the charging dock 804.

Figure 12:
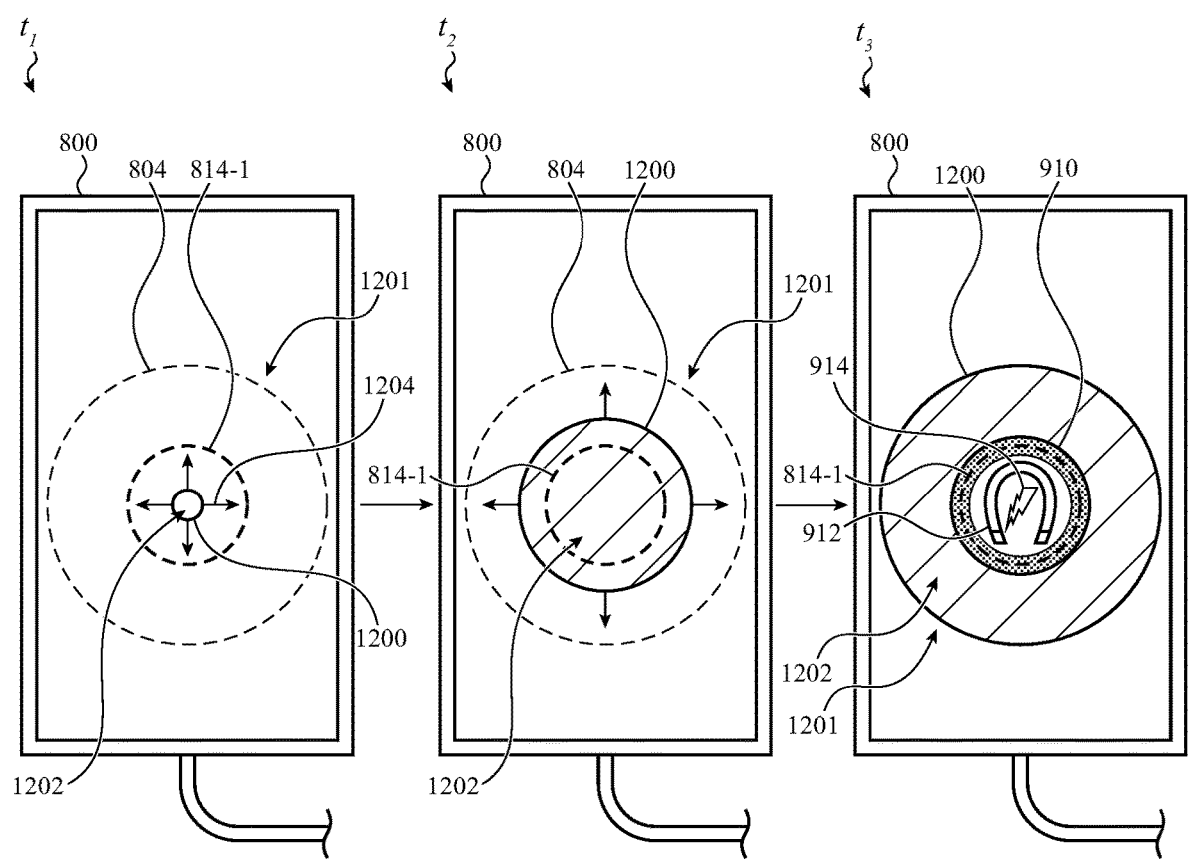
FIG. 12 depicts an example animation for a visual indication.

The visual indication that is displayed on a device in response to detecting an attachment of an accessory may include animations or other non-static visual content. FIG. 12 illustrates one such animation in which a respective portion of a visual indication expands outwardly from a location that corresponds to a location of the attachment mechanism in the device. For example, at time $t_1$, an accessory (e.g., the charger 804) has been attached to the device 800 via the attachment mechanism 814-1. In response to detecting the attachment of the accessory, the device 800 displays a visual indication 1201 that includes a boundary 1200. The boundary 1200 originates at a location that corresponds to the attachment mechanism 814-1, such as a center of the attachment mechanism 814-1. The boundary 1200 encloses a fill region 1202, and expands or radiates outward from its origin, as indicated by arrows 1204.

As the animation continues, shown at $t_2$, the boundary 1200 has expanded (past the location of the attachment mechanism 814-1, and continues to expand until it reaches the size and shape of the charging dock 804 (or any other suitable accessory, such as a wallet accessory, auxiliary battery accessory, or the like). At time $t_3$, the boundary 1200 and fill region 1202 have expanded to their full and final size and shape, which coincides with the size and shape of the attached accessory. The resulting visual indication 1201 includes the boundary 1200 and the fill region 1202, which may be the same as or similar to the graphical element 908 and the fill region 909 of FIG. 9C, as well as the graphical elements 908 and 910, and graphical objects 912 and 914. The fill region 1202 may be translucent or opaque, as described above with respect to FIGS. 11A-11B.

FIG. 12 shows the example animation of the visual indication with reference to a visual indication that is displayed in response to the attachment of a charging dock. A similar animation may be displayed, however, with visual indications that are displayed in response to the attachment of different accessories. In such cases, the particular shapes, sizes, colors, and/or other properties of the portions that are animated (e.g., expand outwardly) may correspond to (e.g., match) the shapes, sizes, colors, and/or other properties of the attached accessories. For example, a rectangular wallet accessory may cause a rectangular boundary to expand (e.g., radiate) outwardly from a location of the attachment mechanism 814-1, until it reaches the size and shape of the wallet accessory. While FIG. 12 shows dotted lines representing the attachment mechanism 814-1 and the outer boundary of the charging dock 804, these are provided for reference and are not included as graphical objects of the visual indication 906.

Figure 13A:
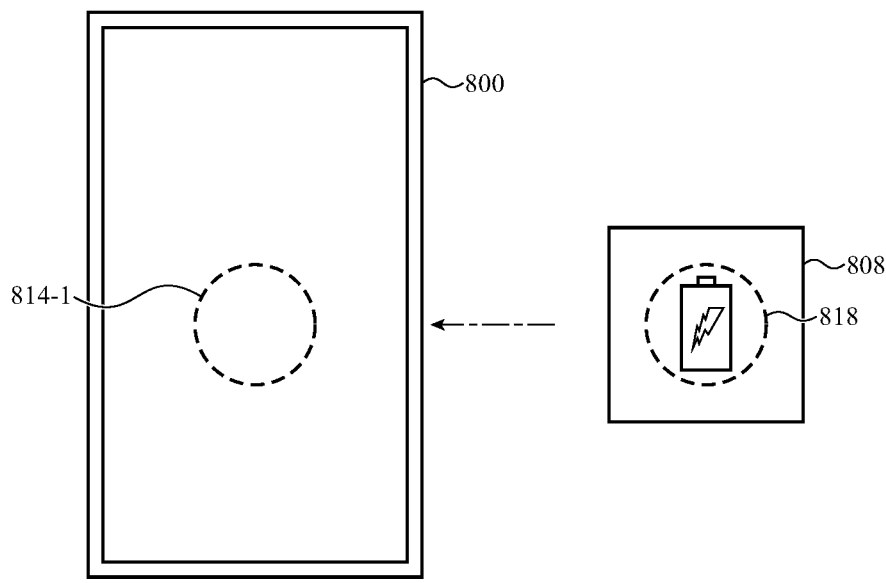
FIG. 13A-13C depict an example electronic device in use with an accessory.
Figure 13B:
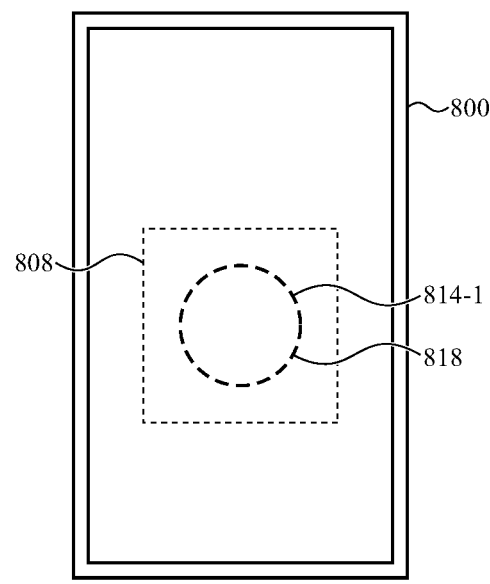
Figure 13C:
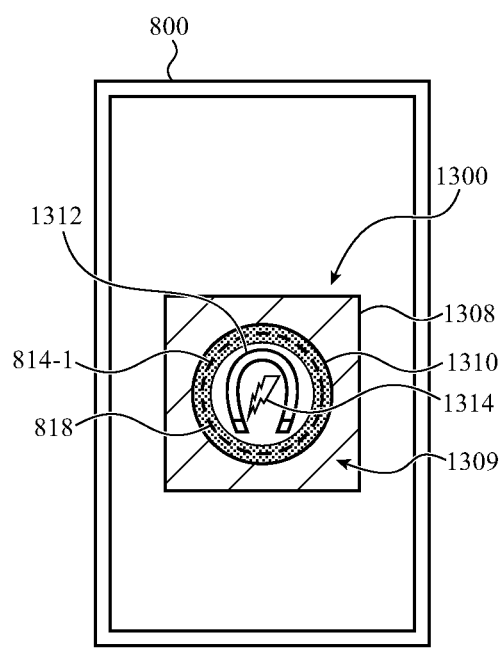

FIGS. 13A-13C illustrate another example accessory being attached to the device 800. In particular, FIGS. 13A-13C illustrate the auxiliary battery accessory 808 being attached to the device 800. FIG. 13A illustrates the device 800 with the representation of the attachment mechanism 814-1, as well as the auxiliary battery accessory 808 with its attachment mechanism 818. In some implementations, the auxiliary battery accessory 808 includes a battery and a wireless charging system to facilitate wireless charging of the device 800 by the battery accessory 808.

FIG. 13B illustrates a front view of the device 800 with the auxiliary battery accessory 808 attached to the back of the device 800. As illustrated in FIG. 10B, the attachment mechanism 814-1 of the device 800 and the attachment mechanism 818 of the auxiliary battery accessory 808 may be coincident with one another, and are thus represented by a single broken circle in FIG. 13B. FIG. 13B also shows, in dotted lines, the location and physical dimensions of the auxiliary battery accessory 808 along the back side of the device 800. As noted above, the attachment mechanisms 814-1, 818 may be configured so that the auxiliary battery accessory 808 attaches to the device 800 in a predetermined orientation, such as with its sides (e.g., top, bottom, left, and right sides) parallel to the sides (e.g., top, bottom, left, and right sides) of the device 800. While the instant figures show dotted lines representing the attachment mechanisms 814-1 and 818, these are provided for reference and are not included as graphical objects of the visual indication 906.

The device 800 detects attachment of the auxiliary battery accessory 808, and in response to detecting the attachment of the auxiliary battery accessory 808, displays a visual indication 1300 that the accessory has been attached to the device. The visual indication 1300 may indicate at least one property of the physical dimensions of the auxiliary battery accessory 808. For example, the visual indication 1300 may include a graphical element 1308 that has a size and a shape that is the same as the size and the shape of the auxiliary battery accessory 808. As shown in FIG. 13C, for example, the graphical element 1308 is a square (or substantially rectangular shape) that has the same size and shape (or approximately the same size and shape) as the square auxiliary battery accessory 808. Further, the graphical element 1308 indicates the actual location of the auxiliary battery accessory 808 on the device 800, as indicated by the graphical element 1308 coinciding with the border of the auxiliary battery accessory 808 shown in broken lines in FIG. 13B. In this manner, the visual indication 1300 may illustrate, to the user, exactly where the accessory (here, the auxiliary battery accessory 808) is located on the back of the device, as well as what the size and the shape of the accessory is, via the display on the front of the device. The visual indication 1300 may also include a fill region 1309 inside the graphical element 1308. In some implementations, the fill region 1309 includes an opaque element, or a translucent element, or it may be empty (e.g., graphical objects that are displayed on the display and in the fill region 1309 when the visual indication 1300 is displayed may be viewable through the fill region 1309).

FIG. 13C also illustrates other example graphical elements and/or graphical objects that the visual indication 1300 may include. For example, as shown in FIG. 13C the visual indication 1300 includes a graphical element 1310 that corresponds to a location, size, and/or shape of the attachment mechanism 814-1 (e.g., a ring or circle that is coincident with the location of the attachment mechanism 814-1). The visual indication 1300 also includes graphical objects that indicate information about the accessory and/or how the accessory is attached. For example, the visual indication 1300 includes a graphical object 1312 that indicates a connection type to the accessory (e.g., a magnet, indicating that the accessory has been magnetically attached), and a graphical object 1014 that indicates a function of the accessory (e.g., a graphical representation of a lightning bolt, indicating the that accessory is configured to charge the device 800).

As described herein, different visual indications associated with different accessories may have common elements. For example, the visual indication 906 (FIG. 9C) and the visual indication 1300 (FIG. 13C) both include a common graphical element (e.g., the graphical elements 910, 1310) displayed at a location that corresponds to a location of the attachment mechanism 814-1. This common graphical element indicates that the accessories, though they are different accessories, both attach to the device 800 using the same attachment mechanism. Other similarities between accessories may also be indicated by other common graphical elements and/or graphical objects in the visual indications. For example, the charging dock 804 and the auxiliary battery accessory 808 both attach to the device 800 magnetically, and both provide power to charge the device 800. Accordingly, the visual indication 906 (FIG. 9C) and the visual indication 1300 (FIG. 13C) both include a common graphical object indicating the magnetic attachment technique (the magnet graphic 912, 1312) and a common graphical object indicating the charging functionality (the lightning bolt 914, 1314). Of course, the magnet and lightning bolt are merely examples, and other graphical elements and/or objects may be used instead of or in place of the magnet and lightning bolt.

FIG. 13C also illustrates how the different physical properties of different accessories result in visual indications that have different properties. For example, the auxiliary battery accessory 808 (attached to the device 800 in FIG. 13C) has a first shape (e.g., square), and the charging dock 804 (attached to the device 800 in FIG. 9C) has a second shape that is different from the first shape (e.g., circular). Accordingly, the visual indication 1300 has a graphical element 1308 having the first shape (e.g., square), and the visual indication 906 has a graphical element 908 having the second shape (e.g., circular). In some implementations, a similar result occurs when the accessories have different sizes. For example, if the first accessory has a first size and the second accessory has a second size, the first visual indication has the first size and the second visual indication has the second size. With reference to the visual indications 906 and 1300, for example, the auxiliary battery accessory 808 is shorter (e.g., in a vertical direction) than the charging dock 804. Accordingly, the visual indication 1300 has a graphical element 1308 that is shorter (e.g., in the vertical direction) than the graphical element 908 of the visual indication 906.

Figure 14A:
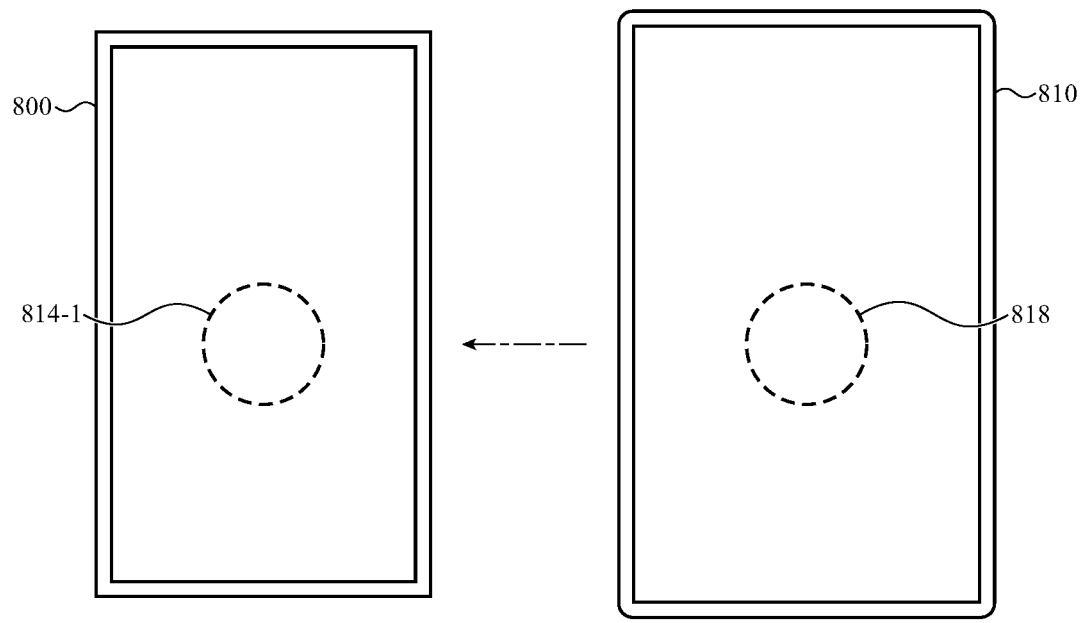
FIGS. 14A-14B depict an example electronic device in use with a case.
Figure 14B:
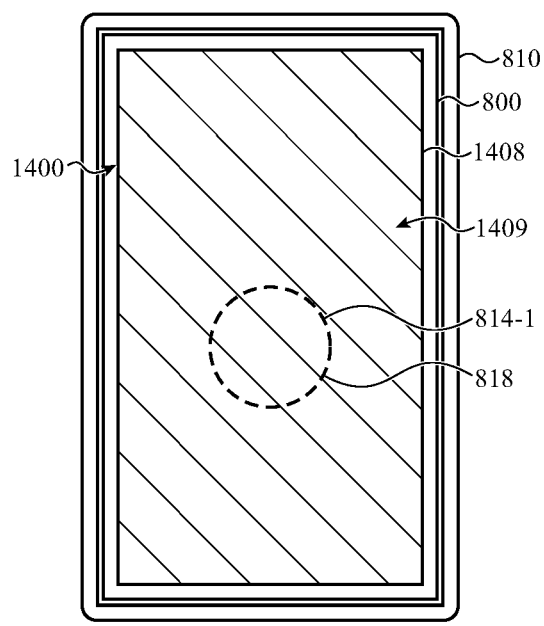

FIGS. 14A-14B illustrate another example accessory being attached to the device 800. In particular, FIGS. 14A-14B illustrate the protective case 810 being attached to the device 800. FIG. 14A illustrates the device 800 with the representation of the attachment mechanism 814-1, as well as the protective case 810 with its attachment mechanism 818. In some implementations, the protective case 810 lacks an attachment mechanism. In such cases, the protective case 810 may include other retention or coupling features to retain the protective case 810 to the device 800 (e.g., clips, flanges, fasteners, etc.). Whether or not the protective case 810 includes an attachment mechanism 818, the protective case 810 includes a near-field wireless communication antenna or other component(s) that facilitate detection, by the device 800, of the protective case 810 being attached to the device 800.

The device 800 detects attachment of the protective case 810, and in response to detecting the attachment of the protective case 810, displays a visual indication 1400 that the accessory has been attached to the device. The visual indication 1400 may indicate at least one property of the protective case 810. For example, the visual indication 1400 may include a graphical element 1408 (e.g., a border) displayed at the outermost area of the display of the device 800, indicating that the protective case 810 completely covers the back of the device 800. The visual indication 1400 may also include a fill region 1409 inside the graphical element 1408. In some implementations, the fill region 1409 includes an opaque element, or a translucent element, or it may be empty (e.g., graphical objects that are displayed on the display and in the fill region 1409 when the visual indication 1400 is displayed may be viewable through the fill region 1409). In some implementations, the fill region 1409 has a color that matches or is based on a color of the protective case 810. In some implementations, the visual indication 1400 is displayed as part of a color effect in which a wash of color sweeps across the display of the device when the protective case 810 is attached to the device 800. The color (e.g., corresponding to the fill region 1409) may sweep across the display as shown in FIG. 3C, resulting in an at least temporary display of the fill region 1409 occupying all or substantially all of the display. In some implementations, the visual indication 1400 omits the graphical element 1408, and the fill region 1409 is borderless. In some implementations, the color wash effect includes an animation in which the color expands outward from a location corresponding to the attachment mechanism 814-1.

Figure 15A:
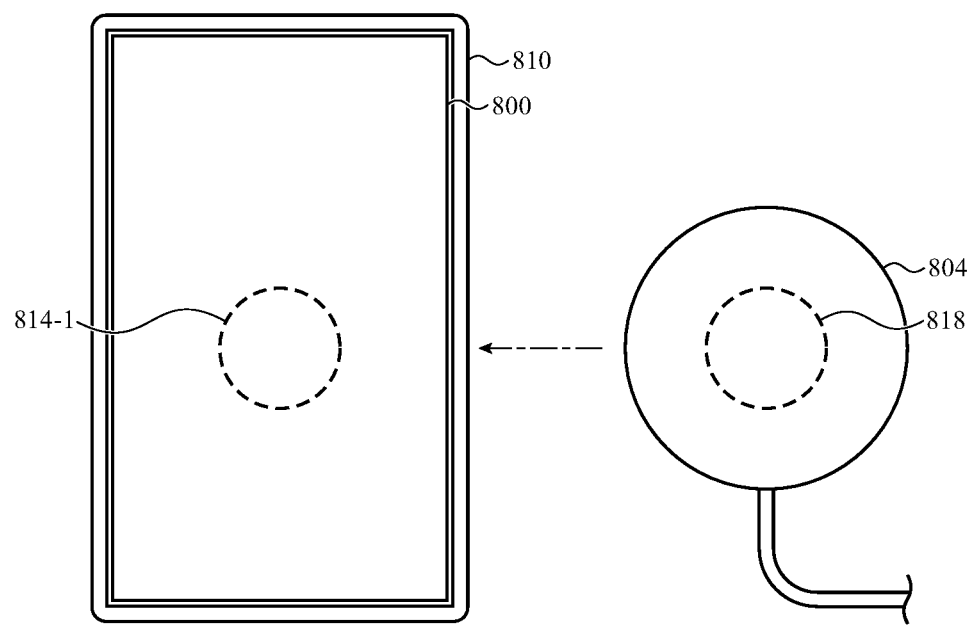
FIGS. 15A-15B depict an example electronic device in use with a case and an accessory.
Figure 15B:
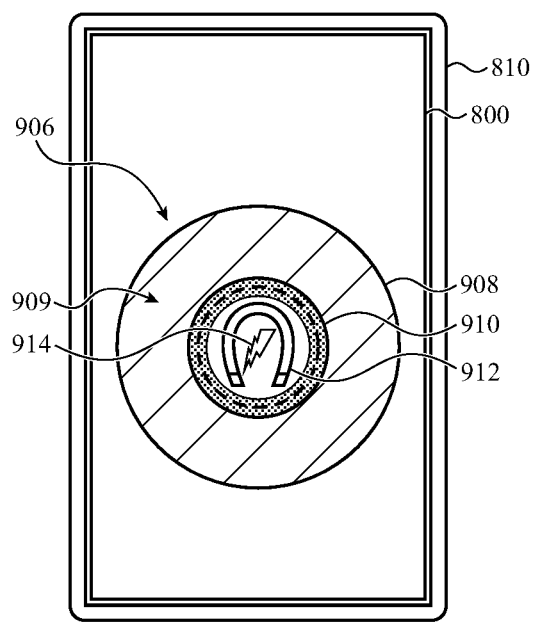

In some implementations, multiple accessories may be used together simultaneously with a single device. For example, both a protective case (e.g., the protective case 810) and an additional accessory, such as an auxiliary battery accessory, wallet accessory, charging dock, or the like, may be attached to a device. In such cases, each accessory may trigger the display of a visual indication that indicates the attachment of the accessory to the device, even if another accessory is already attached to the device. FIGS. 15A-15B illustrate an example in an additional accessory (e.g., the charging dock 804) is attached to the device 800 while the device 800 has the case 810 attached. FIG. 15A shows the device 800 prior to attachment of the charging dock 804. FIG. 15B shows the device 800 after attachment of the charging dock 804. In particular, the device 800 detects attachment of the additional accessory (e.g., the charging dock 804), and, in response to detecting the attachment of the additional accessory, the device 800 displays a visual indication indicating that the additional accessory has been attached to the device, where the visual indication indicates at least one property of the physical dimensions of the additional accessory. The visual indication shown in FIG. 15B is the visual indication 906, because the accessory is the charging dock 804. Accordingly, the visual indication 906 indicates a physical dimension of the charging dock 804, as described above with respect to FIGS. 9A-9C.

FIGS. 14A-15B also illustrate how different accessories having different physical dimensions cause visual indications having different physical dimensions to be displayed. For example, the visual indication 1400 in FIG. 14B occupies the entire area of the display, while the visual indication 906 occupies less than an entire area of the display.

Figure 16A:
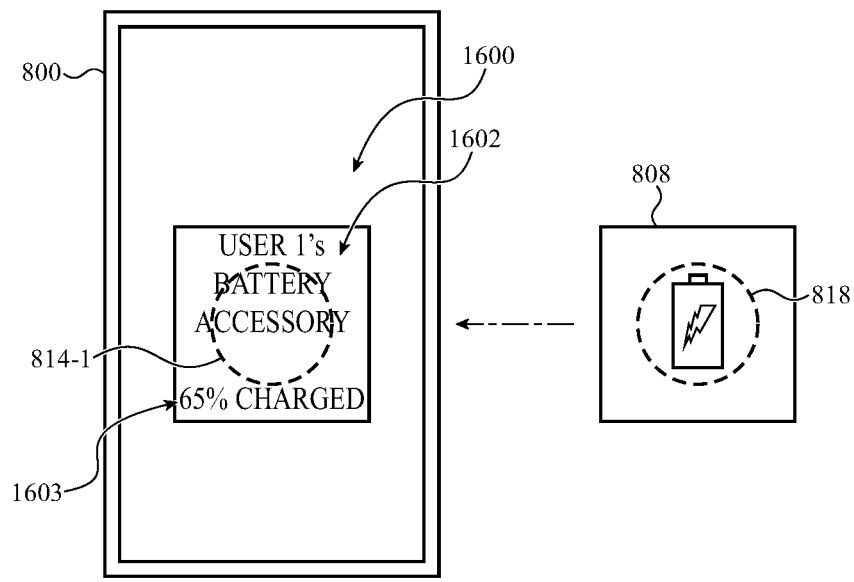
FIGS. 16A-16B depict an example electronic device in use with additional accessories.
Figure 16B:
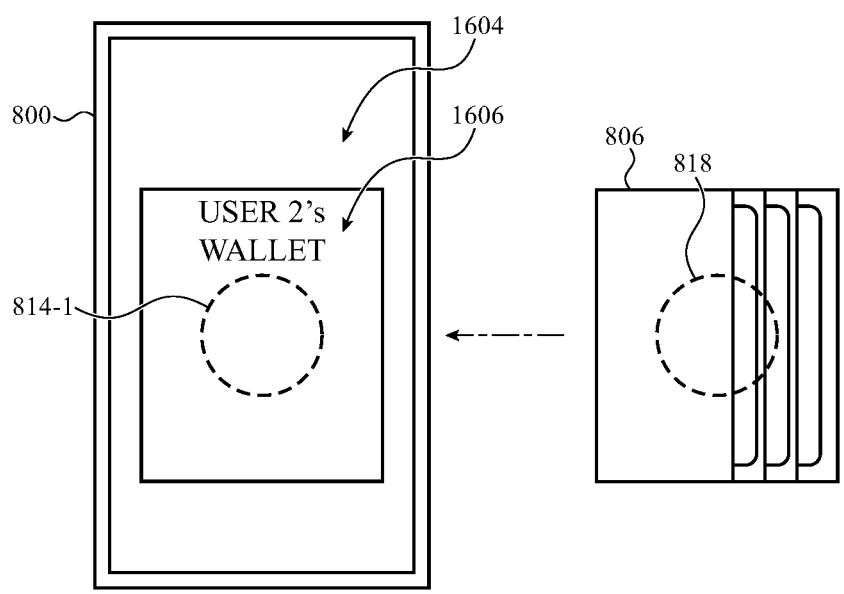

Visual indications that are displayed in response to detecting attachment of an accessory may also include information associated with the accessory. In some implementations, the visual indications include text that indicates a name of the owner of the accessory, a state of charge of the accessory (e.g., if the accessory includes a battery, such as in the case of an auxiliary battery accessory), a room or location associated with the accessory (e.g., if the accessory is a dock or other accessory that is located in a bedroom, kitchen, living room, or the like). FIGS. 16A-16B illustrates example visual indications that include information associated with an accessory.

FIG. 16A, for example, shows the device 800 displaying a visual indication 1600 after the auxiliary battery charging accessory 808 is attached to the device 800. The visual indication 1600 includes information 1602 and 1603 associated with the accessory. In particular, as shown in FIG. 16A, the information 1602 includes a name of the accessory's owner (e.g., "User 1's Battery Accessory"), and the information 1603 includes a state of charge of the accessory (e.g., "65% Charged"). FIG. 16B shows the device 800 displaying a visual indication 1604 after a different accessory (e.g., the wallet accessory 806) is attached to the device 800. The visual indication 1604 includes information 1606 associated with the accessory. In particular, as shown in FIG. 16B, the information 1606 includes a name of the accessory's owner (e.g., "User 2's Wallet"). Other types of information associated with an accessory may be displayed, and different accessories may cause different information to be displayed. For example, a user may be able to assign names to accessories to help personalize the accessories and personalize the visual indications that are displayed upon detection of the attachment of the accessory.

In some cases, devices also produce outputs in response to detachment of an accessory. For example, as noted above with respect to FIG. 3P, in response to detecting detachment of a wallet accessory from the device, the device may display a map with a graphical indicator representing the location where the wallet accessory was detached. In some implementations, instead of or in addition to displaying a visual indication such as a map, a device may produce a non-visual output, such as a tactile output and/or an audio output.

Figure 17A:
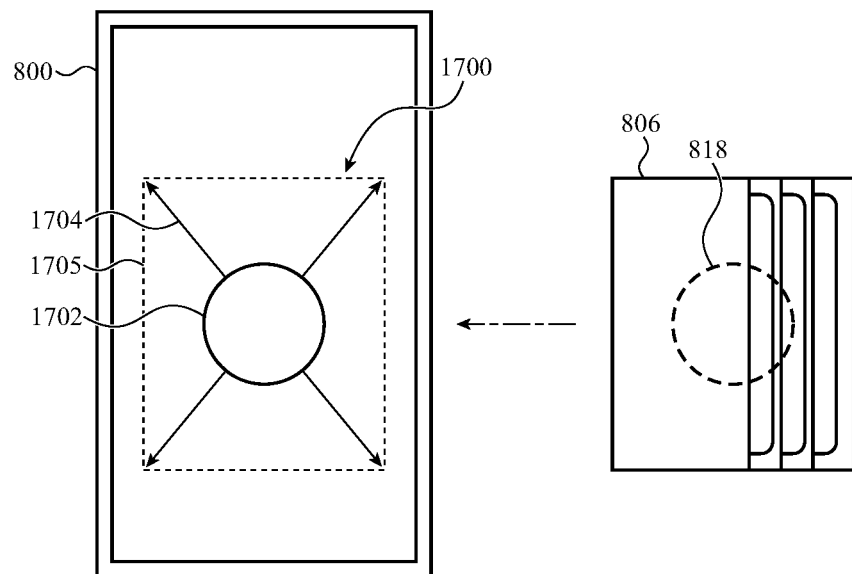
FIGS. 17A-17B depict an example electronic device having an accessory attached and detached.
Figure 17B:
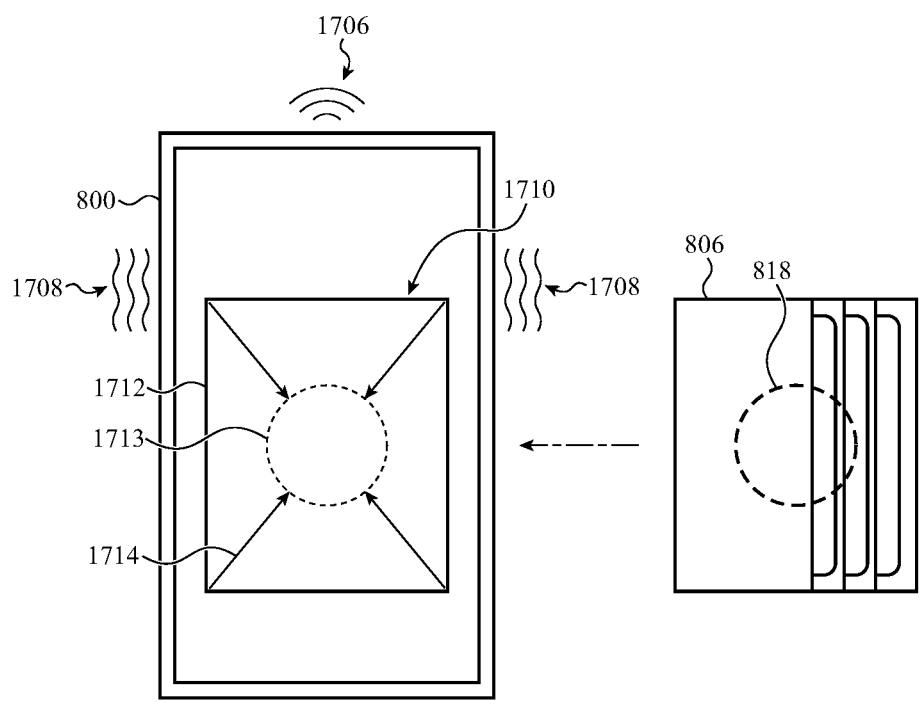

FIGS. 17A-17B illustrate example detach outputs that may be produced in response to attachment and detachment of an accessory and a device. Detach outputs indicate that the accessory has been detached from the device. In some implementations, detach outputs include tactile outputs, such as vibrations, and/or audio outputs, such as beeps or tones. In some implementations, detach outputs include visual indications, such as a textual alert and/or a map showing a detachment location.

As shown in FIG. 17A, when an accessory, such as the wallet accessory 806, is attached to the device 800, the device detects attachment of the accessory. In some implementations, in response to the detection, the device 800 displays a visual indication 1700. The visual indication 1700 may include a portion (e.g., the border 1702) that expands outward (as indicated by arrows 1704) from a location that corresponds to the attachment mechanism. As described above, the border 1702 may expand outward until it reaches the border 1705 that corresponds to the size and shape of the wallet accessory, as indicated by the broken-line border 1705.

FIG. 17B illustrates operation of the device 800 in response to detecting detachment of the wallet accessory 806. The device 800 detects detachment of the accessory, which may be intentional or accidental, from the device 800. In some implementations, in response to detecting the detachment, the device 800 produces a detach output indicating that the accessory has been detached from the device. In some implementations, generating the detach output includes generating a non-visual output, such as a tactile output and/or audio output indicating detachment of the accessory.

In some implementations, the device 800 produces a detach output in response to detachment of some accessories, but not in response to detachment of other accessories. For example, in response to detecting the detachment of an accessory, in accordance with a determination that the accessory is a first type of accessory, the device 800 generates a detach output, and in accordance with a determination that the accessory is a second type of accessory, the device 800 foregoes generation of the detach output. In some implementations, generating the detach output includes generating a tactile output 1708 and/or audio output 1706 indicating detachment of the accessory. In some implementations, forgoing generation of the detach output includes foregoing generation of a tactile output 1708 and/or audio output 1706 indicating detachment of the accessory.

In some implementations, the tactile output 1708 is a vibration, impulse, or the like. In some implementations, the audio output 1706 is a beep, tone, melody, song, voice alert, or the like. In some implementations, a detach output includes both tactile and audio outputs. In some implementations, the detach output includes a non-visual output (e.g., the tactile output and/or audio output) and/or a visual indication.

In some implementations, the tactile output and/or audio output included in the detach output is the same as a tactile output and/or audio output that is generated when the accessory is attached. In some implementations, the tactile output and/or audio output in the detach output is different from a tactile output and/or audio output that is generated when the accessory is attached. In some implementations, the tactile output and/or audio output in the detach output includes a component of the tactile output and/or audio output that is generated when the accessory is attached and includes a component that is different from the tactile output and/or audio output that is generated when the accessory is attached. For example, in some implementations, the audio output that is generated when the accessory is attached is the same as the audio output that is generated when the accessory is detached, and the tactile output that is generated when the accessory is attached is the same as the tactile output that is generated when the accessory is detached. In some implementations, the audio output that is generated when the accessory is attached is different from the audio output that is generated when the accessory is detached, and the tactile output that is generated when the accessory is attached is the same as the tactile output that is generated when the accessory is detached. In some implementations, the audio output that is generated when the accessory is attached is the same as the audio output that is generated when the accessory is detached, and the tactile output that is generated when the accessory is attached is different than the tactile output that is generated when the accessory is detached. In some implementations, the audio output that is generated when the accessory is attached is different than the audio output that is generated when the accessory is detached, and the tactile output that is generated when the accessory is attached is different than the tactile output that is generated when the accessory is detached.

As noted above, whether or not a detach output is produced may depend on the type of accessory that is detached. In some implementations, the detach output is produced if the detached accessory is a wallet accessory, and is not produced if the detached accessory is a charging dock, protective case, or auxiliary battery accessory. In some implementations, whether a non-visual output is produced when a particular type of accessory is detached is based on a user preference (e.g., the user can select particular accessories and/or particular types of accessories that will produce non-visual outputs upon their detachment). In some implementations, whether a non-visual output is produced when a particular type of accessory is detached is based on a predetermined setting based on the accessory type. In some implementations, accessories that include or may contain personally identifiable information about a user, such as a wallet accessory, produce non-visual outputs when detached, while other accessories, such as auxiliary battery accessories, do not.

In some implementations, a detach output includes a visual detach indication. In some implementations, the visual detach indication includes a map showing a location at the time of detachment. In some implementations, the visual detach indication includes textual information about the detached accessory and/or the detachment event. In some implementations, the visual detach indication includes a graphic.

In some implementations, the visual detach indication appears to be the opposite of a visual indication that is displayed in response to detection of the attachment of the accessory. For example, in some implementations, the first visual indication (e.g., the visual indication that is displayed in accordance with a determination that an attached accessory is a first accessory) is an animated visual indication, and the second visual indication (e.g., the visual indication that is displayed in accordance with a determination that an attached accessory is a second accessory) is an animated visual indication, and displaying the visual detach indication includes, in accordance with a determination that the accessory is the first accessory, displaying a third visual indication that includes a reversal of at least a portion of (or all of) the first visual indication, and in accordance with a determination that the accessory is the second accessory, displaying a fourth visual indication that is different from the third visual indication and that includes a reversal of at least a portion of (or all of) the second visual indication. The fourth visual indication may be different than the third visual indication in size, color, content, or the like. For example, the first accessory may be smaller than the second accessory, and as such the third visual indication (e.g., the visual detach indication for the first accessory) may be smaller than the fourth visual indication (e.g., the visual detach indication for the second accessory).

FIG. 17B illustrates an example visual detach indication 1710 that may be displayed in response to detecting detachment of an accessory. In this example, the visual detach indication 1710 includes a graphical element 1712 (e.g., a border or boundary) that coincides with the size, shape, and/or position of the wallet accessory 806 on the back of the device 800. The visual detach indication 1710 may also include an animation in which the graphical element 1712 retracts inward (as indicated by the arrows 1714) to a location 1713 that corresponds to the attachment mechanism 814-1. The retracting animation of the visual detach indication 1710 that is displayed in response to detecting detachment may appear to be the opposite to the expanding animation of the visual indication 1700 that is displayed in response to detecting attachment of the accessory. Like the non-visual outputs described above, in some implementations the visual detach indication 1710 is produced in accordance with a determination that the accessory is a first accessory, and is not produced in accordance with a determination that the detached accessory is a second accessory. For example, in some cases the visual detach indication 1710 is produced if the detached accessory is a wallet accessory, and is not produced if the detached accessory is a charging dock, protective case, or auxiliary battery accessory.

Whether or not the visual detach indication 1710 is displayed may depend on a status of the device 800 when the detachment is detected. For example, in some implementations, if the device 800 is displaying a lock screen (or an application graphical user interface), the visual detach indication 1710 is shown in response to detecting detachment of the accessory, and if the device 800 is displaying a home screen, the visual detach indication 1710 is not shown in response to detecting detachment of the accessory.

The visual detach indication 1710 shown in FIG. 17B is one example visual detach indication that may be displayed in response to detecting that an accessory has been detached. In some implementations, the visual detach indication 1710 includes a map (e.g., the map 373 in FIG. 3P). In some implementations, the visual detach indication is displayed until it is acknowledged by the user (e.g., by the user selecting a selectable user interface object), or for a duration (e.g., 10 seconds, 20 seconds, or the like).

Figure 18A:
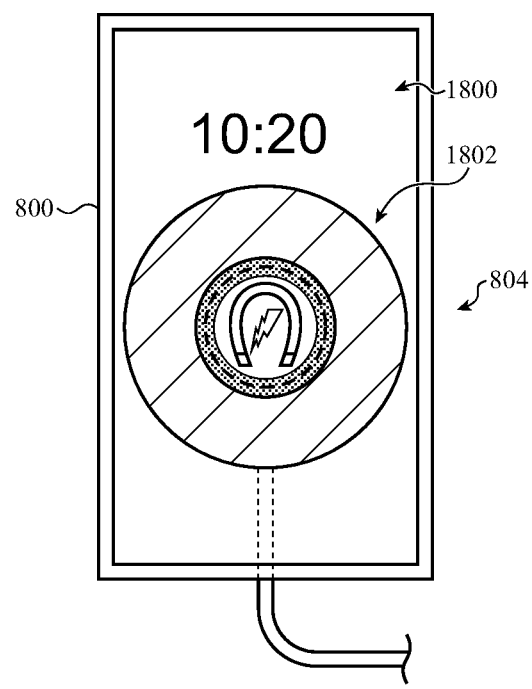
FIGS. 18A-18B depict an example electronic device in different states in use with an accessory.
Figure 18B:
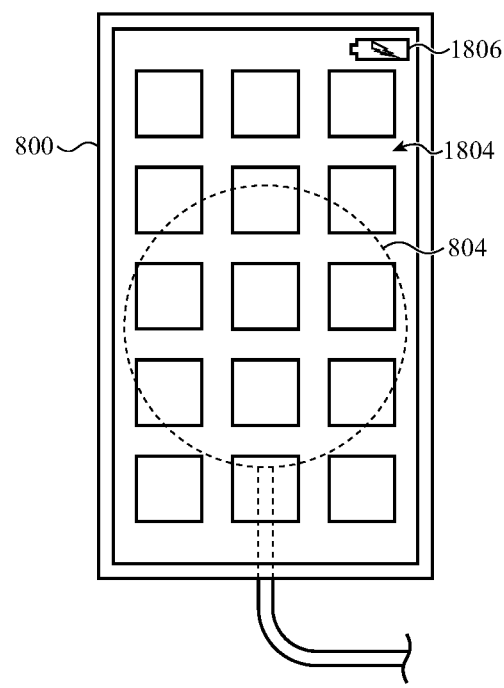

As noted in several examples above, whether or not a particular visual indication is displayed in response to detection of an attachment or detachment of an accessory may be based at least in part on a state of the device, such as what the display is displaying at the time of detection (e.g., a lock screen, a home screen, an application graphical user interface), a lock state of the device at the time of the detection, or the like. FIGS. 18A-18B illustrate examples of how different device states may result in different visual indications being displayed in response to detecting attachment of an accessory. While FIGS. 18A-18B relate to visual indications shown in response to detecting an attachment of a particular accessory (e.g., the charging dock 804), the same concepts apply to visual detach indications (as well as non-visual indications) that are displayed or otherwise produced in response to detecting a detachment of other accessories (e.g., the wallet accessory, the auxiliary battery accessory, a protective case, etc.).

FIG. 18A illustrates the device 800 in a first state. In the example of FIG. 18A, the first state corresponds to the device 800 being locked and displaying a lock screen 1800, though this is merely one example. In other examples, the first state corresponds to a different device state, such as the device displaying being locked but not displaying anything, the device displaying a home screen, or the like.

A lock screen, such as the lock screen 1800, may be displayed when the device is locked, the user has not been authenticated, and/or the user has not provided a password, passcode, or otherwise authorized the unlocking of the device. In some implementations, the lock screen 1800 does not include application icons, or includes a limited set of application icons (e.g., those that have been selected by the user). In some implementations, device functions and/or data that are available via the lock screen (e.g., in response to a user selection of an application icon or other selectable user interface object) may be limited (e.g., personally identifiable information or applications that may access personally identifiable information may be inaccessible).

In some implementations, in accordance with a determination that the device 800 is in the first state (e.g., displaying the lock screen 1800) when the attachment of the accessory is detected, the device 800 displays the first visual indication in accordance with a determination that the accessory is the first accessory. For example, as shown in FIG. 18A, the device 800 determines that the attached device is the charging dock 804 (on the back of the device 800) and displays a visual indication 1802 (which corresponds to the visual indication 1006 associated with the charging dock 804). The device 800 may also display a second visual indication in accordance with a determination that the accessory is a second accessory. Thus, for example, if the accessory were the wallet accessory 806 instead of the charging dock 804, the device 800 would display a different visual indication (e.g., the visual indication 1604, FIG. 16B).

In some implementations, in accordance with a determination that the device is in a second state, different from the first state, when the attachment of the accessory is detected, the device 800 forgoes display of the first visual indication and/or the second visual indication. For example, FIG. 18B illustrates the device 800 in an example second state, in which the device 800 is displaying a home screen 1804. In other examples, the second state corresponds to the device 800 displaying an application graphical user interface. As described above, the home screen 1804 may include one or more application icons (selectable user interface objects), which, when selected, initiates an application and/or causes the device to display an application graphical user interface. When the charging dock 804 (or other example accessory) is attached to the device 800 when the device 800 is in the second state, the device 800 may forego display of the visual indication that is displayed when the charging dock 804 is attached when the device is in the first state.

In some implementations, a different visual indication is provided in response to the device 800 detecting attachment of the accessory when the device 800 is in the second state. The different visual indication may be different than the visual indication that is displayed when the device 800 is in the first state and detects attachment of the same accessory. For example, FIG. 18B illustrates a visual indication 1806 that is optionally displayed by the device 800 in response to the device 800 detecting attachment of the charging dock 804 when the device 800 is in the second state. In some implementations, the visual indication 1806 is smaller than the visual indication 1802. In some implementations, the optional visual indication 1806 is displayed in a border region of the display that includes system status information, a graphical representation of a current time, battery charge status, or the like.

As described above with respect to FIG. 3D-3F, a device may change from displaying a first graphical user interface to a second graphical user interface in response to the device being used with a case that partially covers the display of the device, but which has an opening or window through which part of the display remains visible. FIGS. 19A-20B illustrate examples of how devices may transition between different graphical user interfaces when the devices detect that they have been inserted in or otherwise attached to cases that define openings that allow limited viewing of the device display. For example, when used without the protective case, a device may display graphical content in an entire display area, and when used with the protective case, display graphical content in only a portion of the display area. As described herein with respect to FIGS. 21A-21B, the limited area that is viewable through the window of a protective case may be referred to as a second region of the display, while an area outside the second region (e.g., which is covered by the protective case) may be referred to as a first region of the display. In some implementations, the first region and the second region together define the entire display area.

Figure 19A:
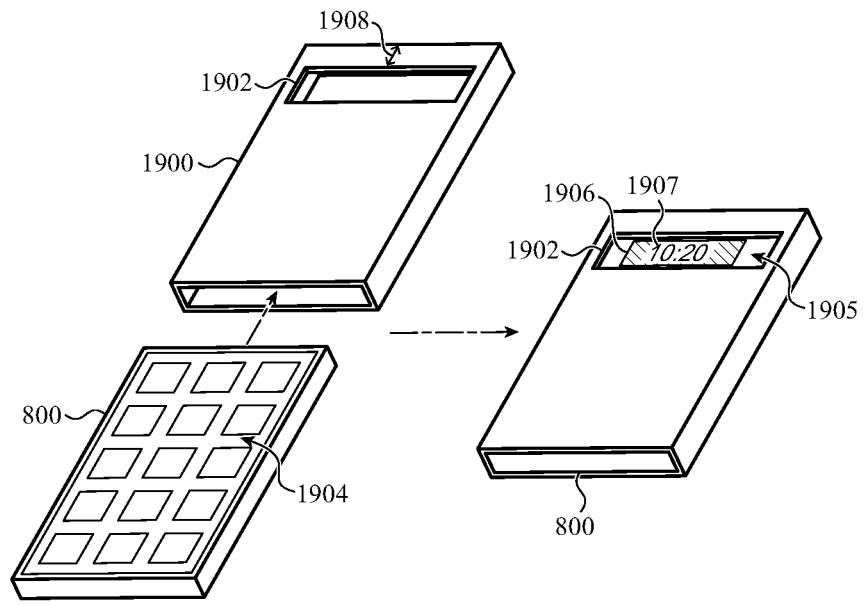
FIG. 19A depicts an example electronic device in use with a case.

With reference to FIG. 19A, in some implementations a device, such as the device 800, displays a first graphical user interface 1904. In the example shown in FIG. 19A, the first graphical user interface 1904 is a home screen that includes selectable user interface objects (e.g., application icons) displayed in a first region of the display and in the second region of the display (as described in greater detail with respect to FIGS. 21A-21B).

Figure 21A:
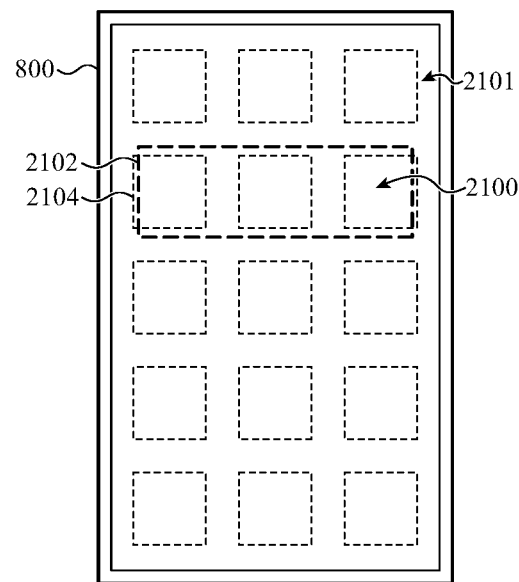
FIGS. 21A-21B depict example display regions of example electronic devices.

In some implementations, the first graphical user interface 1904 includes first graphical content displayed in a first region of the display, and second graphical content displayed in a second region of the display, where the second region is different than the first region. FIG. 21A illustrates the first and second regions of the display. For example, the first region 2101 corresponds to the area outside the border 2102 (e.g., the border of the opening 1902 in the protective case 1900), and the second region 2100 corresponds to the area inside the border 2102. As shown in FIG. 19A, the first region of the display is covered by the case 1900, and the second region of the display is visible through an opening 1902 in the case 1900 (e.g., in a wall of the case 1900 that covers at least part of the display of the device 800).

Once the device 800 is coupled to the case 1900 (e.g., by inserting the device 800 into an opening of the case 1900), the device 800 detects the coupling of the case 1900 to the device 800. In some implementations, detection is performed using a near-field wireless communication system of the device 800 and a near-field wireless communication antenna of the case 1900.

In response to detecting the coupling of the case 1900 to the device 800, the device 800 transitions from displaying the first graphical user interface 1904 to displaying a second graphical user interface 1905, where the transitioning includes ceasing to display the second graphical content in the second region of the display (e.g., ceasing to display application icons or other graphical content in the area of the display corresponding to the opening 1092), and displaying a second graphical user interface 1905 on the display. The second graphical user interface 1905 includes third graphical content, different from the second graphical content, displayed in the second region of the display. For example, the second graphical user interface 1905 includes graphical content in the opening 1902 that is different than what was displayed by the first graphical user interface.

In some implementations, the transition from the first graphical user interface 1904 to the second graphical user interface 1907 further includes, prior to displaying the second graphical user interface, displaying a black background graphic in the second region of the display. The black background may be displayed for a predetermined time prior to displaying the second graphical user interface 1907 (e.g., 1 second, 2 seconds, 3 seconds, etc.).

Figure 19B:
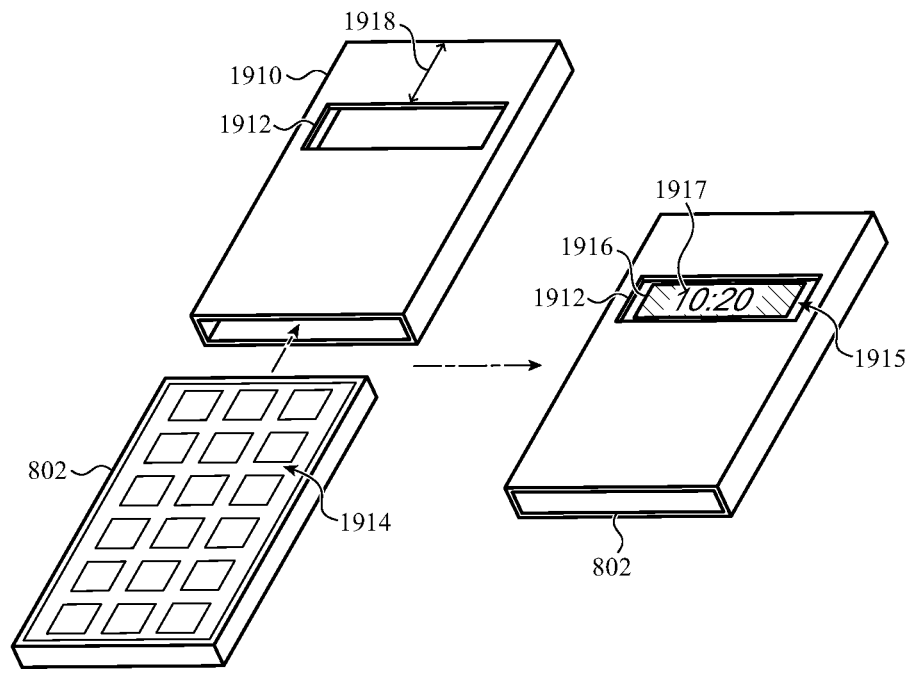
FIG. 19B depicts another example electronic device in use with another case.

The second graphical user interface 1905 includes different content in the second region (e.g., the second region 2100, FIG. 21A) than what was the first graphical user interface 1904. For example, as shown in FIG. 19B, first graphical user interface 1904 includes selectable user interface objects, while the second graphical user interface 1905 includes a background graphic 1906 and a foreground graphic 1907. In some implementations, the background graphic 1906 is an image, a color, a pattern, or the like. In some implementations, the foreground graphic 1907 is a graphical representation of a current time (e.g., a digital or analog clock), though other foreground graphics 1907 are also possible, and may include notifications, device status information, animations, selectable user interface objects (also referred to as affordances), or the like.

In some implementations, the background graphic 1906 has a first color that matches a color of the case 1900. For example, if the case 1900 is yellow, the background graphic 1906 may also be yellow. In some implementations, the foreground graphic 1907 has a second color that is different than the first color (e.g., different than the color of the case 1900).

In some implementations, the background graphic 1906 initially (e.g., when the background 1907 is first displayed in response to detection of the coupling of the case 1900) has a first color that matches a color of the case 1900, and the foreground graphic 1907 initially (e.g., when the background 1906 is first displayed in response to detection of the coupling of the case 1900) has a second color different from the first color. In some implementations, after the background graphic having the first color and the foreground graphic having the second color are displayed, the device 800 transitions the background graphic from the first color to a third color. Thus, for example, if the case 1900 is blue, the background graphic 1906 may initially be blue, and then it may transition to a different color (e.g., black).

In some implementations, after the background graphic 1906 having the first color (e.g., the color of the case 1900) and the foreground graphic 1907 having the second color are displayed, the device 800 transitions the foreground graphic 1907 from the second color to the first color. Thus, for example, the background graphic 1906 may start as the color of the case, and then transition to a different color (e.g., black), and the foreground graphic 1907 may start as a different color than the case (e.g., black), and then transition to the color of the case. In some implementations, the transition of the foreground graphic 1907 to the first color (e.g., the color of the case 1900) occurs simultaneously with the transition of the background graphic 1906. In other implementations, it occurs before or after the transition of the background graphic 1906.

If the case 1900 has multiple colors, the background and/or foreground graphics 1906. 1907 may incorporate the multiple colors of the case. For example, for a case having at least a first and a second color, in some implementations the background graphic 1906 has the first color of the case (e.g. a primary color of the case), and the foreground graphic 1907 has the second color of the case (e.g., a secondary color of the case). In some implementations, the background graphic 1906 initially has the first color of the case, and transitions from the first color to the second color after a predetermined time. In the latter case, the foreground graphic 1907 may remain the same color during the transition of the background graphic 1906 (e.g., a different color than the first and second colors than the case), or may transition between different colors. For example, in some implementations the background graphic 1906 transitions from the first color of the case to the second color of the case, and the foreground graphic 1907 is initially the second color of the case and transitions to the first color of the case.

FIG. 19A depicts the device 800 being coupled to a protective case 1900, and example changes to what the device 800 displays in response to being coupled to the case 1900. FIG. 19B depicts the device 802, which is has different dimensions than the device 800 (e.g., the device 802 is larger than the device 800) being coupled to a protective case 1910. Further, the opening 1912 in the case 1910 (e.g., in a wall of the case that covers at least part of the display of the device 800) has a different location than the opening 1902 of the case 1900. For example the opening 1902 of the case 1900 is positioned a first distance 1908 from a top of the case 1900, while the opening 1912 of the case 1910 is positioned a second distance 1918 (different from the first distance) from the top of the case 1910. FIG. 19B illustrates that while the device 802 may take the same or similar actions as the device 800 upon detecting the coupling to the case, the locations of the graphical content that is being displayed may differ based on the different size of the device 802 and the different location of the opening 1912 in the case 1910.

In particular, FIG. 19B shows the device 802 displaying a first graphical user interface 1914, which may be a home screen that includes selectable user interface objects, similar to the first graphical user interface 1904 in FIG. 19A. In response to detecting that it is coupled to the case 1910, the device 802 transitions from displaying the first graphical user interface 1914 to displaying a second graphical user interface 1915. Like the second graphical user interface 1905, the second graphical user interface 1915, in some implementations, includes a background graphic 1916 and a foreground graphic 1917. The same transition operations described above with respect to FIG. 19A apply equally to the device and graphical user interfaces in FIG. 19B.

Figure 20A:
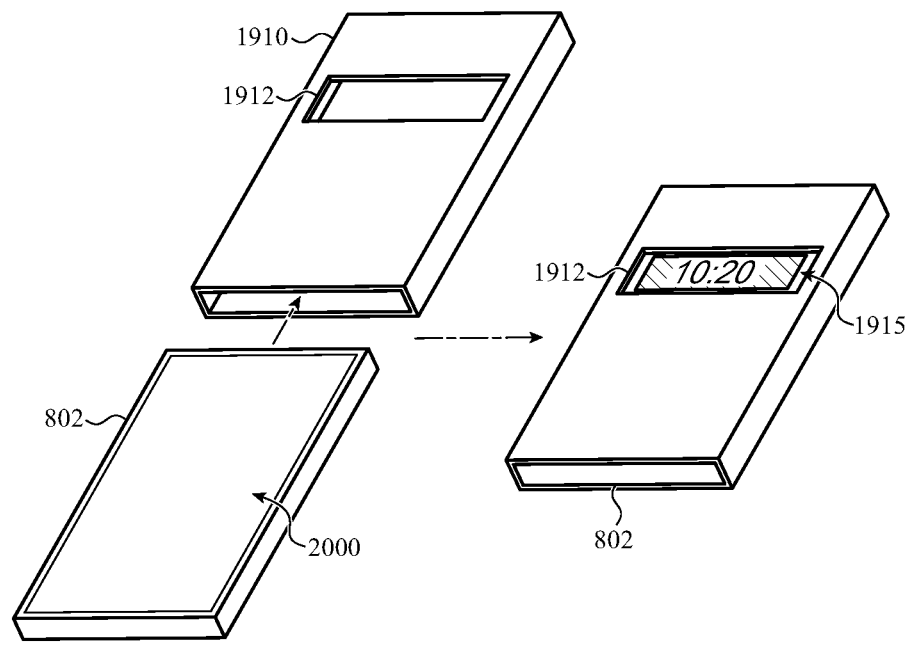
FIGS. 20A-20B depict an example electronic device in different states in use with a case.
Figure 20B:
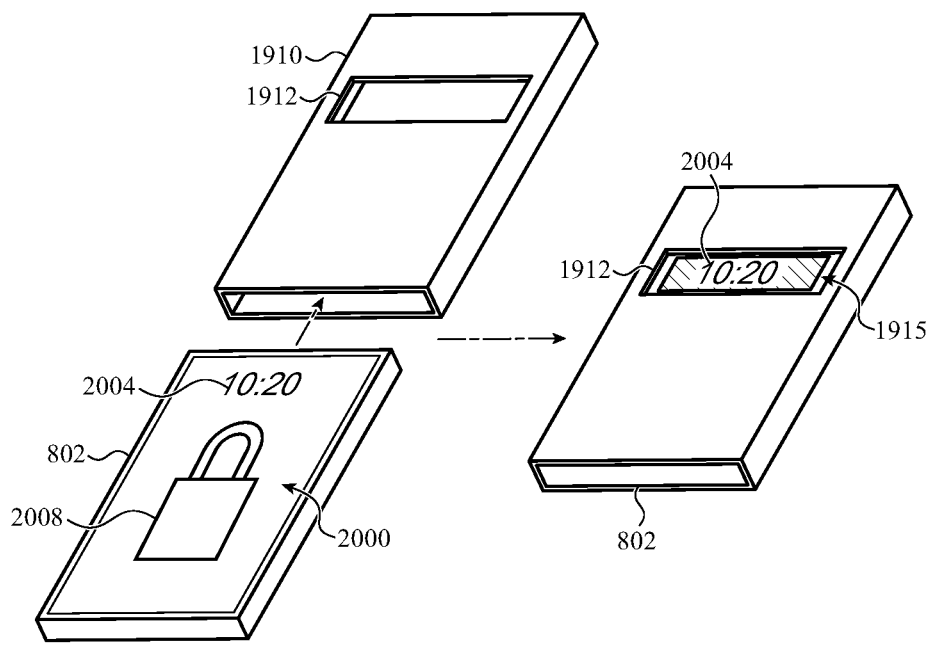

FIGS. 20A-20B illustrate additional examples of how a device may react in response to detecting that it has been coupled to a protective case. FIGS. 20A-20B illustrate the examples using the device 802 and the case 1910, though it will be understood that the examples apply equally to the device 800 and case 1900.

FIG. 20A illustrates the device 802 displaying a blank display 2000. The blank display may correspond to the display being inactive and/or off. In response to detecting that it is coupled to the case 1910, the device 802 transitions from the blank display 2000 (e.g., displaying no graphical content) to displaying the second graphical user interface 1915.

FIG. 20B illustrates the device 802 displaying a first graphical user interface that is a lock screen 2002. In some implementations, the lock screen 2002 includes a first graphical object 2008 (in this case, a locked padlock indicating the locked status of the device), and a second graphical object 2004 (in this case, a digital clock). In response to detecting that it is coupled to the case 1910, the device 802 transitions from the first graphical user interface (e.g., the lock screen 2002) to displaying the second graphical user interface 1915. As illustrated in FIG. 20B, the transition includes ceasing to display the second graphical object 2004 in a first location (e.g., its location in the lock screen 2002), and displaying the second graphical object 2004 in the second graphical user interface 1915.

As described above, FIGS. 21A-21B illustrate examples of the different regions of the displays of the devices 800, 802, and how the regions relate to the graphical content of the graphical user interfaces and the positions of the openings in the protective cases. FIG. 21A shows the device 800, and a boundary 2102 that corresponds to the opening 1902 of the protective case 1900. The boundary 2102 may define the first and second regions of the display. For example, as shown, the first region 2101 is outside the boundary 2102, and the second region 2100 is inside the boundary 2102. FIG. 21A also shows example locations of graphical objects of the graphical user interface. For example, selectable user interface objects (e.g., the application icon 2104) of a home screen graphical user interface may be displayed both in the first region 2101 and the second region 2100, and some may span both the first and the second regions. As described above, in response to detecting that the device 800 is coupled to the case 1900, the device 800 ceases to display the graphical content in the second region 2100 (e.g., the application icons 2104 that are fully or partially within the second region 2100), and instead displays other graphical content of a different graphical user interface.

Figure 21B:
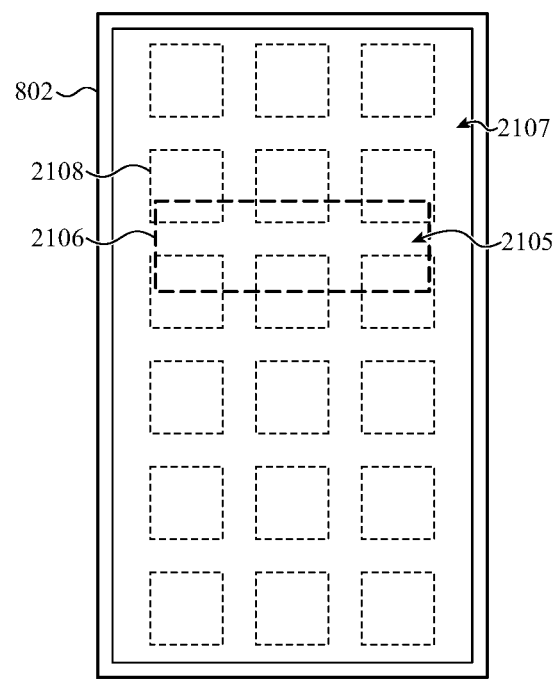

Similarly, FIG. 21B shows the device 802, and a boundary 2106 that corresponds to the opening 1912 of the protective case 1920. The boundary 2106 may define the first and second regions of the display. For example, as shown, the first region 2107 is outside the boundary 2106, and the second region 2105 is inside the boundary 2106. FIG. 21B also shows example locations of graphical objects of the graphical user interface. For example, selectable user interface objects (e.g., the application icon 2108) of a home screen graphical user interface may be displayed both in the first region 2107 and the second region 2105, and some may span both the first and the second regions. As described above, in response to detecting that the device 802 is coupled to the case 1910, the device 802 ceases to display the graphical content in the second region 2105 (e.g., the application icons 2108 that are fully or partially within the second region 2105), and instead displays other graphical content of a different graphical user interface.

FIGS. 21A-21B also illustrate how the location of the openings of the protective cases 1900 and 1910 differ, therefore resulting in different relative locations of the first and second regions on the different devices 800, 802. Thus, the particular locations where the second graphical user interface is displayed on a given device can depend on the location of the opening in a case. In some implementations, the location of the opening of a case (and thus the particular locations of the first and second regions) is detected by the device via near-field wireless communication with the case. For example, the device may receive from the case, and via the near-field wireless communication system, the location of the opening, and, upon detecting the coupling to the case, display the second graphical user interface in a region of the display that corresponds to the location of the opening.

Figure 22:
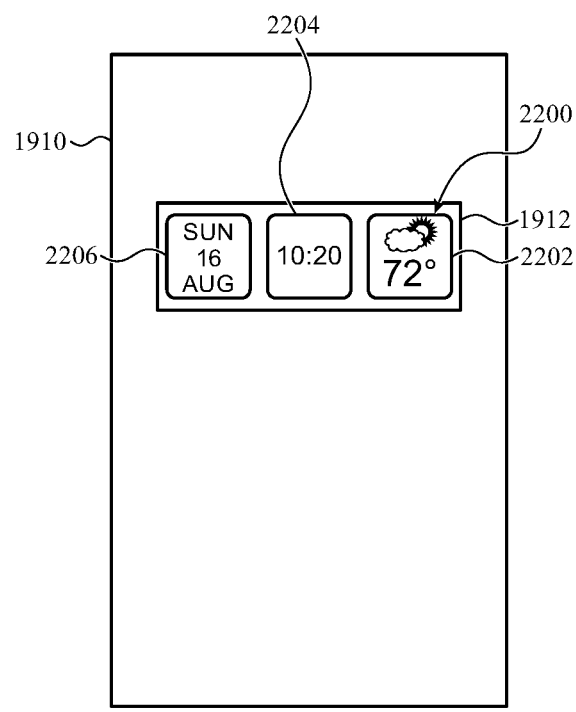
FIG. 22 depicts an example electronic device in use with a case.

FIGS. 19A-20B illustrate a second graphical user interface that is displayed in a second region of a display (e.g., a region corresponding to an opening in a protective case), in accordance with some implementations. FIG. 22 illustrates another example second graphical user interface 2200 that may be displayed in the second region of a display. FIG. 22 illustrates the second graphical user interface 2200 in conjunction with the case 1910 (and thus the device 802), though the same or similar second graphical user interface may be used in conjunction with the case 1900 and the device 800 (and/or other implementations of a device and case in accordance with the instant application).

In some implementations, the second graphical user interface 2200 includes graphical objects such as graphical objects 2202, 2204, and 2204. The graphical object 2202 is a weather object (e.g., indicating current and/or predicted weather conditions for a geographic area, which may be user-selected or based on the geographic location of the device). The graphical object 2204 is a clock object (e.g., indicating the current time). The graphical object 2206 is a date object (e.g., indicating the current day, date, and month, and optionally year). The graphical objects 2202, 2204, 2206 may be selectable user interface objects that, when selected by a user (e.g., by touching, tapping, pressing, clicking, and/or otherwise selecting the graphical objects) causes additional information related to the graphical object to be displayed (e.g., a user selection of the graphical object 2202 may cause a multi-day weather forecast to be displayed in the second region of the display).

The graphical content that is displayed in the second region of the display (and thus is viewable in the opening in a protective case) may change as a result of various events and/or actions. For example, in some implementations, while the case is coupled to the device, the device detects an occurrence of an event, and in response to detecting the occurrence of the event, displays, in the second region of the display, a graphical object associated with the event. In some implementations, the graphical object is a selectable user interface object, also referred to as an affordance, that, when selected by a user (e.g., by touching, tapping, pressing, clicking, or otherwise selecting the graphical object), causes the device to perform an action or operation.

Figure 23:
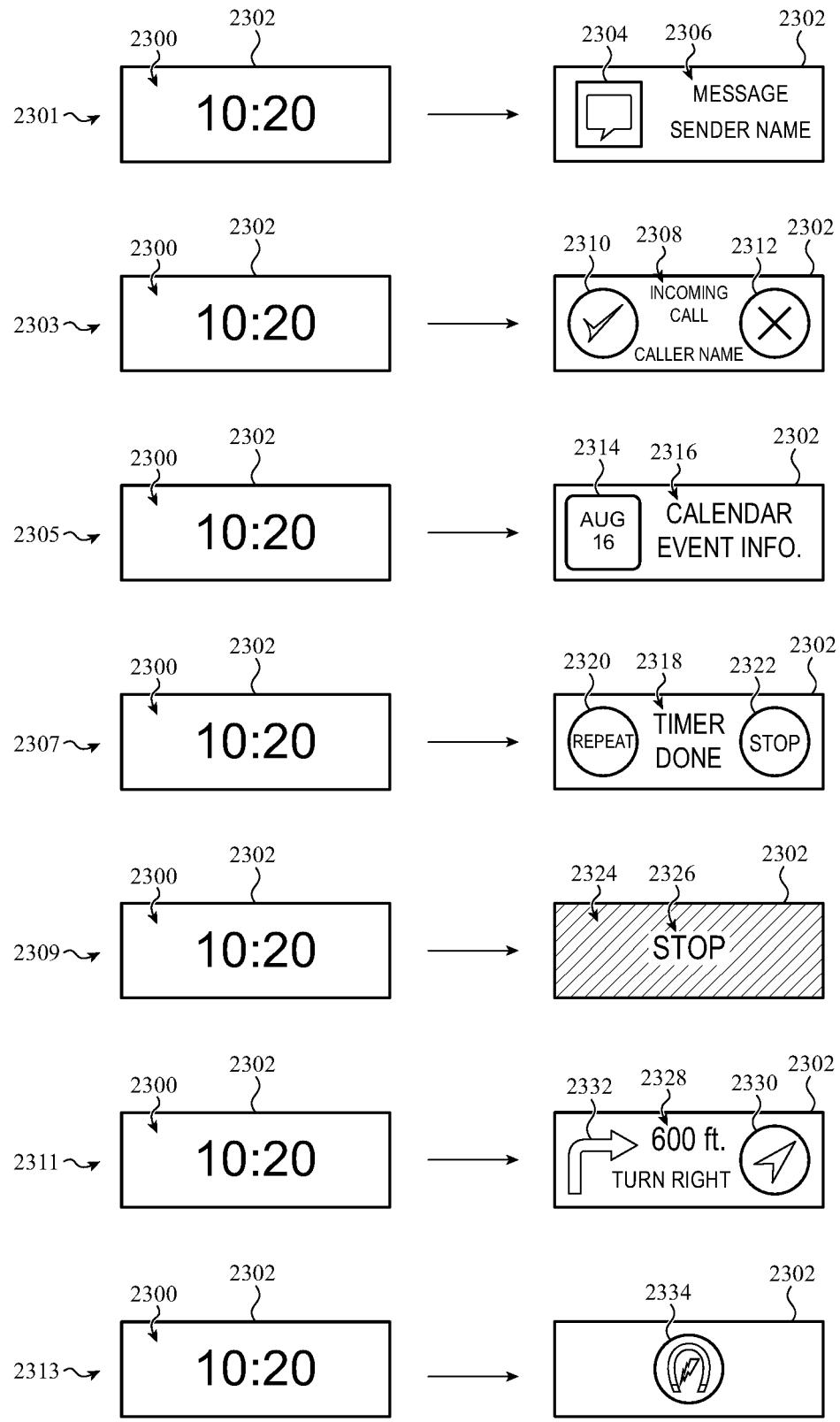
FIG. 23 depicts example graphical user interfaces of a device in use with a case.

FIG. 23 illustrates various examples of graphical objects that may be displayed in a second region 2302 of a display in response to the device detecting the occurrence of an event. In each example, the second region 2302 (e.g., corresponding to the second region 2100 or 2105) is shown initially displaying the second graphical user interface 2300 (e.g., the second graphical user interface 1905), though this is only one example state of the second region 2302 prior to detecting the occurrence of an event. In other cases, the second region 2302 is blank, and in yet other cases the second region 2302 may be displaying a different graphical user interface. Further, in each example, the transition from displaying the second graphical user interface to displaying a graphical object occurs in response to detecting the occurrence of the event.

In example 2301, the event is a notification of a received message. In some implementations, the received message is a text message, an SMS message, an email, a message from an internet messaging application, or the like. In some implementations, in response to detecting the notification of the received message, the device displays, in the second region 2302, a message notification object 2304 (e.g., a first graphical object), and message information 2306 (e.g., a second graphical object). In some implementations, the message information 2306 includes an indication of the type of message (e.g., text message, email, etc.), and a name of a sender of the message.

In some implementations, one or both of the message notification object 2304 and the message information 2306 are affordances (e.g., selectable user interface objects) that, when selected by a user (e.g., by touching, tapping, pressing, clicking, and/or otherwise selecting the graphical objects) cause the device to perform an additional action related to the event. For example, in some implementations, selecting the message notification object 2304 or the message information 2306 causes at least a portion of the message to be displayed in the second region 2302 of the display.

In example 2303, the event is a notification of an incoming call (e.g., a voice call, a video call, or the like). In some implementations, in response to detecting the notification of the incoming call, the device displays, in the second region 2302, an accept-call affordance 2310 (e.g., a first graphical object). In some implementations, when the device detects a selection input directed to the accept-call affordance 2310 while there is an incoming call, the device answers the incoming call. In some implementations, a selection input directed to an affordance, selectable user interface object, graphical object, or the like, corresponds to a user touching, tapping, pressing, clicking or otherwise selecting the affordance, selectable user interface object, graphical object, or the like.

In some implementations, in response to detecting the notification of the incoming call, the device also displays, in the second region 2302, a reject-call affordance 2312 (e.g., a second graphical object). In some implementations, when the device detects a selection input directed to the reject-call affordance 2312 while there is an incoming call, the device rejects the incoming call (which may include sending the incoming call to voicemail).

In some implementations, in response to detecting the notification of the incoming call, the device displays incoming call information 2308 (e.g., a third graphical object). In some implementations, the incoming call information 2308 includes a name of the caller, a phone number associated with the caller, a business associated with the caller, and/or other information about or associated with the caller.

In some implementations, in response to detecting a selection of the accept-call affordance 2310, the device accepts (e.g., answers) the incoming call and displays, in the second region 2302, an audio selection affordance and an end-call affordance. In some implementations, when the device detects a selection input directed to the end-call affordance while there is an ongoing call, the device ends the ongoing call. Examples of an audio selection affordance and an end-call affordance are described with respect to FIG. 27.

In example 2305, the event is a notification of a calendar event. In some implementations, in response to detecting the notification of the calendar event, the device displays, in the second region 2302, a calendar object 2314 (e.g., a first graphical object) indicating information such as the calendar event date, time, etc. In some implementations, in response to detecting the notification of the calendar event, the device displays calendar event information 2316 (e.g., a third graphical object). In some implementations, the calendar event information 2316 includes a name of the calendar event, a start time of the calendar event, a location of the calendar event, and/or other information about or associated with the calendar event.

In some implementations, one or both of the calendar object 2314 and the calendar event information 2316 are affordances (e.g., selectable user interface objects) that, when selected by a user (e.g., by touching, tapping, pressing, clicking, and/or otherwise selecting the graphical objects) cause the device to perform an additional action related to the event. For example, in some implementations, selecting the m calendar object 2314 and the calendar event information 2316 causes information about the calendar event to be displayed in the second region 2302 of the display.

In example 2307, the event is a notification of an expiration of a timer. In some implementations, in response to detecting the notification of the expiration of the timer, the device displays, in the second region 2302, affordances such as a timer repeat affordance 2320 (e.g., a first graphical object) and/or a timer-stop affordance 2322 (e.g., a second graphical object). In some implementations, when the device detects a selection input directed to the timer repeat affordance 2320, the device initiates a timer having the same duration as the expired timer. In some implementations, when the device detects a selection input directed to the timer-stop affordance 2322, the device stops at least one of an audible or a tactile output triggered by the expiration of the timer.

In some implementations, in response to detecting the notification of the expiration of the timer, the device also displays, in the second region 2302, timer information 2318

(e.g., a third graphical object). In some implementations, the timer information 2318 includes text indicating that an audible or a tactile output was triggered by the expiration of a timer.

In example 2309, the event is a notification of an expiration of an alarm (or timer). In some implementations, in response to detecting the notification of the expiration of the alarm (or timer), the device displays, in the second region 2302, a graphical object 2324 that occupies all (or substantially all) of the second region 2302. In some implementations, the graphical object 2324 is an affordance, and when the device detects a selection input directed to the graphical object 2324, the device stops at least one of an audible or a tactile output triggered by the expiration of the alarm (or timer).

In some implementations, in response to detecting the notification of the expiration of the timer, the device also displays, in the second region 2302, text information 2326 indicating a function of the graphical object 2324 (e.g., the text "stop" to indicate that a selection input directed to the graphical object 2324 will stop an active audible and/or tactile output).

In example, 2311, the event is a notification of a navigation instruction. In some implementations, in response to detecting the notification of the navigation instruction, the device displays, in the second region 2302, a direction graphic 2332 (e.g., a first graphical object) that indicates an upcoming maneuver (e.g., a turn, merge, stop, detour, etc.), navigation information 2328 (e.g., a second graphical object) that provides information about the upcoming maneuver (e.g., a distance to the maneuver, a textual description of the maneuver), and a navigation affordance 2330 (e.g., a third graphical object). In some implementations, when the device detects a selection input directed to the navigation affordance 2330, the device displays additional information about the navigation (e.g., an estimated time of arrival to a destination, a list of alternative destinations, an opportunity to add or change waypoints, etc.).

In example, 2313, the event is a coupling of a charger to the device. In such cases, the device displays a graphical object 2334 indicating attachment of the charger (e.g., a representation of the charging dock, a lightning bolt, a battery, an electrical plug, or the like).

In some implementations, the occurrence of the event detected by the device is a user request to initiate a wireless payment. A user may initiate a wireless payment request in various ways. For example, in some implementations, the user may push a button on the device to initiate the wireless payment request. In some implementations, the user may place the device proximate to (e.g., within a threshold distance of) a near-field wireless payment system, which the device may detect using a corresponding near-field wireless communication system. In some implementations, the user may initiate a request via a second device (e.g., watch, notebook or tablet computer, or the like) that is in communication with the device.

Figure 24:
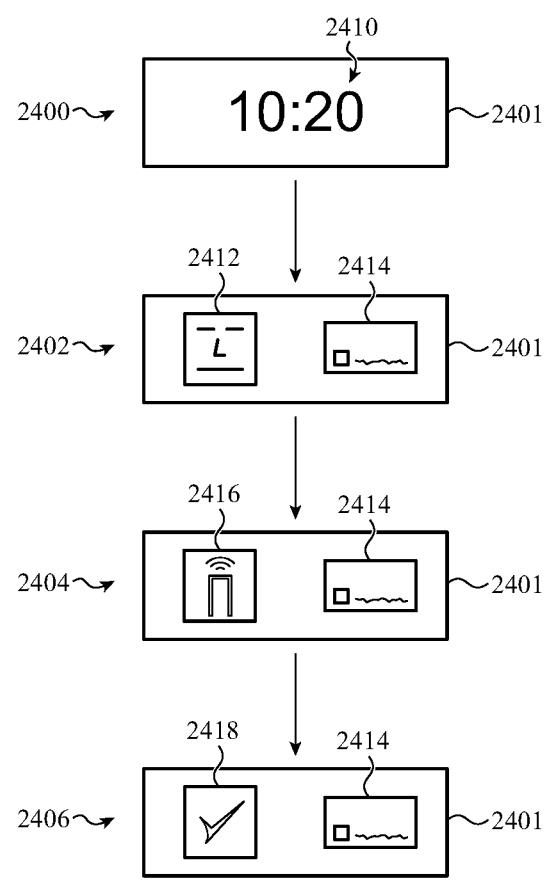
FIG. 24 depicts an example graphical user interface for a wireless payment process.

In some implementations, in response to detecting the request to initiate the wireless payment, the device initiates a wireless payment routine that includes displaying graphical objects on the second region of the display to guide the user through a payment process, which may include biometric authentication steps, payment card selection steps, and the like. FIG. 24 illustrates example graphical outputs that may be provided pursuant to such a payment routine.

As shown in the example of FIG. 24, when the device detects the user request to initiate the wireless payment at stage 2400, the device is displaying, in a second region 2401 of the display (e.g., corresponding to the second region 2100 or 2105), a second graphical user interface 2410 (shown as including a graphical representation of the time, though it may include different or additional content). In some implementations, the second region 2401 is blank at stage 2400.

In some implementations, in response to detecting the request to initiate the wireless payment, at stage 2402, the device displays a first graphical object 2412 that includes a representation of a biometric authentication process. In some implementations, the representation of the biometric authentication process includes a graphic that indicates what type of biometric authentication can approve or authorize the wireless payment. For example, if a facial authentication system can approve or authorize the wireless payment, the graphic represents a face. As another example, if a fingerprint authentication system can approve or authorize the wireless payment, the graphic represents a fingerprint. Other graphics and biometric authentication processes are also contemplated, and may be displayed at stage 2402 or at other stages or states of the wireless payment process. For example, in some implementations, the representation of the biometric authentication process includes an indication that biometric authentication is required, an indication that biometric authentication has failed, and/or an indication that biometric authentication has succeeded. In some implementations, the biometric authentication is performed with a biometric sensor integrated into the device such as a face identification sensor, a fingerprint identification sensor, an iris identification sensor, or the like. In implementations where a biometric authentication is to be performed by a biometric sensor integrated into the device, and the device is in a case that covers at least part of the device (e.g., the case 1900), the case includes openings, windows, flaps, or other suitable access points for the user to provide the appropriate input to the biometric sensor. For example, in implementations where a device (e.g., the device 800) includes a facial identification sensor, a case (e.g., the case 1900) includes an opening through which the facial identification sensor can capture an image of the user's face (or otherwise optically analyze and/or recognize the user's face). Openings for fingerprint sensors, iris identification sensors, or the like, are also provided in protective cases to provide access to the biometric sensors, for devices that include such sensors.

In some implementations, in response to detecting the request to initiate the wireless payment, at stage 2402, the device also displays a second graphical object 2414 that includes a representation of a payment card associated with the wireless payment. In some implementations, the representation of the payment card includes information that uniquely identifies the particular payment card and/or allows a user to distinguish the payment card from among multiple candidate payment cards (e.g., a color, image, name, number, etc.). In some implementations, as described with respect to FIG. 26, the representation of the payment card 2414 is an affordance (e.g., a selectable user interface object) that, when selected by a user, causes a payment card selection interface to be initiated.

In some implementations, in response to a successful biometric authentication, at stage 2404, the device displays a third graphical object 2416 that includes a representation of a wireless payment operation (e.g., a graphic that prompts the user to place the device on or near a wireless payment device such as a point-of-sale system).

After the user performs the wireless payment operation (e.g., placing the device on or near a wireless payment device), the device may receive an indication that the wireless payment operation has been completed. In some implementations, in response to receiving the indication that the wireless payment operation has been completed, the device displays, at stage 2406, a fourth graphical object 2418 that indicates a confirmation that the payment operation has been completed (e.g. a checkmark, smiley face, or the like). In some implementations, the device continues to display the representation of the payment card 2414 at stage 2406.

In some implementations, after a device detects a request to initiate a wireless payment, the device requires a user selection of a displayed affordance in order to proceed with the wireless payment routine. For example, if the request to initiate a wireless payment corresponds to a determination that the user has placed the device proximate to (e.g., within a threshold distance of) a near-field wireless payment system (e.g., the user attempted to make a wireless payment with the device), the device may require the user to take another explicit physical action in order to proceed with the wireless payment routine. This may mitigate accidental or unintentional initiations of wireless payments.

Figure 25:
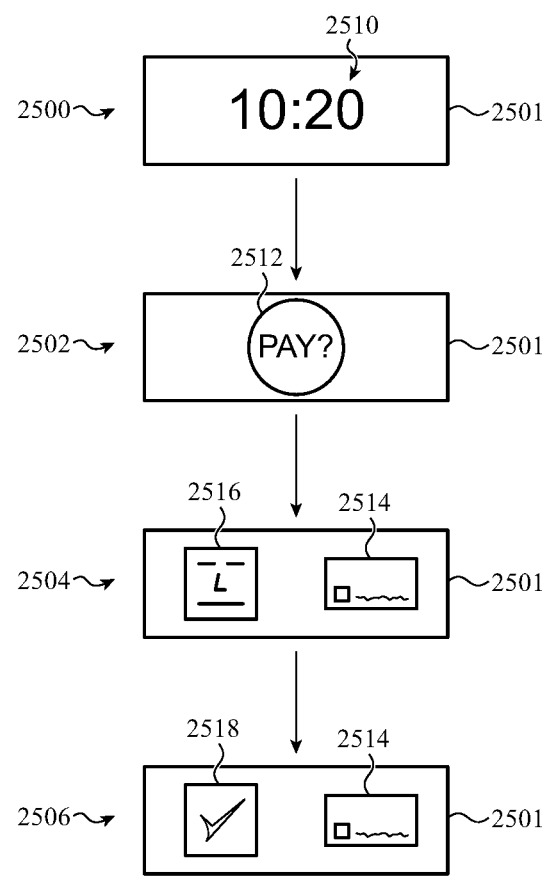
FIG. 25 depicts another example graphical user interface for a wireless payment process.

FIG. 25 illustrates example graphical outputs that may be provided pursuant to such a payment routine. As shown in the example of FIG. 25, when the device detects the user request to initiate the wireless payment at stage 2500, the device is displaying, in a second region 2501 of the display (e.g., corresponding to the second region 2100 or 2105), a second graphical user interface 2510 (shown as including a graphical representation of the time, though it may include different or additional content). In some implementations, the second region 2501 is blank at stage 2500.

In some implementations, in response to detecting the request to initiate the wireless payment (e.g., detecting that the user has placed the device near a near-field wireless payment system in an attempt to make a wireless payment), at stage 2502, the device displays an affordance 2512 (e.g., selectable user interface object). When the device detects a user selection of the affordance 2512 (e.g., a tap, press, touch, or other suitable selection input), wireless payment is authorized and the wireless payment routine proceeds.

Once the affordance 2512 has been selected by the user, at stage 2504, the device displays a first graphical object 2516 that includes a representation of a biometric authentication process, and a second graphical object 2514 that includes a representation of a payment card associated with the wireless payment. The first and second graphical objects 2516, 2514 may correspond to the first and second graphical objects 2416 and 2414.

In some implementations, in response to a successful biometric authentication and after the device receives an indication that the wireless payment operation has been completed, the device displays, at stage 2506, a third graphical object 2518 that indicates a confirmation that the payment operation has been completed (e.g. a checkmark, smiley face, or the like). In some implementations, the device continues to display the representation of the payment card 2514 at stage 2506. In the routine depicted in FIG. 25, the graphical object representing a wireless payment operation (e.g., a graphic that prompts the user to place the device on or near a wireless payment device such as a point-of-sale system) may be omitted, as the request to initiate a wireless payment may have been initiated by the user taking that same action.

Figure 26:
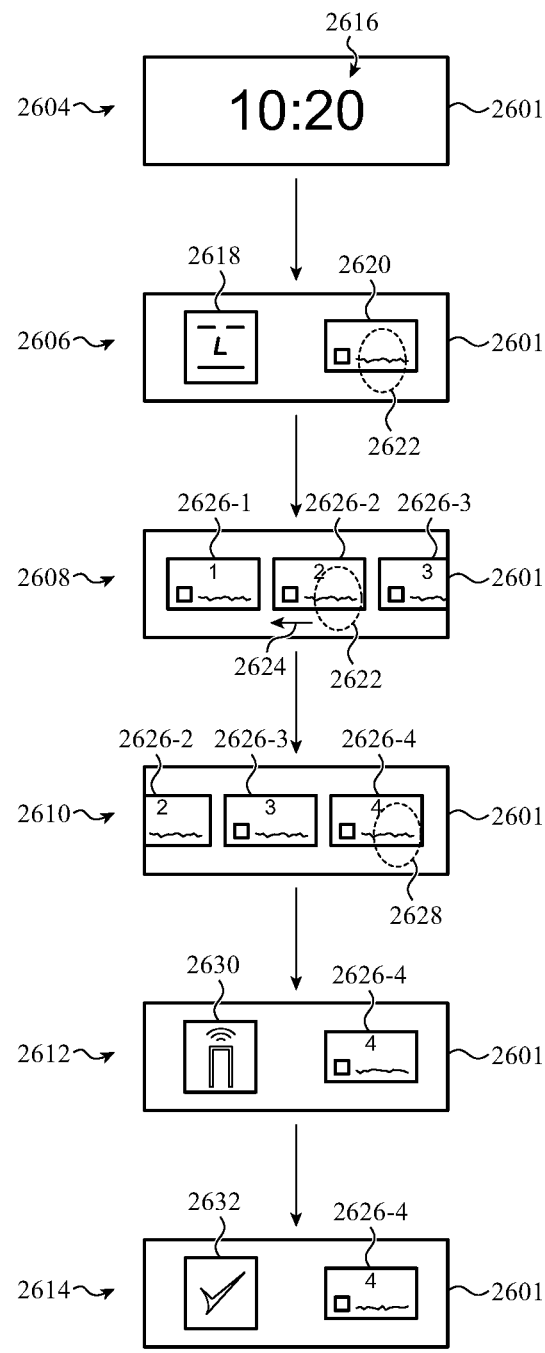
FIG. 26 depicts another example graphical user interface for a wireless payment process.

In some cases, a user can interact with the content displayed in the second region of a display during a wireless payment routine in order to select and/or control parameters of the payment process, such as to select a payment card or payment source from a plurality of candidates. FIG. 26 illustrates an example interaction with a graphical element during a payment routine to select a payment card or method.

As shown in the example of FIG. 26, when the device detects the user request to initiate the wireless payment at stage 2604, the device is displaying, in a second region 2601 of the display (e.g., corresponding to the second region 2100 or 2105), a second graphical user interface 2616 (shown as including a graphical representation of the time, though it may include different or additional content). In some implementations, the second region 2601 is blank at stage 2604.

In some implementations, in response to detecting the request to initiate the wireless payment, at stage 2606, the device displays a first graphical object 2618 that includes a representation of a biometric authentication process. In response to detecting the request to initiate the wireless payment, at stage 2606, the device also displays a second graphical object 2620 that includes a representation of a payment card associated with the wireless payment. In some implementations, the representation of the payment card includes information that uniquely identifies the particular payment card and/or allows a user to distinguish the payment card from among multiple candidate payment cards (e.g., a color, image, name, number, etc.).

In some implementations, the representation of the payment card 2620 is an affordance (e.g., a selectable user interface object) that, when selected by a user, as indicated by touch event 2622 on the representation of the payment card 2620, causes a payment card selection interface to be initiated. In some implementations, the representation of the payment card 2620 corresponds to an available payment card or method, and continuing the payment process without providing the touch event 2622 on the representation of the payment card 2620 (e.g., by proceeding with biometric authentication) results in the payment process proceeding using the payment card represented by the representation of the payment card 2620. In some implementations, the payment process cannot proceed until the user provides the touch event 2622 and selects a particular payment card from the candidate payment cards or methods.

Stage 2608 shows an example payment card selection interface that appears in response to detecting a selection of the representation of the payment card 2620. The payment card selection interface displays a plurality of graphical objects representing a plurality of payment cards 2626 (or other payment methods, sources, or the like). A user can scroll through the plurality of representations of payment cards 2626 by applying a gesture input. For example, a swipe gesture (represented by a touch event 2622 and movement 2624) causes the representations of payment cards 2626 to scroll in the direction of the gesture (e.g., to the left, as shown in FIG. 26), allowing the user to see additional payment card options.

The user selects a payment card from the plurality of representations of payment cards 2626, as illustrated by the selection input 2628 directed to the payment card 2626-4 at stage 2610. Upon detecting the selection of the payment card 2626-4, the device proceeds to a next operation in the payment routine. For example, if a biometric authentication is still required, the device displays a representation of a biometric authentication process to prompt the user to perform a biometric authentication. If a biometric authentication process has been successfully completed, at stage 2612, the device displays the selected payment card 2626-4 and a graphical object 2630 that includes a representation of a wireless payment operation (e.g., a graphic that prompts the user to place the device on or near a wireless payment device such as a point-of-sale system).

After the user performs the wireless payment operation (e.g., placing the device on or near a wireless payment device), the device may receive an indication that the wireless payment operation has been completed. In some implementations, in response to receiving the indication that the wireless payment operation has been completed, the device displays, at stage 2614, a graphical object 2632 that indicates a confirmation that the payment operation has been completed (e.g. a checkmark, smiley face, or the like). In some implementations, the device continues to display the representation of the payment card 2626-4 at stage 2614.

Figure 27:
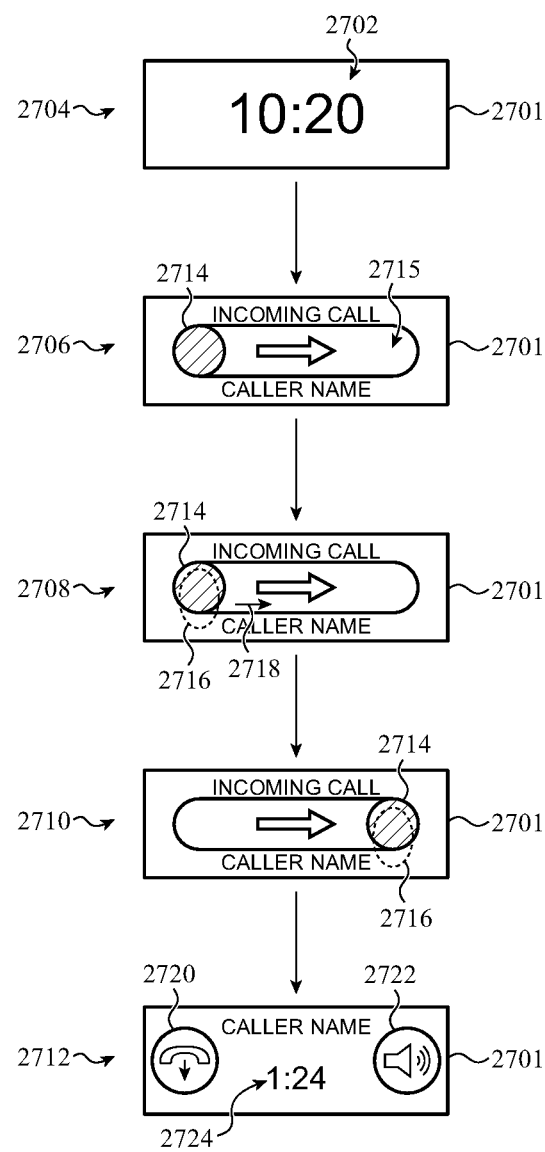
FIG. 27 depicts an example graphical user interface for accepting an incoming call.

FIG. 26 illustrates an example in which a user may interact with graphical objects displayed in a second region of a display of a device while the device is in a protective case with a window that allows access to the second region of the display through an opening. FIG. 27 depicts another example of a user interaction with the second region of the display. In particular, FIG. 27 relates to an incoming call notification that may appear in the second region, and user interactions that result in accepting the incoming call.

As shown in the example of FIG. 27, when the device detects an incoming call, at stage 2704, the device is displaying, in a second region 2701 of the display (e.g., corresponding to the second region 2100 or 2105), a second graphical user interface 2702 (shown as including a graphical representation of the time, though it may include different or additional content). In some implementations, the second region 2701 is blank at stage 2704.

In some implementations, in response to detecting an incoming call, the device displays an affordance 2714 in the second region 2701 of the display, along with graphical objects 2715 (e.g., an arrow in a channel) that indicate or suggest a gesture input that will result in acceptance of the call. For example, as shown in stages 2708 and 2710, a swipe gesture (represented by a touch event 2716 and movement 2718) causes the affordance 2714 to slide along a direction). In response to the device detecting that the gesture has been completed (e.g., the affordance 2714 has been moved to a target location (e.g., the end of the channel, as shown in stage 2710), the device accepts the incoming call.

Upon accepting the incoming call, the device displays, in the second region 2701, an end-call affordance 2720, as shown in stage 2712. The device also optionally displays an audio selection affordance 2722. The audio selection affordance 2722, when selected, causes the device to display affordances of available audio output options (e.g., for conventional placement of the device to a user's ear, speakerphone, headphones, or the like). The user can select a desired audio option, which will cause the device to initiate that audio option and return to the graphical user interface shown at stage 2712. Selection of the end-call affordance 2720 results in the call being terminated. The device also optionally displays information 2724 about the call, such as an elapsed call time, a name of the caller, a phone number of the caller, or the like. In some implementations, information 2724 may include scrolling text to display information about the call.

Another example event that may be detected when a device is in a protective case, and that may therefore cause a graphical object to be displayed in a second region of the display, is an initiation of a voice-based digital assistant. A voice-based digital assistant may be initiated in several ways. In some implementations, it is initiated through a voice-command (e.g., a user speaking a word or phrase that the device detects). In some implementations, it is initiated through operation of a physical input on the device (e.g., a user pressing a button of the device) or selection of an affordance on a display of the device. In response to initiation of the voice-based digital assistant, the device receives, via a microphone, a voice input from the user, determines the content of the voice input, and performs an action (or foregoes performing an action) in response to the content of the voice input.

Figure 28:
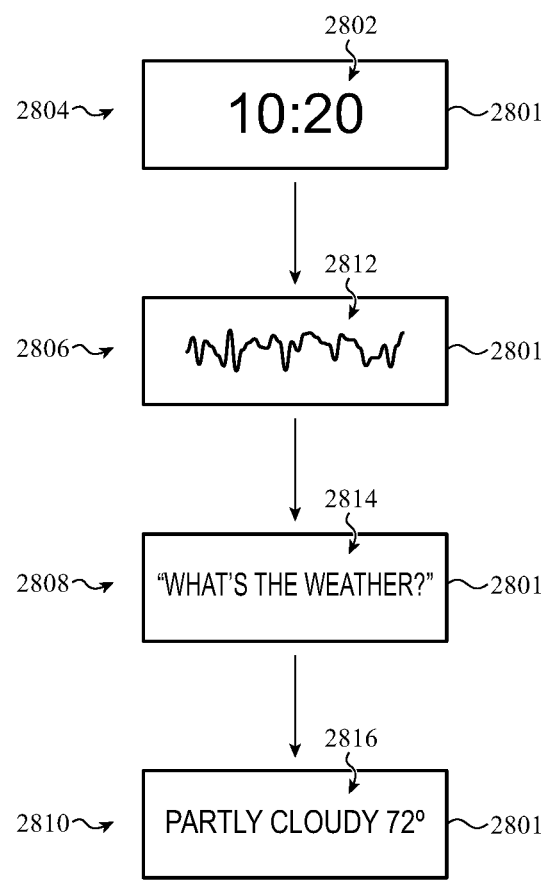
FIG. 28 depicts an example graphical user interface for a voice-based digital assistant operation.

FIG. 28 illustrates a series of graphical outputs that may be produced in response to initiation and use of a voice-based digital assistant. When the device detects an initiation of a voice-based digital assistant, at stage 2804, the device is displaying, in a second region 2801 of the display (e.g., corresponding to the second region 2100 or 2105), a second graphical user interface 2802 (shown as including a graphical representation of the time, though it may include different or additional content). In some implementations, the second region 2801 is blank at stage 2804.

In some implementations, in response to detecting the initiation of the voice-based digital assistant, the device displays a graphical object 2812 in the second region 2801 of the display. In some implementations, the graphical object 2812 is animated in accordance with a voice input received by the device. For example, FIG. 28 shows the graphical object 2812 as a wave or spectrogram type graphic, which undulates, fluctuates, or otherwise moves in accordance with the voice input. In some implementations, the animation of the graphical object 2812 reflects actual audio content of the voice input (e.g., peaks in volume are reflected as peaks in the graphical object 2812). In some implementations, the graphical object 2812 is animated when the voice input is received (and is responsive to the voice input), but the animation is not based on audio content (e.g., the volume or content of the voice input does not define the exact shape or peaks of the graphical object 2812).

After or during the voice input, the device displays, at stage 2808, a textual representation 2814 of the voice input. In some implementations, the entire textual representation 2814 is displayed in its entirety when a speech-to-text process has been completed on an entire voice input. In some implementations, the textual representation 2814 is displayed in real-time, displaying partial results of a speech-to-text process as those partial results are available (and optionally while the voice input is ongoing).

Upon completion of the speech-to-text operation, and after displaying the textural representation 2814, the device displays a graphical object 2816 that includes an output of the voice-based digital assistant. The output is based on the content of the speech-to-text operation. For example, as shown in FIG. 28, the input to the voice-based digital assistant was "what's the weather," and the output from the voice-based digital assistant is weather data. Other types of inputs and outputs are also contemplated.

Figure 29A:
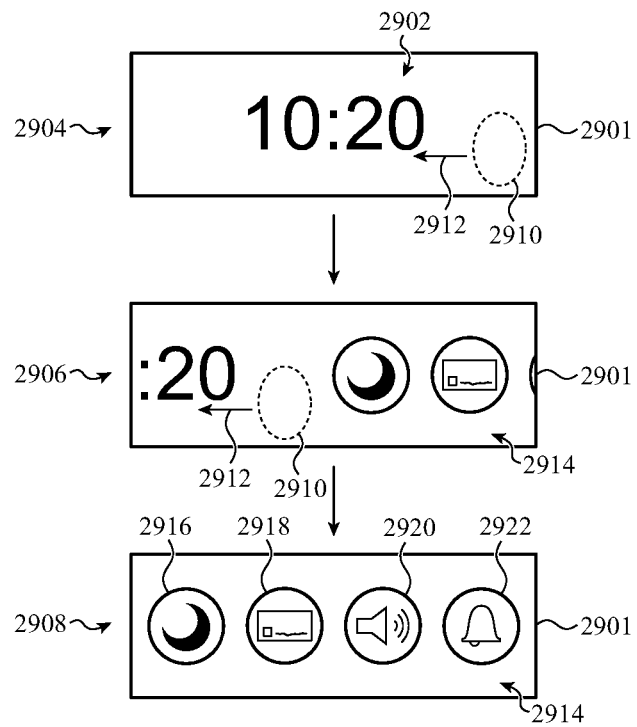
FIGS. 29A-29B depict example interactions with a device to display different graphical content on an electronic device.
Figure 29B:
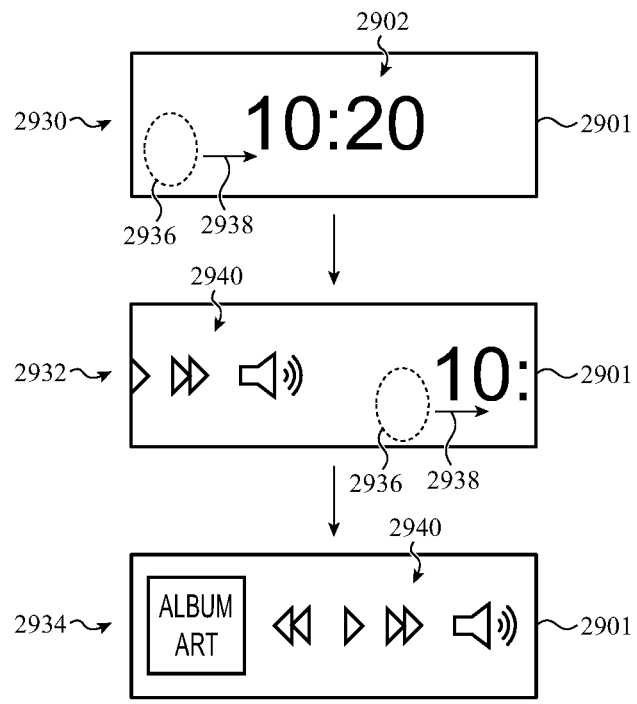

In some implementations, a user can interact with a second graphical interface that is displayed in a second region of a display in order to cause the device to display different or additional graphical user interfaces or other content. FIGS. 29A-29B illustrate examples of such interactions with the second region of a display.

FIG. 29A shows, at stage 2904, the second region 2901 (e.g., corresponding to the second region 2100 or 2105) displaying a second graphical user interface 2902 (shown as including a graphical representation of the time, though it may include different or additional content). As noted above, the second graphical user interface 2902 displays third graphical content (e.g., a clock display), which is different from the second graphical content that was displayed in the second region of the display as part of the first graphical user interface.

In some implementations, the device detects a gesture on the second graphical user interface 2902, as represented by the touch input 2910 and arrow 2912 at stages 2904 and 2906. As depicted, the gesture is a slide or swipe gesture in the direction indicated by the arrow 2912. The touch input 2910 may be provided at any location in the second graphical user interface.

In response to detecting the gesture (e.g., the swipe gesture as shown in stages 2904 and 2906), the device displays fourth graphical content 2914, different from the third graphical content, in the second region 2901 of the display. In some implementations, the fourth graphical content appears to slide into the second region of the display 2901 from a right side of the second region 2901, while the third graphical content (e.g., the clock) appears to slide out of the second region 2901 from a left side of the second region 2901. In this way, both the third and fourth graphical content move in accordance with the motion of the gesture. Upon completion of the gesture, the fourth graphical content 2914 of the third graphical user interface is displayed in the second region 2901 of the display, as shown at stage 2908.

In some implementations, the fourth graphical content 2914 includes a plurality of affordances (e.g., selectable user interface objects). For example, as shown at stage 2908, the fourth graphical content 2914 includes a first affordance 2916 (shown as a do-not-disturb mode selection affordance), a second affordance 2918 (shown as a wireless payment initiation affordance), a third affordance 2920 (shown as a volume control selection affordance), and a fourth affordance (shown as a ring/silent selection affordance). Selection of an affordance, which are selectable user interface objects, causes the device to take an action (or forgo taking an action) associated with the affordance. For example, selection of the second affordance 2918 causes the device to initiate a wireless payment operation.

FIG. 29B illustrates another example interactions with the second region of a display while the second graphical user interface is displayed. While FIG. 29A illustrates a swipe gesture in the left-hand direction, FIG. 29B illustrates a swipe gesture in the right-hand direction. Swiping in the opposite direction can cause yet another different graphical user interface to be displayed.

In particular, FIG. 29B shows, at stage 2930, the second region 2901 (e.g., corresponding to the second region 2100 or 2105) displaying a second graphical user interface 2902 (shown as including a graphical representation of the time, though it may include different or additional content).

In some implementations, the device detects a gesture on the second graphical user interface 2902, as represented by the touch input 2936 and arrow 2938 at stages 2930 and 2932. As depicted, the gesture is a slide or swipe gesture in the direction indicated by the arrow 2938 (e.g., to the right, in the opposite direction as the gesture in FIG. 29A). The touch input 2936 may be provided at any location in the second graphical user interface.

In response to detecting the gesture (e.g., the swipe gesture as shown in stages 2930 and 2932), the device displays fifth graphical content 2940, different from the fourth graphical content 2914 (and different from the third graphical content of the second graphical user interface 2902), in the second region 2901 of the display. In some implementations, the fifth graphical content 2940 appears to slide into the second region of the display 2901 from a left side of the second region 2901, while the third graphical content (e.g., the clock) appears to slide out of the second region 2901 from a right side of the second region 2901. In this way, both the third and fifth graphical content move in accordance with the motion of the gesture. Upon completion of the gesture, the fifth graphical content 2940 of the fourth graphical user interface is displayed in the second region 2901 of the display, as shown at stage 2934.

In some implementations, the fifth graphical content 2940 includes media information and a set of media playback controls. As shown in FIG. 29B, for example, the fifth graphical content 2940 includes an album art graphic, media playback controls (including, for example, skip forward, skip backwards, and play), and a volume control selection affordance.

As described above, the second graphical user interface may include a background graphic that has a color that matches the case to which the device is coupled. In some implementations, the third and fourth graphical user interfaces have the same background graphic (e.g., the backgrounds have the same color as the case to which the device is coupled).

Figure 30:
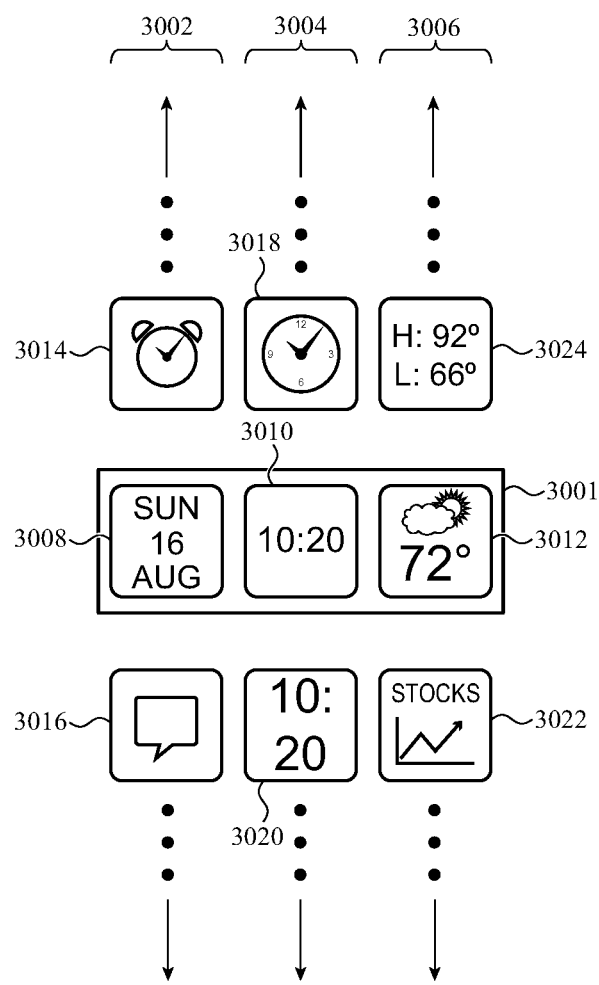
FIG. 30 depicts a technique for user-selection of graphical objects to display on an electronic device.

In some implementations, the particular graphical objects that are displayed in the second region of a display (e.g., when a protective case with a window is attached) can be changed by a user. FIG. 30 illustrates an example for changing between different graphical objects in a second region 3001 of a display (e.g., corresponding to the second region 2100 or 2105). As shown, the second region 3001 displays graphical objects (which may be affordances) including a date object 3008 (e.g., indicating the current day, date, month, etc.), a clock object 3010 (e.g., indicating the current time), and a weather object 3012 (e.g., indicating current and/or predicted weather conditions).

In some implementations, a user can change the graphical objects that are displayed in the second region 3001 by swiping through various candidate graphical objects. The candidate graphical objects include, for example, an alarm clock object 3014, an analog clock object 3018, a temperature display object 3024, a stock object 3022, a large-format clock object 3020, and a message application object 3016. The candidate graphical objects shown in FIG. 30 are merely examples, and more or different objects may be included. Further, in some implementations, some or all of the graphical objects shown in FIG. 30 are affordances, or selectable user interface objects. For example, in response to detecting a selection (e.g., touch, tap, press, etc.) of the message application object 3016, the device may display a text messaging interface.

In some implementations, the graphical objects that are displayed in the second region 3001 are changed in response to gestures. For example, in some implementations the device detects a gesture initiated on a first graphical object (e.g., a downward swipe on the date object 3008), and, in response to detecting the gesture, replaces the first graphical object with a second graphical object different than the first graphical object (e.g., the alarm clock object 3014).

In some implementations, the candidate graphical objects are logically arranged in columns, such as columns 3002, 3004, and 3006. The arrangement of the candidate graphical objects may define what gestures cause what graphical objects to be displayed. For example, a downward swipe initiated on the date object 3008 would result in the date object 3008 being replaced with the alarm clock object 3014, while an upward swipe initiated on the date 3008 would cause the message application object 3016 to be displayed instead.

In some implementations, a user can select what graphical objects are in the columns, and the location of the graphical objects in the columns. As one example, a user could have one column include graphical objects having multiple different clock display types (e.g., analog, digital, different colors, different sizes, different time zones, etc.), so that the user can easily select a particular graphical object by swiping through the column when the device is in the case.

While FIG. 30 illustrates one example set of graphical objects, the same functionality described with respect claim 30 may apply equally to other graphical objects displayed in the second region of a display. For example, with reference to FIG. 29A, a user can optionally change the displayed affordances by initiating a gesture on a displayed affordance (e.g., the first affordance 2916). In response to detecting the gesture, the first affordance will be replaced with a different affordance.

In some implementations, information displayed in a second region of a display and viewable through an opening in a protective case may prompt a user to remove the device from the case to interact with or view a larger area of the display. For example upon seeing a notification on the display through the opening in the case, a user may partially remove the device from the case to reveal a portion of the display. The device can detect that it is partially removed, and display, on the portion of the display that is visible due to the partial removal from the case, information related to the notification seen through the opening in the case.

Figure 31:
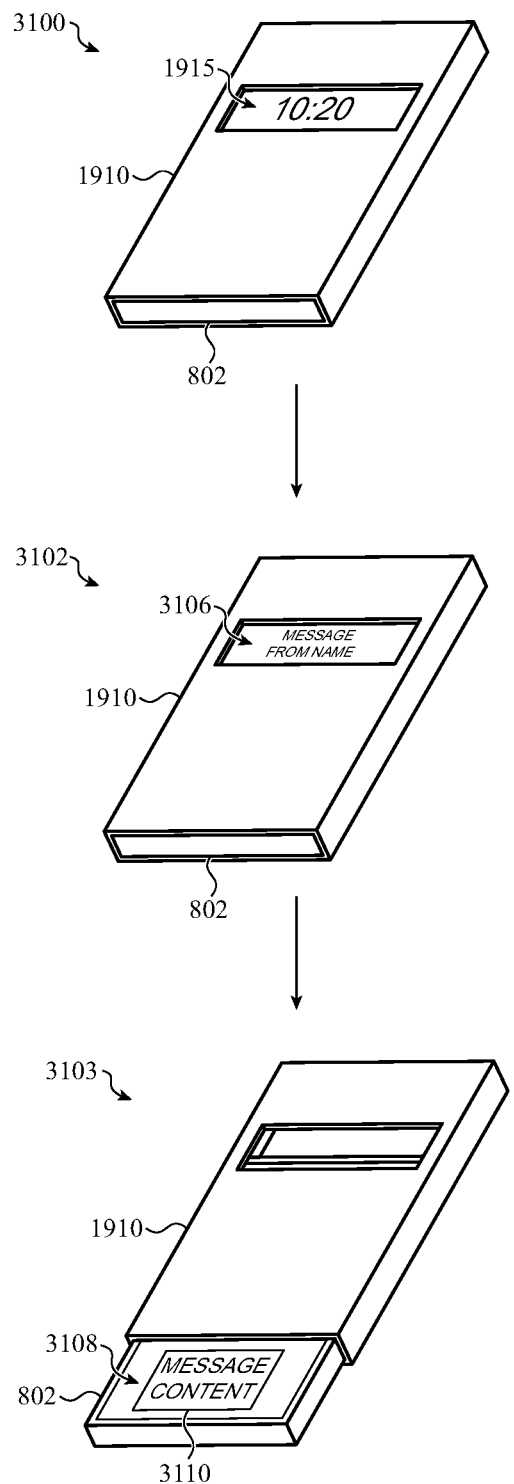
FIG. 31 depicts an electronic device in use with a case.

FIG. 31 illustrates an example of a device displaying additional information in response to being at least partially removed from a case. In particular, at stage 3100, the device 802 is coupled to the case 1910, and the second graphical user interface 1915 is displayed on the second region of the display. At stage 3102, the device 802 has detected an occurrence of an event, such as a notification of a received message (e.g., an email, a text message, etc.), and, in response, has displayed graphical content 3106 in the second region of the display. As shown, the displayed graphical content 3106 is a notification of the event (e.g., an indication that the message was received and information about the message).

After displaying the graphical content 3106, the device 802 detects that it is at least partially removed from the case 1910 such that a third region 3108 of the display is not covered by the case 1910, as shown in stage 3103. In some implementations, the third region 3108 corresponds to an area of the display that is first revealed as the device 802 is removed from the case 1910. In some implementations, the third region 3108 is a specified size (e.g., half of the display area, one third of the display area). In other implementations, the size of the third region 3108 corresponds to the amount of the display that is not covered by the case 1910.

In response to detecting that the device 802 is at least partially removed from the case 1910, the device 802 displays graphical content 3110 in the third region 3108 of the display, where the graphical content 3110 includes information associated with the event. Thus, for example, if the event that caused the graphical content 3106 to be displayed in the second region of the display is an incoming message, the graphical content 3110 includes information about the incoming message (e.g., message content). In some implementations, the user can interact with the third region 3108 of the display, such as to read the message, respond to the message, or the like. In some implementations, in response to detecting that the device 802 has been reinserted into the case 1910, the device 802 displays the second graphical user interface 1915 in the second region of the display.

The location on a display where graphical content is displayed may depend on whether or not the device is coupled to a case or not coupled to a case. For example, with reference to FIGS. 32A and 32B, a device detects an occurrence of an event. As shown, the event is an incoming call, though in other cases the event is an incoming message, a request to initiate a wireless payment, an expiration of a timer, a coupling of a charger to the device, or the like.

Figure 32A:
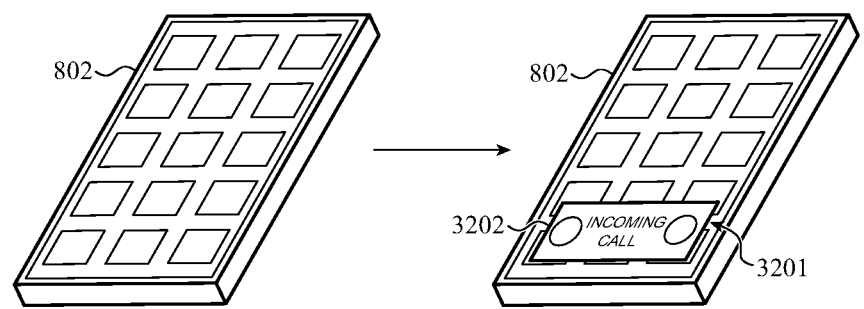
FIGS. 32A-32B depict an example electronic device displaying different graphical content based on whether the electronic device is being used with a case.

With reference to FIG. 32A, which shows the device 802 not coupled to the case 1910, in response to detecting the occurrence of the event (here, an incoming call), in accordance with a determination that a case (e.g., the case 1910) is not coupled to the device 802, the device 802 displays, in a first region 3201 of the display, first graphical content 3202 associated with the event. The first region 3201 of the display includes a region of the display that is covered by the case 1910 when the case 1910 is coupled to the device 802. In some implementations, the first region 3201 also includes a portion of the display that is not covered by the case 1910. In some implementations, the first graphical content 3202 includes an affordance (e.g., a selectable user interface object), such as an accept-call affordance, a reject-call affordance, or a timer-stop affordance. The affordance may have a first appearance.

Figure 32B:
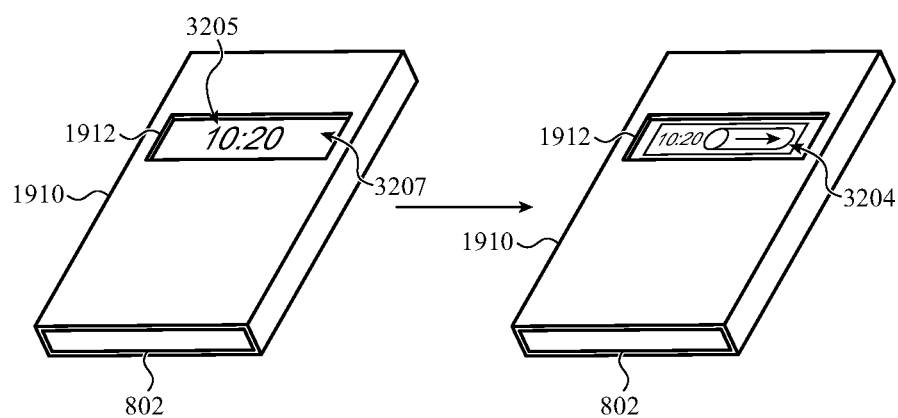

With reference to FIG. 32B, which illustrates the device 802 coupled to the case 1910, in accordance with a determination that the case 1910 is coupled to the device 802, the device 802 displays, in a second region 3207 of the display, which is different than the first region of the display, second graphical content 3204 associated with the event. The second region 3207 of the display, which corresponds to the second region 2105, is visible through an opening 1912 in the case when the case is coupled to the device 802. Thus, the same type of event will produce a graphical output at a different location on the display depending on whether or not a case is attached to the device. In some implementations, the second graphical content 3204 is different than the first graphical content 3202.

In some implementations, the second graphical content 3204 also includes an affordance, such as an accept call affordance (in the case of an incoming call notification). In some implementations, the affordance in the second graphical content 3204 has an appearance that is the same as the affordance of the first graphical content 3202. In some implementations, the affordance in the second graphical content 3204 has an appearance that is different from the affordance of the first graphical content 3202. For example, in some implementations, the affordance in the first graphical content 3202 resembles a button (FIG. 32A), and the affordance in the second graphical content is a slider (FIG. 32B).

In some implementations, in the case of an incoming call notification, the second graphical content includes text including information about the incoming call. In some implementations, the information about the incoming call includes a caller name and/or a caller number. In some implementations, the text scrolls across a portion of the display.

In the case of an incoming call notification, and in response to detecting a selection of the accept-call affordance in the second graphical content 3204, the device accepts the incoming call and displays displaying an audio selection affordance and an end-call affordance (e.g., as shown at stage 2712 of FIG. 27).

As noted above, one of the events that may be detected by the device 802 (and cause the device 802 to produce different graphical content based on whether or not the case is coupled to the device) is a user request to initiate a wireless payment. As described above with respect to FIGS. 24-26, for example, the user request may be initiated by a user pushing a button on the device, placing the device proximate to (e.g., within a threshold distance of) a near-field wireless payment system, initiating a request via a second device (e.g., watch, notebook or tablet computer, or the like), or the like. In accordance with a determination that the case 1910 is not attached (as shown in FIG. 32A), graphical objects relating to a wireless payment process are displayed in the first region 3201 of the display. In accordance with a determination that the case 1910 is attached (as shown in FIG. 32B), graphical objects relating to the wireless payment process are displayed in the second region 3207 of the display. For example, in some implementations, in response to detecting a user request to initiate a wireless payment, the second graphical content 3204 includes a representation of a payment card associated with the wireless payment (as described above with respect to FIGS. 24-27).

In some implementations, the second graphical content 3204 includes a representation of a biometric authentication process (as described above with respect to FIGS. 24-27). In some implementations, the representation of the biometric authentication process includes an indication that biometric authentication is required, an indication that biometric authentication has failed, and/or an indication that biometric authentication has succeeded. In some implementations, the biometric authentication is performed with a biometric sensor integrated into the device such as a face identification sensor, a fingerprint identification sensor, an iris identification sensor, or the like.

In some implementations, the second graphical content 3204 includes an affordance, and user selection of the affordance authorizes the wireless payment. For example, the second graphical content 3204 may include the affordance 2512 shown in FIG. 25, the selection of which authorizes the wireless payment.

In some implementations, prior to detecting the occurrence of the event (e.g., the incoming call, the request to initiate a wireless payment), and in accordance with a determination that the case is coupled to the device, the device displays third graphical content 3205 in the second region of the display. As shown, the third graphical content 3205 is a graphical representation of the time (e.g., a clock). In response to detecting the occurrence of the event, the size of the third graphical content is reduced, and a portion of the second graphical content (e.g., graphical content associated with the event, such as an accept-call affordance) is positioned in a portion of the second region of the display occupied by the third graphical content 3205 prior to the reduction in size of the third graphical content 3205. Thus, for example, the graphical representation of the current time is reduced in size (and moved to a different location in the second region of the display), while an accept-call affordance is displayed where the graphical representation of the current time used was previously displayed.

Another example event that may be detected by the device 802 (and cause the device 802 to produce different graphical content based on whether or not the case is coupled to the device) is an expiration of a timer. In accordance with a determination that the case 1910 is not attached (as shown in FIG. 32A), timer information, including timer progress, timer-stop affordances, and the like, are displayed in a first region 3201 of the display.

In some implementations, prior to detecting the occurrence of the event (e.g., the expiration of the timer), and in accordance with a determination that the case 1910 is coupled to the device, the device 802 displays a progress of the timer in the second region 3207 of the display. In some implementations, displaying the progress of the timer includes displaying a timer countdown. In response to detecting the expiration of the timer, and in accordance with a determination that the case 1910 is coupled to the device 802, the device displays, in the second region 3207 of the display, an affordance. In some implementations, user selection of the affordance stops at least one of an audible or a tactile output triggered by the expiration of the timer.

Another example event that may be detected by the device 802 (and cause the device 802 to produce different graphical content based on whether or not the case is coupled to the device) is a coupling of a charger to the device. For example, in accordance with a determination that the case 1910 is not attached (as shown in FIG. 32A), first graphical content (e.g., the visual indication 906) indicating the attachment of the charger is displayed in a first region 3201 of the display. In response to detecting the attachment of the charger, and in accordance with a determination that the case 1910 is coupled to the device 802, the device displays, in the second region 3207 of the display, second graphical content comprising a graphical representation of a charging function (e.g., a lightning bolt, a plug, a battery, etc.).

In some implementations, whether or not a case is attached to a device may correspond to a mode of operation of the device. For example, in some implementations, the device is considered in a first mode of operation when the device is not coupled to a case, and in a second mode of operation when the device is coupled to the case.

In some implementations, while the device (e.g., the device 802) is operating in a first mode of operation, the device 802 detects a first occurrence of an event. In some implementations, the event is an attachment of a charging accessory, an expiration of a timer, an incoming call, or any other event described herein. In response to detecting the first occurrence of the event, the device 802 displays, in a first region 3201 of the display, first graphical content associated with the event (e.g., an incoming call notification, an accept-call affordance, a timer-stop affordance, an indication that a charger has been attached).

In some implementations, the device 802 detects a coupling of a case (e.g., the case 1910) to the device. For example, the device 802 detects, with a near-field wireless communication system, a near-field wireless communication antenna of the case. In response to detecting the coupling of the case 1910 to the housing of the device 802, the device 802 transitions from the first mode of operation (e.g., a case-off mode) to a second mode of operation (e.g., a case-on mode).

While the device 802 is operating in the second mode of operation and while the case 1910 is coupled to the housing of the device, the device 802 detects a second occurrence of the event (e.g., a second incoming call notification, a second accept-call affordance, a second timer-stop affordance, a second indication that a charger has been attached), and in response to detecting the second occurrence of the event, the device 802 displays, in a second region 3207 of the display different than the first region of the display, second graphical content associated with the event (e.g., an incoming call notification, an accept-call affordance, a timer-stop affordance, an indication that a charger has been attached), where the second graphical content is different from the first graphical content. As described above, at least a portion of the first region 3201 of the display is covered by the case 1910 when the case 1910 is coupled to the device 802, and the second region 3207 of the display is visible through an opening 1912 in the case 1910 when the case is coupled to the device 802.

FIG. 33 is a flow chart of an example method 3300 that includes displaying a visual indication on a computer system in response to an attachment of an accessory to the computer system. In some implementations, the method 3300 is performed at a computer system with a display, a housing, and an attachment mechanism. As used herein, a computer system with a display, housing, and attachment mechanism may also be referred to as an electronic device (or simply device). Examples of such computer systems include, for example, electronic devices 100, 800, and 802.

In some implementations, the computer system detects (3302) attachment of an accessory to the computer system, where the accessory, while attached, has a predetermined orientation relative to the attachment mechanism. FIG. 9B, for example, illustrates a charging accessory 804 attached to a device 800 in a predetermined orientation. In some implementations, the attachment mechanism is a magnetic attachment mechanism.

In some implementations, in response to detecting the attachment of the accessory to the computer system, and in accordance with a determination that the accessory is a first accessory with first physical dimensions, the computer system displays (3304), on the display, a first visual indication that the accessory has been attached to the computer system, wherein the first visual indication indicates at least one property of the first physical dimensions. In some implementations, the first physical dimensions are a size, a length, a width, or a shape of the accessory. For example, FIG. 9C illustrates the device 800 displaying a visual indication 906 (e.g., a first visual indication) indicating that the charging accessory 804 has been attached to the computer system. The visual indication 906 includes a property of the physical dimensions of the charging accessory 804. For example, the charging accessory 804 has a circular shape (e.g., a first physical dimension), and the visual indication 906 has a circular graphical element (e.g., indicating a property (e.g., shape) of the first physical dimension of the charging accessory 804).

In some implementations, in response to detecting the attachment of the accessory to the computer system, and in accordance with a determination that the accessory is a second accessory with second physical dimensions that are different from the first physical dimensions, the computer system displays (3306), on the display a second visual indication that the accessory has been attached to the computer system. In some implementations, the second physical dimensions are a size, a length, a width, or a shape of the accessory.

The second visual indication indicates (3308) at least one property of the second physical dimensions, and the second visual indication is different from the first visual indication (3310). For example, FIG. 16A illustrates the device 800 displaying a visual indication 1600 indicating that the auxiliary battery accessory 808 has been attached to the computer system. The visual indication 1600 includes a property of the physical dimensions of the auxiliary battery accessory 808. For example, the auxiliary battery accessory 808 has a square shape (e.g., a second physical dimension), and the visual indication 1600 has a square graphical element (e.g., indicating a property (e.g., shape) of the second physical dimension of the auxiliary battery accessory 808).

In some implementations, the first accessory has a first shape and the second accessory has a second shape, and the first visual indication has a first graphical element having the first shape and the second visual indication has a second graphical element having the second shape. In some implementations, the first accessory has a first size and the second accessory has a second size, and the first visual indication has the first size and the second visual indication has the second size. For example, FIGS. 9B-9C show a first accessory (e.g., the charging dock 804) having a first shape and a first size, and the first visual indication (e.g., visual indication 906, FIG. 9C) having the same shape and size as the first accessory, and FIG. 13C shows a second accessory (e.g., the auxiliary battery accessory 808) having a second shape and a second size, and the second visual indication (e.g., visual indication 1300) having the same shape and size as the second accessory. FIG. 16B shows another accessory (e.g., the wallet accessory 806) and a corresponding visual indication 1604 having the same size and shape as the wallet accessory 806, which is different than the size and shape of the first accessory.

In some implementations, the first accessory is shorter than the second accessory in a respective dimension, and the first visual indication is shorter than the second visual indication in the respective dimension. In some implementations, the first visual indication occupies less than an entire area of the display and the second visual indication occupies an entire area of the display. For example, FIG. 13C shows a second accessory (e.g., the auxiliary battery accessory 808) that is shorter than a first accessory (e.g., the charging dock 804, FIGS. 9A-9C), and a second visual indication (e.g., visual indication 1300) that is shorter than the first visual indication (e.g., the visual indication 906, FIG. 9C). In some implementations, the second accessory is a protective case (e.g., the cases 810, 812 in FIG. 8, and/or cases 1900, 1910 in FIGS. 19A-19B) for the computer system.

In some implementations, the first visual indication and the second visual indication include at least one common element (e.g., the graphical elements 910, 1010 in FIGS. 9C and 10C). In some implementations, the at least one common element (e.g., the graphical elements 910, 1010 in FIGS. 9C and 10C) is displayed at a location that corresponds to a location of the attachment mechanism in the computer system (e.g., the attachment mechanisms 814-1, 814-2, FIGS. 9C and 10C). In some implementations, the at least one common element is displayed in a shape that corresponds to a shape of the attachment mechanism in the computer system. For example, the graphical elements 910, 1010 (FIGS. 9C and 10C) are circular, as are the attachment mechanisms 814-1, 814-2 (FIGS. 9C and 10C).

In some implementations, the method 3300 further includes, while the accessory (e.g., a protective case 810, FIG. 15A) is attached to the computer system, detecting attachment of an additional accessory (e.g., charger 804, FIG. 15A) to the computer system, where the additional accessory, while attached, has a predetermined orientation relative to the attachment mechanism, and, in response to detecting the attachment of the additional accessory to the computer system and in accordance with a determination that the additional accessory is a third accessory with third physical dimensions, displaying, on the display, a third visual indication (e.g., the visual indication 906, FIG. 15B) indicating that the additional accessory has been attached to the computer system. In some implementations, the third visual indication indicates at least one property of the third physical dimensions and is different from the first visual indication and the second visual indication. For example, attachment of the case 810 causes display of a visual indication occupying the entire display (shown in FIG. 14B), attachment of the charging dock 804 causes display of a visual indication 906 with a circle shape corresponding to the size and shape of the charging dock 804 (shown in FIG. 15B), and attachment of an auxiliary battery accessory causes display of a visual indication 1300 with a square shape corresponding to the size and shape of the auxiliary battery accessory 808 (shown in FIG. 13C).

In some implementations, the method 3300 further includes displaying, on the display, a graphical user interface (e.g., first graphical user interface 1101, FIGS. 11A-11B), and the first visual indication (e.g., the visual indications 1100, 1102) overlies at least a portion of the graphical user interface. In some implementations, the first visual indication is a translucent graphical object (e.g., object 1106, FIG. 11A) and at least a portion of the graphical user interface (e.g., graphical object 1104-2, FIG. 11A) is visible through the translucent graphical object.

In some implementations, the method further includes in accordance with a determination that the computer system is in a first state when the attachment of the accessory is detected, displaying the first visual indication in accordance with the determination that the accessory is the first accessory and displaying the second visual indication in accordance with the determination that the accessory is the second accessory. In accordance with a determination that the computer system is in a second state, different from the first state, when the attachment of the accessory is detected, forgoing display of the first visual indication and/or the second visual indication. In some implementations, the first state corresponds to the computer system being locked, the computer system displaying a home screen user interface, the computer system displaying a wake screen or lock screen, or the computer system displaying a system user interface. In some implementations, the second state corresponds to the computer system being unlocked, or the computer system displaying an application user interface. FIG. 18A, for example, shows a device 800 displaying a visual indication 1802 when an accessory is attached and the device is in a first state (e.g., displaying a lock screen), and FIG. 18B shows the device 800 foregoing display of the visual indication 1802 when the device is in a second state (e.g., displaying a home screen).

In some implementations, the first visual indication and the second visual indication include information associated with the accessory (e.g. information 1602, 1603, FIG. 16A, and information 1606, FIG. 16B). In some implementations, the information includes a name of an owner of the accessory, state of charge of a battery associated with the accessory, or a room or location associated with accessory.

In some implementations, the method further includes, in response to detecting the attachment of the accessory to the computer system, producing a non-visual output (e.g., tactile output 1708 and/or audio output 1706, FIG. 17B), wherein the non-visual output is produced in accordance with the determination that the accessory is the first accessory and in accordance with the determination that the accessory is the second accessory. In some implementations, the non-visual output is a tactile output (e.g., a vibration), and/or an audio output (e.g., a beep, tone, song).

In some implementations, the first accessory is a first type of accessory (e.g., the charging dock 804, FIG. 8), the second accessory is a second type of accessory different from the first type of accessory (e.g., the wallet accessory 806, FIG. 17B), and the same non-visual output (e.g., the tactile output 1708 and/or audio output 1706, FIG. 17B) is produced by the computer system when the first accessory is attached to the computer system and when the second accessory is attached to the computer system. In some implementations, the first type of accessory is a charging dock, a protective case, a wallet accessory, or an auxiliary battery accessory (as described with respect to FIG. 8, for example).

In some implementations, the second visual indication is different from the first visual indication in a manner that indicates a difference between the first physical dimensions and the second physical dimensions. For example, the visual indication 1600 indicates the first physical dimensions of the auxiliary battery accessory 808 (FIG. 16A), and has different dimensions than the visual indication 1604 in FIG. 16B (which, in turn, indicates the second, different physical dimensions of the wallet accessory 806). In some implementations, the first visual indication includes a respective portion (e.g., border 1702, FIG. 17A) that expands (e.g., radiates) outward from a location that corresponds to a location of the attachment mechanism (e.g., attachment mechanism 814-1, FIG. 8) in the computer system. FIG. 12 also illustrates an example visual indication 1201 that includes a boundary 1200 that expands (e.g., radiates) outward.

In some implementations, the accessory is at least one of a charging dock, a wallet accessory, a protective case, and an auxiliary battery for charging the computer system (as described with respect to FIG. 8, for example).

In some implementations, the method further includes detecting detachment of the accessory from the computer system, and in response to detecting the detachment, in accordance with a determination that the accessory is a first type of accessory, generating a first detach output (e.g., tactile output 1708 and/or audio output 1706, FIG. 17B), and in accordance with a determination that the accessory is a second type of accessory, forgoing generation of the detach output. In some implementations, generating the detach output includes generating the tactile output and/or audio output indicating detachment of the accessory (e.g., tactile output 1708 and/or audio output 1706, FIG. 17B). In some implementations, forgoing generation of the detach output includes foregoing generating a tactile output and/or audio output indicating detachment of the accessory.

In some implementations, the method further includes detecting detachment of the accessory from the computer system, and, in response to detecting the detachment, producing a detach output indicating that the accessory has been detached from the computer system. In some implementations, the detach output includes non-visual output (e.g., a tactile output and/or an audio output, FIG. 17B). In some implementations, the tactile output and/or audio output included in the detach output is the same as tactile output and/or audio output that is generated when the accessory is attached. In some implementations, the tactile output and/or audio output in the detach output is different from tactile output and/or audio output that is generated when the accessory is attached. In some implementations, the tactile output and/or audio output in the detach output includes a component of the tactile output and/or audio output that is generated when the accessory is attached and includes a component that is different from the tactile output and/or audio output that is generated when the accessory is attached. For example, in some implementations, the audio output that is generated when the accessory is attached is the same as the audio output that is generated when the accessory is detached, and the tactile output that is generated when the accessory is attached is the same as the tactile output that is generated when the accessory is detached. In some implementations, the audio output that is generated when the accessory is attached is different from the audio output that is generated when the accessory is detached, and the tactile output that is generated when the accessory is attached is the same as the tactile output that is generated when the accessory is detached. In some implementations, the audio output that is generated when the accessory is attached is the same as the audio output that is generated when the accessory is detached, and the tactile output that is generated when the accessory is attached is different than the tactile output that is generated when the accessory is detached. In some implementations, the audio output that is generated when the accessory is attached is different than the audio output that is generated when the accessory is detached, and the tactile output that is generated when the accessory is attached is different than the tactile output that is generated when the accessory is detached.

In some implementations, the detach output includes a visual detach indication (e.g., the visual indication 1710, FIG. 17B). For example, in some implementations the visual detach indication includes a map showing a location where the detachment occurred (e.g., the map 373, FIG. 3P). In some implementations, a visual detach indication is shown when the computer system is in a first state (e.g., the computer system is displaying a lock screen) and not when the system is in a second state (e.g., the computer is displaying an application graphical user interface).

In some implementations, the first visual indication is an animated visual indication (e.g., the animated visual indication 1700, FIG. 17A, which includes an expanding graphical element 1702), the second visual indication is an animated visual indication, and displaying the visual detach indication includes, in accordance with a determination that the accessory is the first accessory, displaying a third visual indication that includes a reversal of at least a portion of (or all of) the first visual indication (e.g., the animated visual indication 1710, FIG. 17B, which includes a retracting graphical element 1712), and in accordance with a determination that the accessory is the second accessory, displaying a fourth visual indication that is different from the third visual indication and that includes a reversal of at least a portion of (or all of) the second visual indication. In some implementations, the first visual indication includes a first respective portion (e.g., border 1702, FIG. 17A) that expands (e.g., radiates) outward from a location that corresponds to a location of the attachment mechanism in the computer system, the third visual indication includes a second respective portion (e.g., border 1712 in FIG. 17B) that retracts inward to the location that corresponds to the location of the attachment mechanism in the computer system, and the third visual indication is produced in accordance with the determination that the accessory is the first accessory.

Figure 34:
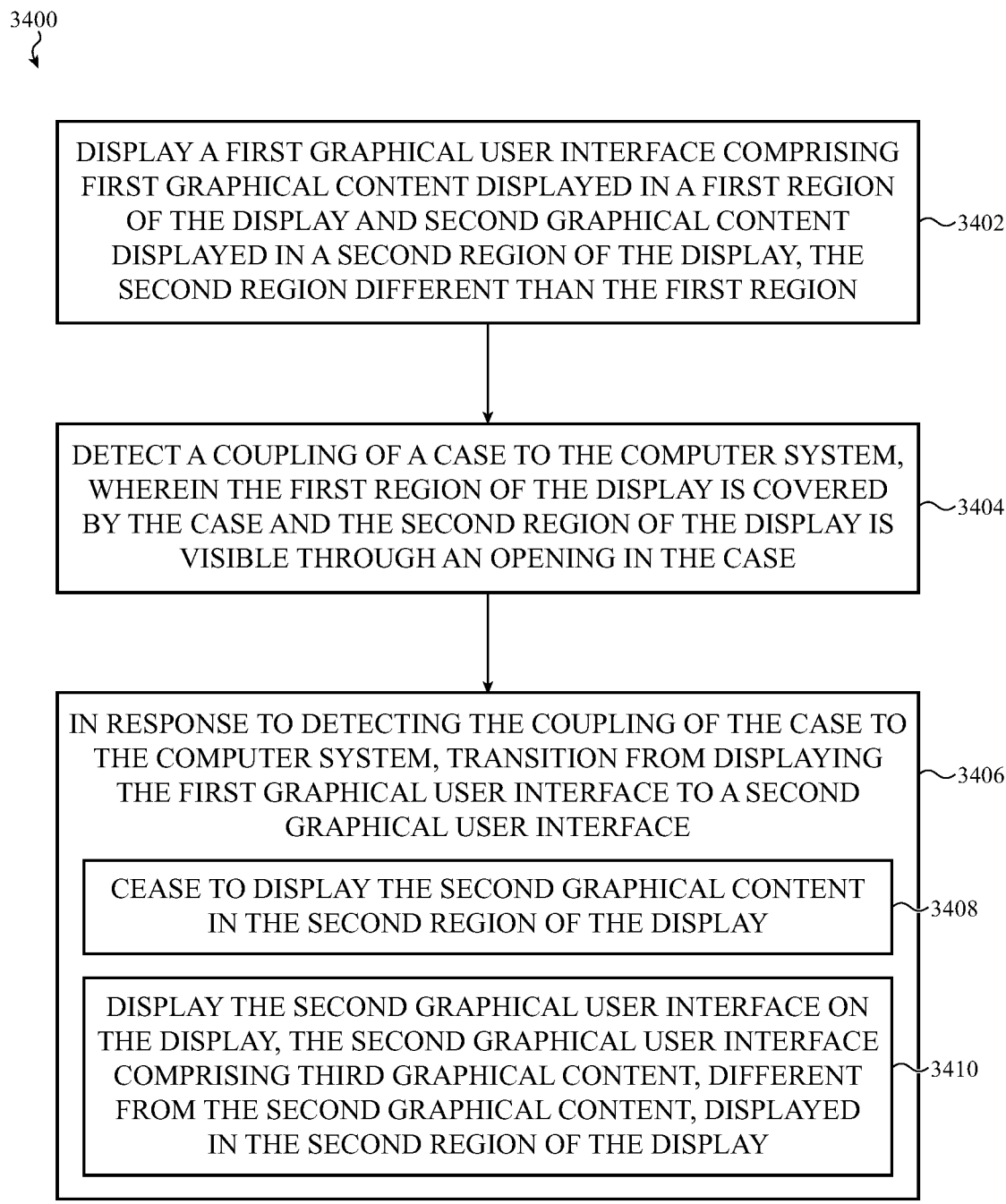
FIG. 34 is a flow chart of another method for use with a computer system.

FIG. 34 is a flow chart of an example method 3400 that includes displaying graphical user interfaces on a computer system in response to an attachment of a case to the computer system. In some implementations, the method 3400 is performed at a computer system with a display and a housing. As used herein, a computer system with a display and housing may also be referred to as an electronic device (or simply device). Examples of such computer systems include, for example, electronic devices 100, 800, and 802.

In some implementations, the computer system displays (3402) a first graphical user interface comprising first graphical content displayed in a first region of the display and second graphical content displayed in a second region of the display, the second region different than the first region. For example, FIGS. 19A-19B and FIG. 21 illustrate a device 800 displaying a first graphical user interface 1904 that includes first graphical content (e.g., application icons) displayed in a first region of the display (e.g., outside the boundary 2102 in FIG. 21A) and second graphical content (e.g., at least part of an application icon) displayed in a second region of the display (e.g., inside the boundary 2102 in FIG. 21A).

The computer system detects (3404) a coupling of a case to the computer system, where the first region of the display is covered by the case and the second region of the display is visible through an opening in the case. FIGS. 19A-19B, for example, illustrate the device 800 being coupled to a protective case 1900, where the protective case 1900 has a wall that covers the first portion of the display and defines an opening 1902 through a wall of the case so that the second region of the display is visible.

In response to detecting the coupling of the case to the computer system, the computer system transitions (3406) from displaying the first graphical user interface to a second graphical user interface. The transition includes ceasing to display (3408) the second graphical content in the second region of the display, and displaying (3410) the second graphical user interface on the display, the second graphical user interface comprising third graphical content, different from the second graphical content, displayed in the second region of the display. For example, FIG. 19A illustrates the device 800 transitioning from displaying application icons (or portions thereof) of a first graphical user interface 1904 in the second region of the display (e.g., second graphical content), to displaying a second graphical user interface 1905 in the second region, where the second graphical user interface 1905 includes background graphic 1906 and a foreground graphic 1907 (e.g., third graphical content). FIG. 19B illustrates the device 802 transitioning from displaying application icons (or portions thereof) of a first graphical user interface 1914 in the second region of the display (e.g., second graphical content), to displaying a second graphical user interface 1915 in the second region, where the second graphical user interface 1905 includes background graphic 1916 and a foreground graphic 1917 (e.g., third graphical content).

In some implementations, the second graphical content of the second graphical user interface includes a background graphic (e.g., background graphic 1906, FIG. 19A, background graphic 1916, FIG. 19B) and a foreground graphic (e.g., foreground graphic 1907, FIG. 19A, foreground graphic 1917, FIG. 19B) on the background graphic. In some implementations, the background graphic is a color, and the foreground graphic is a graphical representation of a current time. In some implementations, the background graphic has a first color that matches a color of the case, and the foreground graphic has a second color different than the first color. In some implementations, the background graphic initially has a first color that matches a color of the case, the foreground graphic initially has a second color different from the first color, and displaying the second graphical user interface includes, after displaying the background graphic having the first color and the foreground graphic having the second color, transitioning the background graphic from the first color to a third color.

In some implementations, the method further includes, after displaying the background graphic having the first color (e.g., background graphic 1906 in FIG. 19A, background graphic 1916 in FIG. 19B) and the foreground graphic having the second color (e.g., foreground graphic 1907 in FIG. 19A, foreground graphic 1917 in FIG. 19B), transitioning the foreground graphic from the second color to the first color. In some implementations, the transition of the foreground graphic from the second color to the first color occurs simultaneously with the transition of the background color. In some implementations, the transition of the foreground graphic from the second color to the first color occurs after the transition of the background color.

In some implementations, the transition further includes, prior to displaying the second graphical user interface (e.g., the second graphical user interfaces 1905, 1915, FIGS. 19A-19B), displaying a black background graphic in the second region of the display.

In some implementations, the method further includes, while the case is coupled to the computer system, detecting an occurrence of an event, and, in response to detecting the occurrence of the event, displaying, in the second region of the display, a graphical object associated with the event. In some implementations, the event is an incoming call, and the graphical object includes an accept-call affordance (e.g., affordance 2310 in FIG. 23, affordance 2814 in FIG. 27, graphical content 3204 in FIG. 32B). In some implementations, when the device detects a selection input directed to the accept-call affordance while there is an incoming call, the device answers the incoming call. In some implementations, the method further includes detecting a selection of the accept-call affordance, and in response to detecting the selection of the accept-call affordance, accepting the incoming call and displaying an audio selection affordance (e.g., audio selection affordance 2722 in FIG. 27) and an end-call affordance (e.g., end call affordance 2720 in FIG. 27). In some implementations, when the device detects a selection input directed to the end-call affordance while there is an ongoing call, the device ends the ongoing call.

In some implementations, the event is a user request to initiate a wireless payment, as described with respect to FIGS. 24-26. In some implementations, the user request to initiate the wireless payment is initiated by a user pushing a button on the computer system, placing the computer system proximate to (e.g., within a threshold distance of) a near-field wireless payment system, initiating a request via a second computer system (e.g., watch, notebook or tablet computer, or the like), or the like. In some implementations, the graphical object includes a representation of a payment card (e.g., the graphical object 2414 in FIG. 24, the graphical object 2514 in FIG. 25, the graphical object 2620 in FIG. 26) associated with the wireless payment. In some implementations, the graphical object includes a representation of a biometric authentication process (e.g., the graphical object 2412 in FIG. 24, the graphical object 2516 in FIG. 25, the graphical object 2618 in FIG. 26). In some implementations, the graphical object includes an affordance (e.g., the affordance 2512, FIG. 25), and user selection of the affordance authorizes the wireless payment.

In some implementations, the event is a notification of a received message (e.g., as shown in example 2301 in FIG. 23, and in FIG. 21). In some implementations, the event is a coupling of a charger to the computer system (e.g., as shown in example 2313 in FIG. 23).

In some implementations, the event is an initiation of a voice-based digital assistant, and the graphical object (e.g., the graphical object 2812 in FIG. 28) is animated in accordance with a voice input received by the computer system.

In some implementations, the event is an expiration of a timer, the graphical object includes an affordance (e.g., the affordance 2322 in example 2307 in FIG. 23, the graphical object 2324 in example 2309 of FIG. 23), and user selection of the affordance stops at least one of an audible or a tactile output triggered by the expiration of the timer.

In some implementations, the method further includes detecting a gesture on the second graphical user interface (e.g., a slide or swipe gesture indicated by the touch input 2910 and the arrow 2912 in FIG. 29A), and, in response to detecting the gesture, displaying fourth graphical content (e.g., graphical content 2914, FIG. 29A), different from the third graphical content (e.g., graphical user interface 2902, FIG. 29A), in the second region of the display.

In some implementations, the gesture is a first gesture, and the method further includes detecting a second gesture on the second graphical user interface (e.g., a slide or swipe gesture indicated by the touch input 2936 and the arrow 2938 in FIG. 29B), and, in response to detecting the second gesture, displaying fifth graphical content (e.g., graphical content 2940, FIG. 29B), different from the fourth graphical content, in the second region of the display.

In some implementations, the first gesture is a swipe in a first direction (e.g., a first direction indicated by the arrow 2912 in FIG. 29A), the fourth graphical content includes a plurality of affordances (e.g., the affordances 2916, 2918, 2920, 2922 in FIG. 29A), the second gesture is a swipe in a second direction opposite the first direction (e.g., a second direction indicated by the arrow 2938 in FIG. 29B), and the fifth graphical content includes a set of media playback controls (e.g., the media playback controls of the graphical content 2940 in FIG. 29B. In some implementations, the plurality of affordances (which are selectable user interface objects) include a do-not-disturb mode selection affordance (e.g., e.g., affordance 2916 in FIG. 29A), a wireless payment initiation affordance (e.g., affordance 2918 in FIG. 29A), a volume control selection affordance (e.g., affordance 2920 in FIG. 29A), and/or a ring/silent selection affordance (e.g., affordance 2922 in FIG. 29A).

In some implementations, the fourth graphical content includes a plurality of affordances (e.g., graphical objects 3008, 3010, 3012 in FIG. 30, which may be affordances). In some implementations, the plurality of affordances include a first affordance and a second affordance, and the method further includes, detecting a gesture initiated on the first affordance (e.g., a vertical swipe, as described with reference to FIG. 30), and, in response to detecting the gesture, replacing the first affordance (e.g., the graphical object 3008 in FIG. 30) with a third affordance different than the first affordance (e.g., the graphical object 3014 in FIG. 30). Gestures such as those described with respect to FIG. 30 may also be used to change the affordances in other example user interfaces. For example, affordances in the fourth graphical content in FIG. 29A can be changed by applying a gesture (e.g., a vertical swipe) to an affordance. In some implementations, the plurality of affordances (which are selectable user interface objects) include a do-not-disturb mode selection affordance (e.g., the affordance 2916 in FIG. 29A), a wireless payment initiation affordance (e.g., the affordance 2918) in FIG. 29A, a volume control selection affordance (e.g., the affordance 2920 in FIG. 29A), and/or a ring/silent selection affordance (e.g., the affordance 2922 in FIG. 29A).

Figure 35:
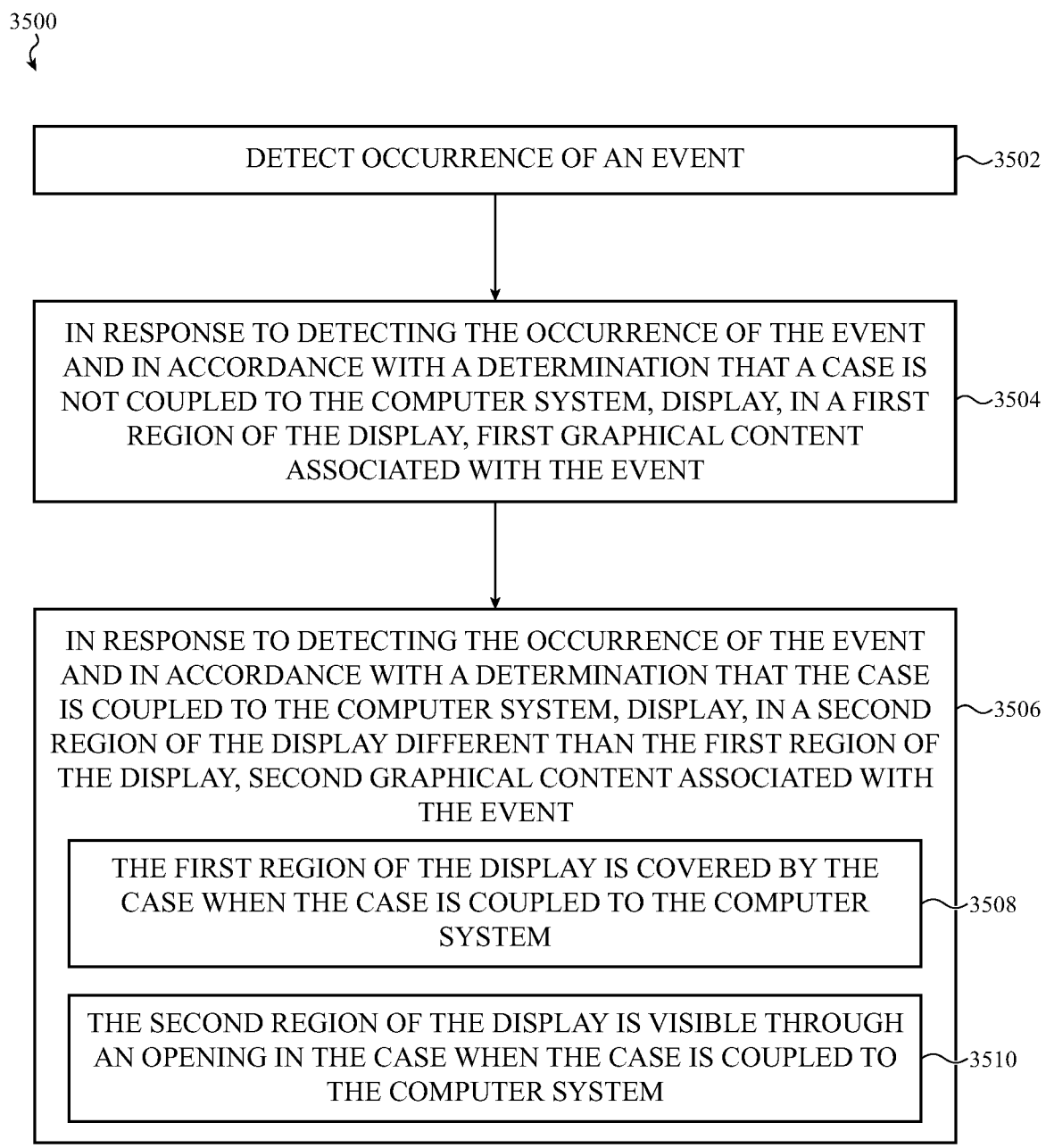
FIG. 35 is a flow chart of another method for use with a computer system.

FIG. 35 is a flow chart of an example method 3500 that includes displaying first or second graphical content on a computer system based on whether or not a case is coupled to the computer system. In some implementations, the method 3500 is performed at a computer system with a display and a housing. As used herein, a computer system with a display and housing may also be referred to as an electronic device (or simply device). Examples of such computer systems include, for example, electronic devices 100, 800, and 802.

In some implementations, the computer system detects (3502) an occurrence of an event. In some implementations, the event is an incoming call, a message notification (e.g., email, text message), an expiration of a timer, an alarm, or the like.

In response to detecting the occurrence of the event, and in accordance with a determination that a case is not coupled to the computer system, the computer system displays (3504), in a first region of the display, first graphical content associated with the event. For example, FIG. 32A illustrates a device 802 detecting an incoming call (e.g., an occurrence of an event), and displaying an incoming call notification (e.g., first graphical content) in a first region of the display.

In response to detecting the occurrence of the event, and in accordance with a determination that the case is coupled to the computer system, the computer system displays (3506), in a second region of the display different than the first region of the display, second graphical content associated with the event. The first region of the display is covered by the case when the case is coupled to the computer system (3508), and the second region of the display is visible through an opening in the case when the case is coupled to the computer system (3510). FIG. 32B illustrates the device 802 detecting the incoming call (e.g., an occurrence of an event), and displaying an incoming call notification (e.g., second graphical content) in a second region of the display that is visible through the opening 1912. In some implementations, the incoming call notifications differ both in location and content and/or appearance depending on whether the case is coupled to the computer system or not coupled to the computer system.

In some implementations, the event is an incoming call, and the second graphical content includes an accept-call affordance (e.g., affordance 2310 in FIG. 23, affordance 2814 in FIG. 27, graphical content 3204 in FIG. 32B). In some implementations, the method further includes detecting a selection of the accept-call affordance, and, in response to detecting the selection of the accept-call affordance, accepting the incoming call and displaying an audio selection affordance (e.g., audio selection affordance 2722 in FIG. 27) and an end-call affordance (e.g., end call affordance 2720 in FIG. 27). In some implementations, the second graphical content includes a scrolling text including information about the incoming call (e.g., the information 2724 in FIG. 27 may include scrolling text, as described with respect to FIG. 27).

In some implementations, the first graphical content (e.g., the first graphical content 3202 in FIG. 32A) is different than the second graphical content (e.g., the second graphical content 3204 in FIG. 32B). In some implementations, the first graphical content includes a first affordance having a first appearance, the second graphical content includes a second affordance having a second appearance, user selection of the first affordance causes the computer system to perform an action, and user selection of the second affordance causes the computer system to perform the action. For example, FIGS. 32A and 32B illustrate the first graphical content 3202 and the second graphical content 3204 having affordances with different appearances but both performing the same action (e.g., accepting an incoming call).

In some implementations, the event is a user request to initiate a wireless payment. FIGS. 24-26 illustrate example graphical content that may be displayed in response to a user request to initiate a wireless payment.

In some implementations, the second graphical content includes a representation of a payment card associated with the wireless payment (e.g., the graphical object 2414 in FIG. 24, the graphical object 2514 in FIG. 25, the graphical object 2620 in FIG. 26). In some implementations, the user request to initiate the wireless payment is initiated by a user pushing a button on the computer system, placing the computer system proximate to (e.g., within a threshold distance of) a near-field wireless payment system, initiating a request via a second computer system (e.g., watch, notebook or tablet computer, or the like), or the like.

In some implementations, the second graphical content includes a representation of a biometric authentication process (e.g., the graphical object 2412 in FIG. 24, the graphical object 2516 in FIG. 25, the graphical object 2618 in FIG. 26). For example, in some implementations, the representation of the biometric authentication process includes an indication that biometric authentication is required, an indication that biometric authentication has failed, and/or an indication that biometric authentication has succeeded. In some implementations, the second graphical content includes an affordance (e.g., the affordance 2512, FIG. 25), and user selection of the affordance authorizes the wireless payment.

In some implementations, the method further includes, prior to detecting the occurrence of the event, and in accordance with a determination that the case is coupled to the computer system, displaying third graphical content (e.g., the third graphical content 3205 in FIG. 32B, shown as a clock display) in the second region of the display, and in response to detecting the occurrence of the event, reducing a size of the third graphical content. FIG. 32B, for example, shows a reduced-size clock display displayed in the second region of the display in response to detecting an incoming call. In some implementations, a portion of the second graphical content is positioned in a portion of the second region of the display occupied by the third graphical content prior to the reduction in size of the third graphical content (e.g., the reduced-size clock display may overlap the area where the initial clock display was positioned, as shown in FIG. 32B). In some implementations, the third graphical content is a graphical representation of a current time (e.g., the clock display shown in FIG. 32B).

In some implementations, the second graphical content is a notification of the event, and the method further includes, after displaying the second graphical content (e.g., the graphical content 3106 in FIG. 31), detecting that the computer system is at least partially removed from the case such that a third region of the display is not covered by the case (e.g., region 3108 of the display is not covered by the case, as shown in stage 3103 of FIG. 31), and, in response to detecting that the computer system is at least partially removed from the case, displaying third graphical content (e.g., graphical content 3110) in the third region of the display, the third graphical content includes information associated with the event.

In some implementations, the event is an expiration of a timer, and the method further includes, prior to detecting the occurrence of the event, and in accordance with a determination that the case is coupled to the computer system, displaying a progress of the timer in the second region of the display (e.g., a timer countdown may be shown in the second region 2302 (FIG. 23) of a display prior to the expiration of the timer). In some implementations, the second graphical content includes an affordance (e.g., the affordance 2322 in example 2307 in FIG. 23, the graphical object 2324 in example 2309 of FIG. 23), and user selection of the affordance stops at least one of an audible or a tactile output triggered by the expiration of the timer.

In some implementations, the event is a coupling of a charger to the computer system, and the second graphical content includes a graphical representation of a charging function (e.g., the graphical object 2334 in example 2313 of FIG. 23, displayed in response to detecting of an attachment of a charging dock to the computer system).

In some implementations, a method includes, at a computer system with a display and a housing, while the computer system is operating in a first mode of operation, detecting a first occurrence of an event, and, in response to detecting the first occurrence of the event, displaying, in a first region of the display, first graphical content associated with the event. The method further includes detecting a coupling of a case to the computer system, and, in response to detecting the coupling of the case to the housing of the computer system, transitioning from the first mode of operation to a second mode of operation. The method further includes while the computer system is operating in the second mode of operation and while the case is coupled to the housing of the computer system, detecting a second occurrence of the event, and, in response to detecting the second occurrence of the event, displaying, in a second region of the display different than the first region of the display, second graphical content associated with the event. The first region of the display is covered by the case when the case is coupled to the computer system, and the second region of the display is visible through an opening in the case when the case is coupled to the computer system.

Figure 36:
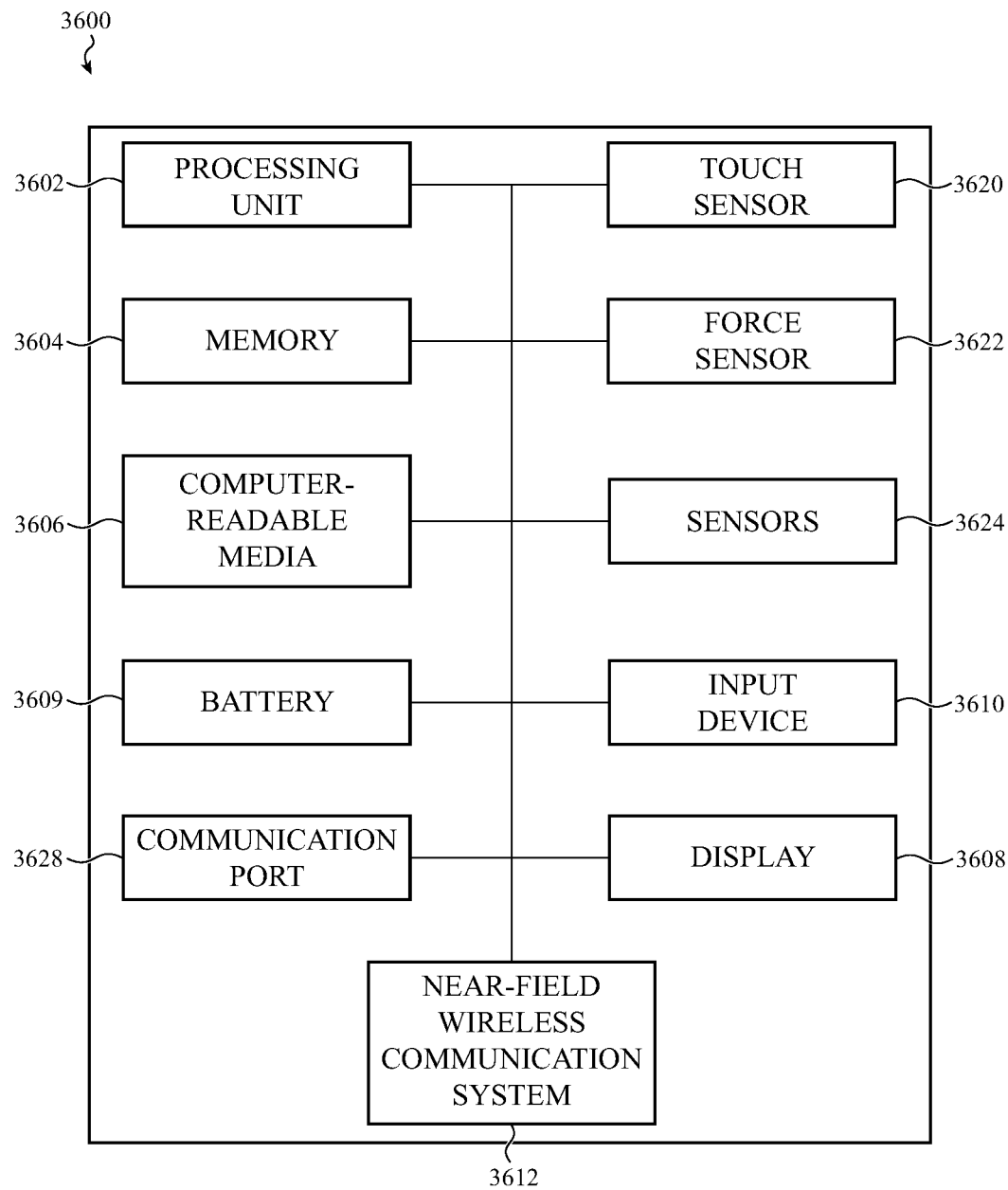
FIG. 36 depicts example components of an electronic device.

FIG. 36 depicts an example schematic diagram of a computer system 3600. The computer system 3600 may correspond to the electronic device 100 shown in FIGS. 1A-7 and the electronic devices 800, 802 shown in FIGS. 8A-32B. To the extent that multiple functionalities, operations, and structures are disclosed as being part of, incorporated into, or performed by the computer system 3600, it should be understood that various embodiments may omit any or all such described functionalities, operations, and structures. Thus, different embodiments of the computer system 3600 may have some, none, or all of the various capabilities, apparatuses, physical features, modes, and operational parameters discussed herein. Further, details of the electronic devices 100, 800, 802 that are shown and/or described herein will be understood to apply equally to the computer system 3600. For example, device components (e.g., attachment mechanisms, housings, antennas, etc.), application software, graphical user interfaces, etc., may all be embodied by the computer system 3600. Further, any of the components, hardware, software, or other systems or components described with respect to the computer system 3600 may equally be included in the electronic devices 100, 800, and/or 802.

As shown in FIG. 36, a device 3600 includes a processing unit 3602 operatively connected to computer memory 3604 and/or computer-readable media 3606. The processing unit 3602 may be operatively connected to the memory 3604 and computer-readable media 3606 components via an electronic bus or bridge. The processing unit 3602 may include one or more computer processors or microcontrollers that are configured to perform operations in response to computer-readable instructions. The processing unit 3602 may include the central processing unit (CPU) of the device. Additionally or alternatively, the processing unit 3602 may include other processors within the device including application specific integrated chips (ASIC) and other microcontroller devices.

The memory 3604 may include a variety of types of non-transitory computer-readable storage media, including, for example, read access memory (RAM), read-only memory (ROM), erasable programmable memory (e.g., EPROM and EEPROM), or flash memory. The memory 3604 is configured to store computer-readable instructions, sensor values, and other persistent software elements. Computer-readable media 3606 also includes a variety of types of non-transitory computer-readable storage media including, for example, a hard-drive storage device, a solid-state storage device, a portable magnetic storage device, or other similar device. The computer-readable media 3606 may also be configured to store computer-readable instructions, sensor values, and other persistent software elements.

In this example, the processing unit 3602 is operable to read computer-readable instructions stored on the memory 3604 and/or computer-readable media 3606. The computer-readable instructions may be provided as a computer-program product, software application, or the like.

As shown in FIG. 36, the computer system 3600 also includes a display 3608. The display 3608 may include a liquid-crystal display (LCD), organic light emitting diode (OLED) display, light emitting diode (LED) display, or the like. If the display 3608 is an LCD, the display 3608 may also include a backlight component that can be controlled to provide variable levels of display brightness. If the display 3608 is an OLED or LED type display, the brightness of the display 3608 may be controlled by modifying the electrical signals that are provided to display elements. The display 3608 may correspond to any of the displays shown or described herein, such as the display 104 (FIG. 1A).

The computer system 3600 may also include a battery 3609 that is configured to provide electrical power to the components of the computer system 3600. The battery 3609 may include one or more power storage cells that are linked together to provide an internal supply of electrical power. The battery 3609 may be operatively coupled to power management circuitry that is configured to provide appropriate voltage and power levels for individual components or groups of components within the computer system 3600. The battery 3609, via power management circuitry, may be configured to receive power from an external source, such as an AC power outlet, a charging dock (e.g., the charging docks 200, 804), an auxiliary battery (e.g., the auxiliary battery accessory 808), a battery-enabled protective case, or the like. The battery 3609 may store received power so that the computer system 3600 may operate without connection to an external power source for an extended period of time, which may range from several hours to several days. Power management circuitry may include wireless charging components, such as a charging coil that inductively couples to an output coil of a wireless charger to charge the battery 3609.

In some embodiments, the computer system 3600 includes one or more input devices 3610. An input device 3610 is a device that is configured to receive user input. The one or more input devices 3610 may include, for example, a rotatable input system, a push button, a touch-activated button, a keyboard, a key pad, or the like (including any combination of these or other components). In some embodiments, the input device 3610 may provide a dedicated or primary function, including, for example, a power button, volume buttons, home buttons, scroll wheels, and camera buttons.

The computer system 3600 may also include a sensor 3624. The sensor 3624 may detect inputs provided by a user to one or more of the input devices 3610 of the computer system 3600. The sensor 3624 may also be a biometric sensor, such as a heart rate sensor, electrocardiograph sensor, temperature sensor, or any other type of sensor. In cases where the sensor 3624 is a biometric sensor, it may include biometric sensing circuitry, as well as portions of a crown that conductively couple a user's body to the biometric sensing circuitry. Biometric sensing circuitry may include components such as processors, capacitors, inductors, transistors, analog-to-digital converters, or the like.

The computer system 3600 may also include a touch sensor 3620 that is configured to determine a location of a touch on a touch-sensitive surface of the computer system 3600 (e.g., an input surface defined by the transparent cover 105). The touch sensor 3620 may use or include capacitive sensors, resistive sensors, surface acoustic wave sensors, piezoelectric sensors, strain gauges, or the like. In some cases the touch sensor 3620 associated with a touch-sensitive surface of the computer system 3600 may include a capacitive array of electrodes or nodes that operate in accordance with a mutual-capacitance or self-capacitance scheme. The touch sensor 3620 may be integrated with one or more layers of a display stack (e.g., the display 104, FIG. 1A) to provide the touch-sensing functionality of a touchscreen.

The computer system 3600 may also include a force sensor 3622 that is configured to receive and/or detect force inputs applied to a user input surface of the computer system 3600 (e.g., a surface of the transparent cover 105). The force sensor 3622 may use or include capacitive sensors, resistive sensors, surface acoustic wave sensors, piezoelectric sensors, strain gauges, or the like. In some cases, the force sensor 3622 may include or be coupled to capacitive sensing elements that facilitate the detection of changes in relative positions of the components of the force sensor (e.g., deflections caused by a force input). The force sensor 3622 may be integrated with one or more layers of a display stack (e.g., the display 104) to provide force-sensing functionality of a touchscreen.

The computer system 3600 may also include a communication port 3628 that is configured to transmit and/or receive signals or electrical communication from an external or separate device. The communication port 3628 may be configured to couple to an external device via a cable, adaptor, or other type of electrical connector. In some embodiments, the communication port 3628 may be used to couple the computer system 3600 to an accessory, including a dock or case, a stylus or other input device, smart cover, smart stand, keyboard, or other device configured to send and/or receive electrical signals.

The computer system 3600 may also include a near-field wireless communication system 3612 (which may correspond to the near-field wireless communication system 106 in FIG. 1A). The near-field wireless communication system may include one or more antennas and associated circuitry for detecting the presence of near-field wireless communication antennas. The near-field wireless communication system 3612 may be configured to operate using any suitable type or protocol of near-field wireless communications, including but not limited to near-field communications ("NFC") protocols, radio frequency identification ("RFID") protocols, or any other suitable type or protocol. The near-field wireless communication system 3612 may be configured to detect near-field wireless communication antennas through a single side of the device (e.g., the back side), or multiple sides (e.g., any combination of sides including all sides).

While the computer system 3600 is described as having a particular set of components, the computer system 3600 is not limited to only those components described herein. For example, a device may include more than one of the components described with respect to FIG. 36 or elsewhere in the instant application, and may indeed include other components not described herein.

The foregoing description shows and describes various types of graphical objects that may be displayed by a device in response to the device detecting that it is being used with a near-field wireless enabled accessory. The graphical objects may take the form of or include icons, graphical user interfaces, background images, notification object (e.g., for temporary notifications), or the like. The graphical objects may be programmatically associated with any suitable application, program, or operating system of the device, and/or may originate from any suitable layer of the Open Systems Interconnection model (OSI model). For example, in cases where the device detects an accessory and in response temporarily displays a notification object over a part of a primary graphical user interface of an operating system, the notification object may be programmatically associated with or originate from the operating system. As another example, in cases where the device detects an accessory and in response initiates an application, the graphical user interface of the application may be programmatically associated with or originate from the application (where an application may be defined as a software program that is executed by or on the operating system).

As described above, one aspect of the present technology is the gathering and use of data available from various sources to improve the usefulness of the devices described herein. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to the benefit of users. For example, the personal information data can be used to provide customized graphical user interfaces and user experiences. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. A method, comprising:
at a computer system with a display and a housing:
detecting an occurrence of an event; and
in response to detecting the occurrence of the event:
in accordance with a determination that a case is not coupled to the computer system, displaying, in a first region of the display, first graphical content associated with the event, the first graphical content comprising a first affordance having a first appearance; and
in accordance with a determination that the case is coupled to the computer system, displaying, in a second region of the display different than the first region of the display, second graphical content associated with the event, the second graphical content comprising a second affordance having a second appearance, wherein:
the first region of the display is covered by the case when the case is coupled to the computer system;
the second region of the display is visible through an opening in the case when the case is coupled to the computer system;
user selection of the first affordance causes the computer system to perform an action; and
user selection of the second affordance causes the computer system to perform the action.

2. The method of claim 1, wherein:
the event is an incoming call; and
the second graphical content comprises an accept-call affordance.

3. The method of claim 2, further comprising:
   detecting a selection of the accept-call affordance; and
   in response to detecting the selection of the accept-call affordance:
      accepting the incoming call; and
      displaying an audio selection affordance and an end-call affordance.

4. The method of claim 2, wherein the second graphical content comprises a scrolling text including information about the incoming call.

5. The method of claim 1, wherein the event is a user request to initiate a wireless payment.

6. The method of claim 5, wherein the second graphical content comprises a representation of a payment card associated with the wireless payment.

7. The method of claim 5, wherein the second graphical content comprises a representation of a biometric authentication process.

8. The method of claim 5, wherein:
   the second graphical content comprises an affordance; and
   user selection of the affordance authorizes the wireless payment.

9. The method of claim 1, wherein:
   the method further comprises:
      prior to detecting the occurrence of the event, and in accordance with a determination that the case is coupled to the computer system, displaying third graphical content in the second region of the display; and
      in response to detecting the occurrence of the event, reducing a size of the third graphical content; and
   a portion of the second graphical content is positioned in a portion of the second region of the display occupied by the third graphical content prior to the reduction in size of the third graphical content.

10. The method of claim 9, wherein the third graphical content is a graphical representation of a current time.

11. The method of claim 1, wherein:
    the second graphical content is a notification of the event; and
    the method further comprises:
       after displaying the second graphical content, detecting that the computer system is at least partially removed from the case such that a third region of the display is not covered by the case; and
       in response to detecting that the computer system is at least partially removed from the case, displaying third graphical content in the third region of the display, the third graphical content comprises information associated with the event.

12. The method of claim 1, wherein:
    the event is an expiration of a timer; and
    the method further comprises prior to detecting the occurrence of the event, and in accordance with a determination that the case is coupled to the computer system, displaying a progress of the timer in the second region of the display;
    the second graphical content comprises an affordance; and
    user selection of the affordance stops at least one of an audible or a tactile output triggered by the expiration of the timer.

13. The method of claim 1, wherein:
    the event is a coupling of a charger to the computer system; and
    the second graphical content comprises a graphical representation of a charging function.

14. A method, comprising:
    at a computer system with a display and a housing:
       while the computer system is operating in a first mode of operation:
          detecting a first occurrence of an event; and
          in response to detecting the first occurrence of the event, displaying, in a first region of the display, first graphical content associated with the event, the first graphical content comprising a first affordance having a first appearance;
       detecting a coupling of a case to the computer system;
       in response to detecting the coupling of the case to the housing of the computer system, transitioning from the first mode of operation to a second mode of operation; and
       while the computer system is operating in the second mode of operation and while the case is coupled to the housing of the computer system:
          detecting a second occurrence of the event; and
          in response to detecting the second occurrence of the event, displaying, in a second region of the display different than the first region of the display, second graphical content associated with the event, the second graphical content comprising a second affordance having a second appearance, wherein:
       the first region of the display is covered by the case when the case is coupled to the computer system;
       the second region of the display is visible through an opening in the case when the case is coupled to the computer system;
       user selection of the first affordance causes the computer system to perform an action; and
       user selection of the second affordance causes the computer system to perform the action.

15. A computer system comprising:
    a display;
    a housing;
    one or more processors;
    memory; and
    one or more programs stored in the memory and configured to be executed by the one or more processors and including instructions for:
       detecting an occurrence of an event; and
       in response to detecting the occurrence of the event:
          in accordance with a determination that a case is not coupled to the computer system, displaying, in a first region of the display, first graphical content associated with the event, the first graphical content comprising a first affordance having a first appearance; and
          in accordance with a determination that the case is coupled to the computer system, displaying, in a second region of the display different than the first region of the display, second graphical content associated with the event, the second graphical content comprising a second affordance having a second appearance, wherein:
       the first region of the display is covered by the case when the case is coupled to the computer system;
       the second region of the display is visible through an opening in the case when the case is coupled to the computer system;
       user selection of the first affordance causes the computer system to perform an action; and
       user selection of the second affordance causes the computer system to perform the action.

16. The computer system of claim 15, wherein:
the event is an incoming call; and
the second graphical content comprises an accept-call affordance.

17. The computer system of claim 16, wherein the one or more programs further include instructions for:
detecting a selection of the accept-call affordance; and
in response to detecting the selection of the accept-call affordance:
accepting the incoming call; and
displaying an audio selection affordance and an end-call affordance.

18. The computer system of claim 17, wherein the second graphical content comprises a scrolling text including information about the incoming call.

19. The computer system of claim 15, wherein the event is a user request to initiate a wireless payment.

20. The computer system of claim 15, wherein:
the one or more programs further include instructions for:
prior to detecting the occurrence of the event, and in accordance with a determination that the case is coupled to the computer system, displaying third graphical content in the second region of the display; and
in response to detecting the occurrence of the event, reducing a size of the third graphical content; and
a portion of the second graphical content is positioned in a portion of the second region of the display occupied by the third graphical content prior to the reduction in size of the third graphical content.

* * * * *